United States Patent [19]
Maki et al.

[11] Patent Number: 5,636,621
[45] Date of Patent: Jun. 10, 1997

[54] FUEL METERING CONTROL SYSTEM FOR INTERNAL COMBUSTION ENGINE

[75] Inventors: Hidetaka Maki; Shusuke Akazaki; Yusuke Hasegawa, all of Wako, Japan

[73] Assignee: Honda Giken Kogyo Kabushiki Kaisha, Tokyo, Japan

[21] Appl. No.: 580,968

[22] Filed: Dec. 29, 1995

[30] Foreign Application Priority Data

Dec. 30, 1994 [JP] Japan .................................. 6-340027
Feb. 25, 1995 [JP] Japan .................................. 7-061656

[51] Int. Cl.⁶ ................................................. F02D 41/14
[52] U.S. Cl. ......................... 123/673; 123/480; 123/679
[58] Field of Search ................................. 123/480, 672, 123/679, 681, 687, 673; 364/431.05

[56] References Cited

U.S. PATENT DOCUMENTS

| | | | |
|---|---|---|---|
| 4,667,640 | 5/1987 | Sekozawa et al. | 123/480 X |
| 5,190,020 | 3/1993 | Cho | 123/684 |
| 5,293,553 | 3/1994 | Dudek et al. | 123/480 X |
| 5,524,598 | 6/1996 | Hasegawa et al. | 123/672 |

FOREIGN PATENT DOCUMENTS

| | | |
|---|---|---|
| 3539395 | 5/1987 | Germany . |
| 63-75334 | 4/1988 | Japan . |
| 1-110853 | 4/1989 | Japan . |
| 1-134040 | 5/1989 | Japan . |
| 1-313644 | 12/1989 | Japan . |
| 2-275043 | 11/1990 | Japan . |
| 5-180040 | 7/1993 | Japan . |
| 6-017680 | 1/1994 | Japan . |
| 6-17681 | 1/1994 | Japan . |
| 6-101522 | 4/1994 | Japan . |
| 6-161511 | 6/1994 | Japan . |
| 7-83094 | 3/1995 | Japan . |
| 7-247886 | 9/1995 | Japan . |
| 7-259588 | 10/1995 | Japan . |
| 8-128359 | 5/1996 | Japan . |

OTHER PUBLICATIONS

"Digital Adaptive Control", Computrol No. 27, pp. 28–41. No date.
"Automatic Control Handbook", pp. 703–707. No date.
"A Survey of Model Reference Adaptive Techniques—Theory and Applications", Automatica, vol. 10, pp. 353–379, Pergamon Press, 1974.
"Unification of Discrete Time Explicit Model Reference Adaptive Control Designs", Automatica, vol. 17, no. 4, pp. 593–611, Pergamon Press, 1981.
"Combining Model Reference Adaptive Controllers and Stochastic Self–tuning Regulators", Automatica, vol. 18, No. 1, pp. 77–84, Pergamon Press, 1982.

*Primary Examiner*—Tony M. Argenbright
*Attorney, Agent, or Firm*—Nikaido, Marmelstein, Murray & Oram LLP

[57] ABSTRACT

A fuel metering control system for an internal combustion engine including a feedback loop having an adaptive controller and an adaptation mechanism that estimates controller parameters $\hat{\theta}$. The adaptive controller corrects the quantity of fuel injection to bring a controlled variable obtained at least based on an output of said air/fuel ratio sensor, to a desired value. Estimation error of the controller parameters are defined by an error signal e*. The system is configured such that the signal is compared with a limit value and is replaced to a predetermined value when the calculated estimation error signal exceeds the limit value. Thus, the signal is determined to be a predetermined value.

33 Claims, 45 Drawing Sheets

FIG. 17
| | Pb |
|---|---|
| Ne | $\Gamma_{11} \sim \Gamma_{55}$ |
FIG. 18
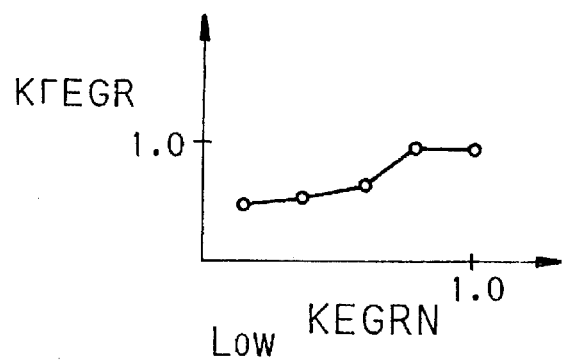
FIG. 19
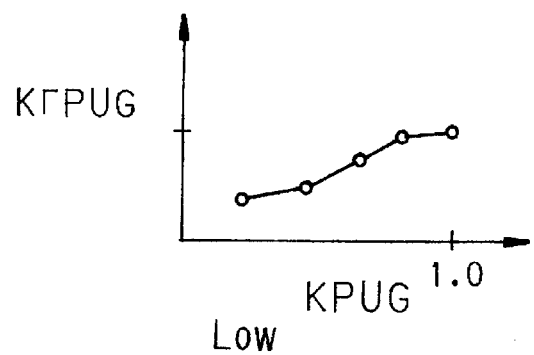

FIG. 30

| STR operation | ① | ② | ③ | ④ | ⑤ | ⑥ | ⑦ | ⑧ | ⑨ | ⑩ |
|---|---|---|---|---|---|---|---|---|---|---|
| A | Every TDC | | | 2TDCs | | | 4TDCs | | | Discontinue STR calculation |
| C | Every TDC | | 2TDCs | 4TDCs | Every TDC | 2TDCs | 4TDCs | Every TDC | 2TDCs | 4TDCs |

Nec1  Nec2  NeA1       Nec3  Nec4  NeA2       Nec5  Nec6  NeA3

⎯⎯→ Ne

FUEL METERING CONTROL SYSTEM FOR INTERNAL COMBUSTION ENGINE

BACKGROUND OF THE INVENTION

1. Field of the Invention

This invention relates to a fuel metering control system for an internal combustion engine.

2. Description of the Prior Art

The application of adaptive control theory to internal combustion engines in recent years has led to the development of technologies for adaptively controlling the actual quantity of fuel drawn into the engine cylinders to the desired fuel quantity, as taught, for example, by Japanese Laid-Open Patent Application No. Hei 1(1989)–110,853.

The present assignee's Japanese Patent Application No. Hei 6(1994)–66,594 (Japanese Laid-Open Patent Application No. Hei 7(1995)-247,886) (filed in the United States on Mar. 9, 1995 under the number 08/401,430) also teaches fuel metering control in an internal combustion engine using adaptive control. The system includes an adaptive controller which receives controller (system) parameters estimated/identified by an adaptation mechanism and forms a feedback compensator so as to bring a detected value to a desired value.

However, when actually applying the adaptive control to a fuel metering control, there are many problem to be solved so as to effectively conduct the control with high performance. More specifically, the controller parameters should be determined properly, which otherwise are apt to overshoot an optimum value, rendering the system unstable.

SUMMARY OF THE INVENTION

An object of the invention is therefore to provide a fuel metering control system for an internal combustion engine which makes it possible to determine the controller parameters properly, thereby enabling an adaptive control to be conducted on an actual engine with good stability and good result.

Similarly, when the controller parameters are determined improperly, the control performance degrades.

A second object of the invention is therefore to provide a fuel metering control system for an internal combustion engine which makes it possible to determine the controller parameters properly, thereby enabling an adaptive control to be conducted on an actual engine with good stability and high control performance.

In order to achieve the objects, there is provided a system for controlling fuel metering for a multi-cylinder internal combustion engine, said system comprising, an air/fuel ratio sensor installed in an exhaust system of the engine, a fuel injector for injecting fuel in individual cylinders of the engine, engine operating condition detecting means for detecting engine operating conditions, said engine operating conditions including at least engine speed and engine load, fuel injection quantity determining means for determining a quantity of fuel injection for the individual cylinders of the engine, based upon the detected engine operating conditions, an adaptive controller connected to said air/fuel ratio sensor and said fuel injection quantity determining means for correcting the quantity of fuel injection based on controller parameters estimated by an adaptation mechanism, such that a controlled variable at least obtained based upon an output of said air/fuel ratio sensor is corrected to a desired value. The system is further provided with estimation error signal calculating means for calculating an estimation error signal of the controller parameters, estimation error signal comparing means for comparing the calculated estimation error signal with a predetermined limit value and replacing means for replacing the calculated estimation error signal with at least one of the predetermined limit value and a prescribed value when the calculated estimation error signal exceeds the predetermined limit value.

BRIEF EXPLANATION OF THE DRAWINGS

These and other objects and advantages of the invention will be more apparent from the following description and drawings, which show the invention by way of example only, and in which:

FIG. 17 is an explanatory view showing the characteristic of a map used in the operation of FIG. 16;

FIGS. 18 to 21 are explanatory views showing the characteristics of tables used in the operation of FIG. 16;

FIG. 30 is an explanatory table explaining the operation of FIG. 29;

PREFERRED EMBODIMENTS OF THE INVENTION

Embodiments of the invention, given by way of example only, will now be explained with reference to the drawings.

Figure 1:
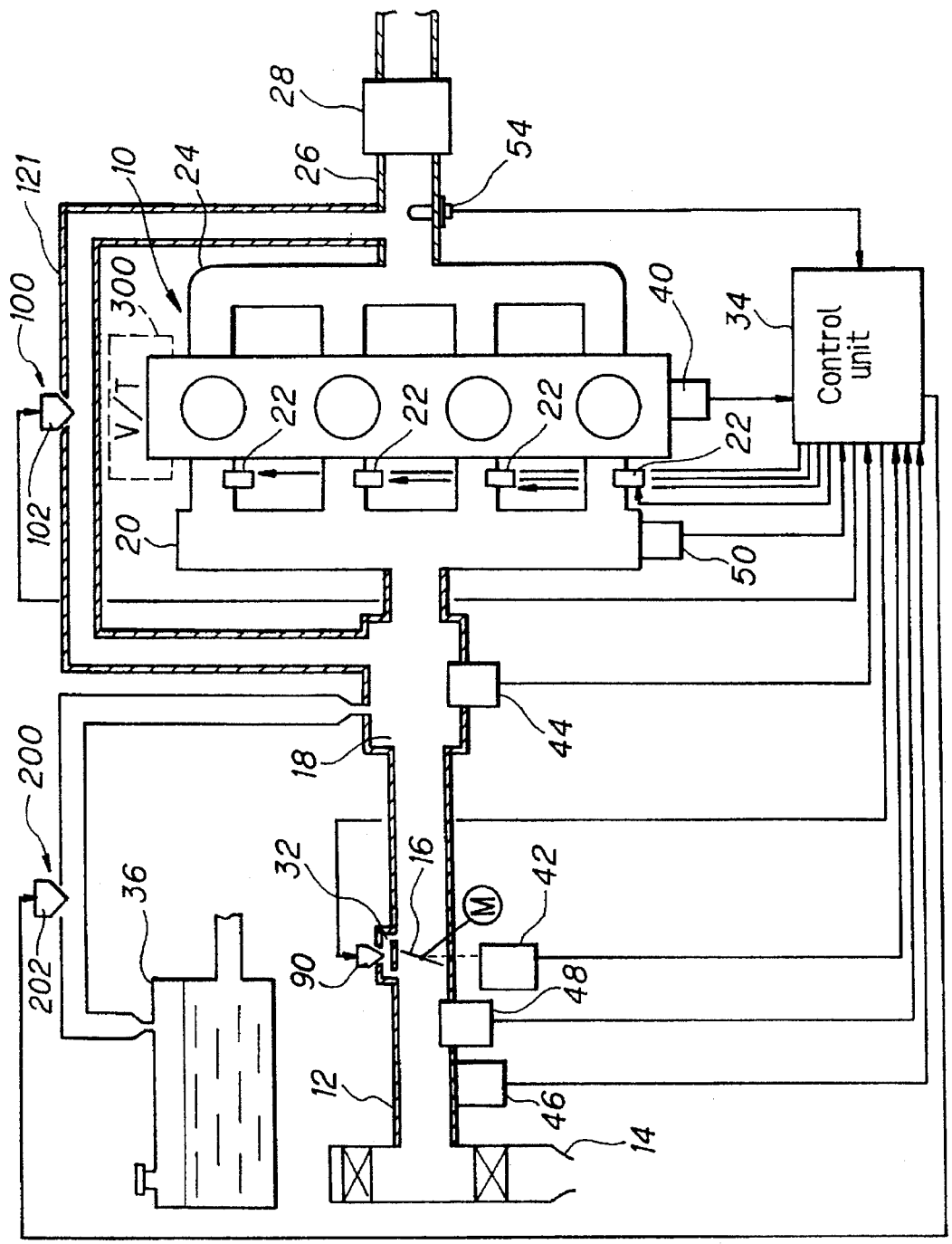
FIG. 1 is an overall schematic view showing a fuel metering control system for an internal combustion engine according to the present invention.

FIG. 1 is an overview of a fuel metering control system for an internal combustion engine according to the invention.

Reference numeral 10 in this figure designates an overhead cam (OHC) in-line four-cylinder internal combustion engine. Air drawn into an air intake pipe 12 through an air cleaner 14 mounted on a far end thereof is supplied to each of the first to fourth cylinders through a surge tank 18, an intake manifold 20 and two intake valves (not shown), while the flow thereof is adjusted by a throttle valve 16. A fuel injector 22 for injecting fuel is installed in the vicinity of the intake valves of each cylinder. The injected fuel mixes with the intake air to form an air-fuel mixture that is ignited in the associated cylinder by a spark plug (not shown) in the firing order of #1, #3 , #4 and #2 cylinder. The resulting combustion of the air-fuel mixture drives a piston (not shown) down.

The exhaust gas produced by the combustion is discharged through two exhaust valves (not shown) into an exhaust manifold 24, from where it passes through an exhaust pipe 26 to a catalytic converter (three-way catalyst) 28 where noxious components are removed therefrom before it is discharged to the exterior. Not mechanically linked with the accelerator pedal (not shown), the throttle valve 16 is controlled to a desired degree of opening by a stepping motor M. In addition, the throttle valve 16 is bypassed by a bypass 32 provided at the air intake pipe 12 in the vicinity thereof.

The engine 10 is equipped with an exhaust gas recirculation (EGR) mechanism 100 which recirculates a part of the exhaust gas to the intake side.

Figure 2:
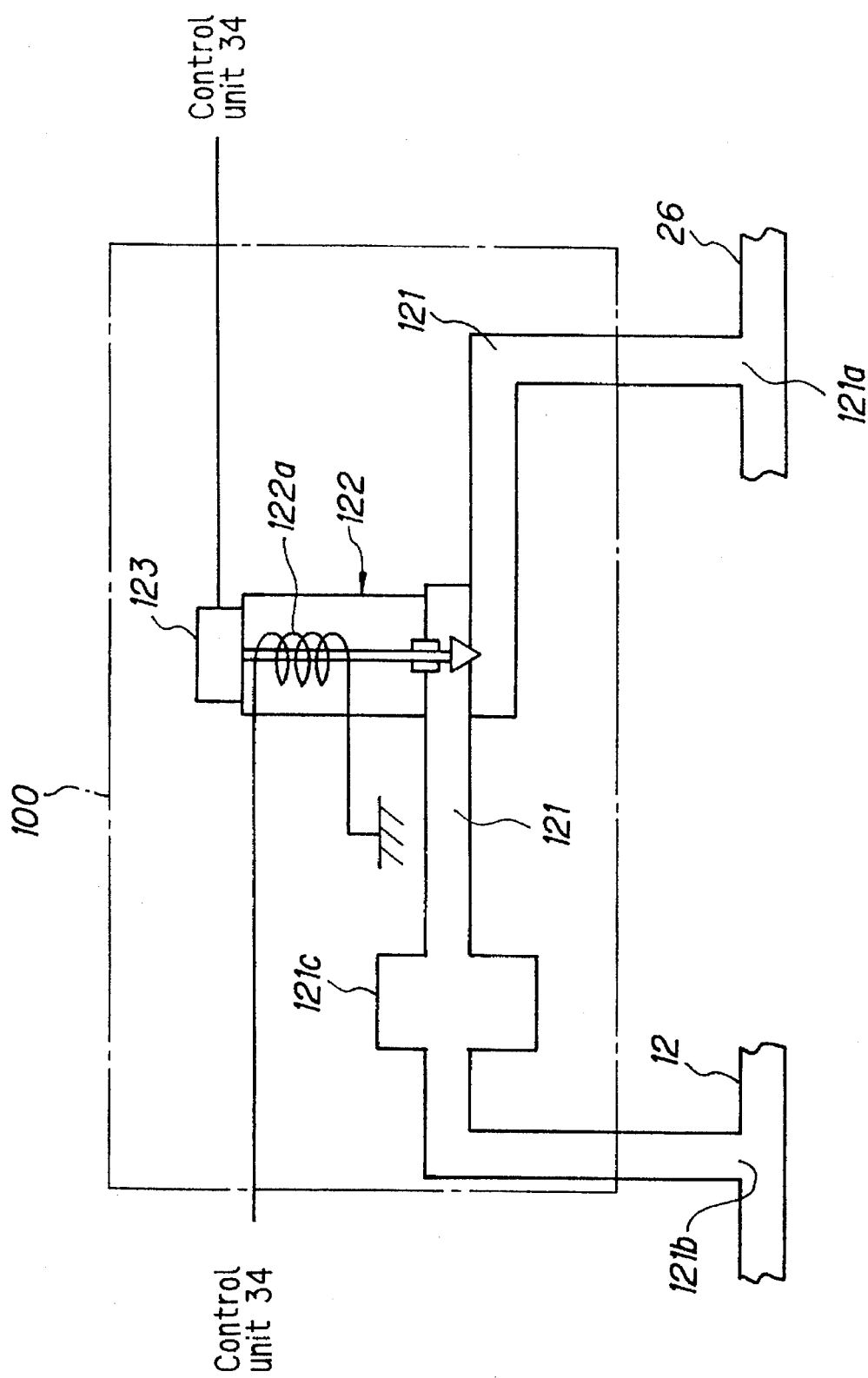
FIG. 2 is a schematic view showing the details of an exhaust gas recirculation (EGR) mechanism illustrated in FIG. 1.

More specifically, as shown in FIG. 2, the exhaust gas recirculation mechanism 100 has an exhaust gas recirculation pipe 121 having one end (port) 121a connected with the exhaust pipe 26 on the upstream side of the first catalytic converter 28 (not shown in FIG. 2) and another end (port) 121b connected to the air intake pipe 12 on downstream side of the throttle valve 16 (not show FIG. 2). For regulating the amount of recirculate exhaust gas, an EGR (exhaust gas recirculation) control valve 122 and a surge tank 121c are provided at an intermediate portion of the exhaust gas recirculation pipe 121. The EGR control valve 122 is a solenoid valve having a solenoid 122a which is connected to a control unit (ECU) 34 (described later). The EGR control valve 122 is linearly controlled to the desired degree of opening by an output from the control unit 34 to the solenoid 122a. The EGR control valve 122 is provided with a lift sensor 123 which detects the degree of opening of the EGR control valve 122 and sends a corresponding signal to the control unit 34.

The engine 10 is also equipped with a canister purge mechanism 200 connected between the air intake system and a fuel tank 36.

Figure 3:
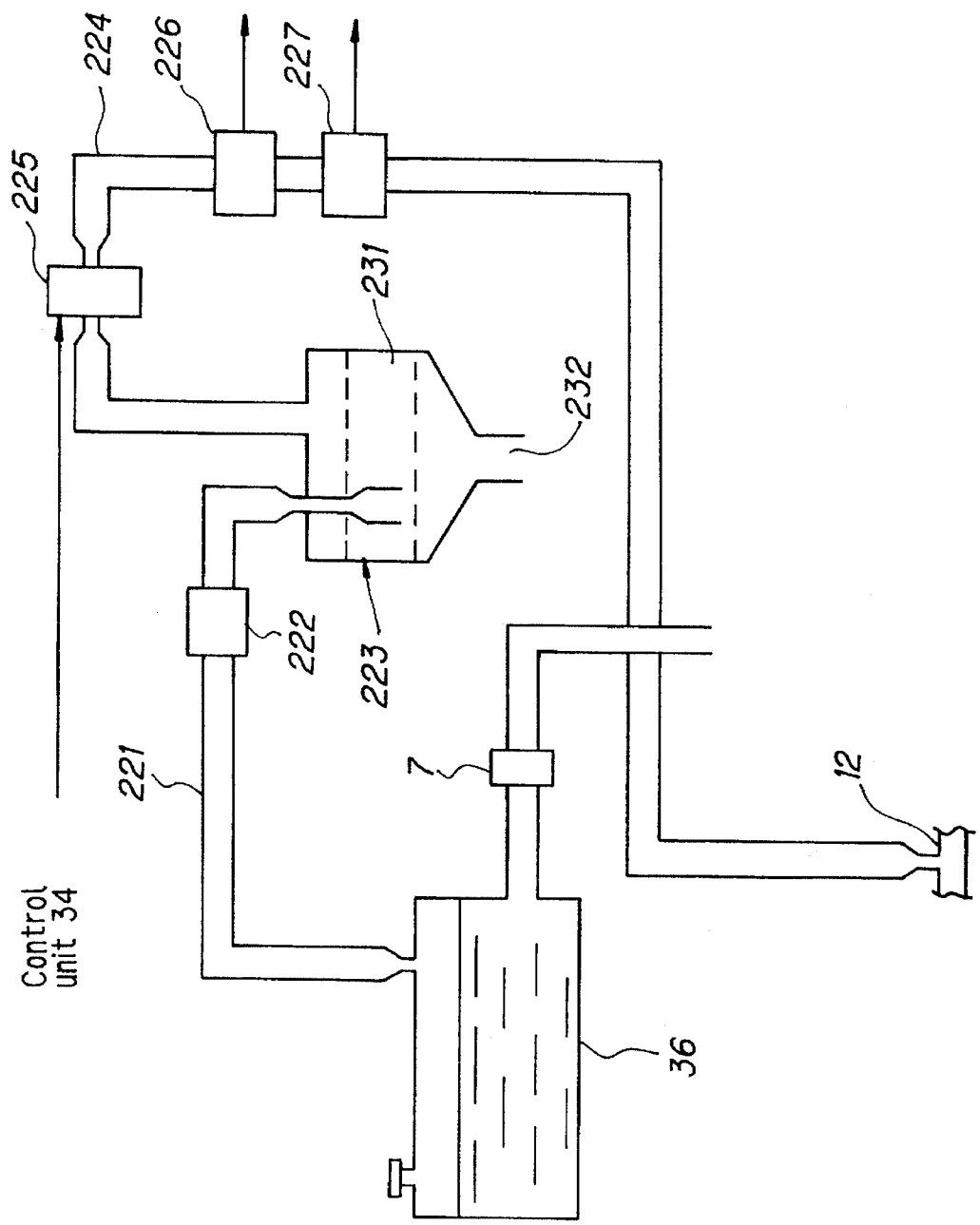
FIG. 3 is a schematic view showing the details of a canister purge mechanism illustrated in FIG. 1.

As shown in FIG. 3, the canister purge mechanism 200, which is provided between the top of the sealed fuel tank 36 and a point on the air intake pipe 12 downstream of the throttle valve 16, comprises a vapor supply pipe 221, a canister 223 containing an absorbent 231, and a purge pipe 224. The vapor supply pipe 221 is fitted with a two-way valve 222, and the purge pipe 224 is fitted with a purge control valve 225, a flow meter 226 for measuring the amount of air-fuel mixture containing fuel vapor flowing through the purge pipe 224, and a hydrocarbon (HC) concentration sensor 227 for detecting the HC concentration of the air-fuel mixture. The purge control valve (solenoid valve) 225 is connected to the control unit 34 and is linearly controlled to the desired degree of opening by a signal from the control unit 34.

When the amount of fuel vapor generated in the fuel tank 36 reaches a prescribed level, it pushes open the positive pressure valve of the two-way valve 222 and flows into the canister 223, where it is stored by absorption in the absorbent 231. Then when the purge control valve 225 is opened to an amount corresponding to the duty ratio of the on/off signal from the control unit 34, the vaporized fuel temporarily stored in the canister 223 and air drawn in through an external air intake 232 are together sucked into the air intake pipe 12 owing to the negative pressure in the air intake pipe 12. On the other hand, when the negative pressure in the fuel tank 36 increases owing to cooling of the fuel tank by the ambient air temperature, for example, the negative valve of the two-way valve 222 opens to allow the vaporized fuel temporarily stored in the canister 223 to return to the fuel tank 36.

Figure 4:
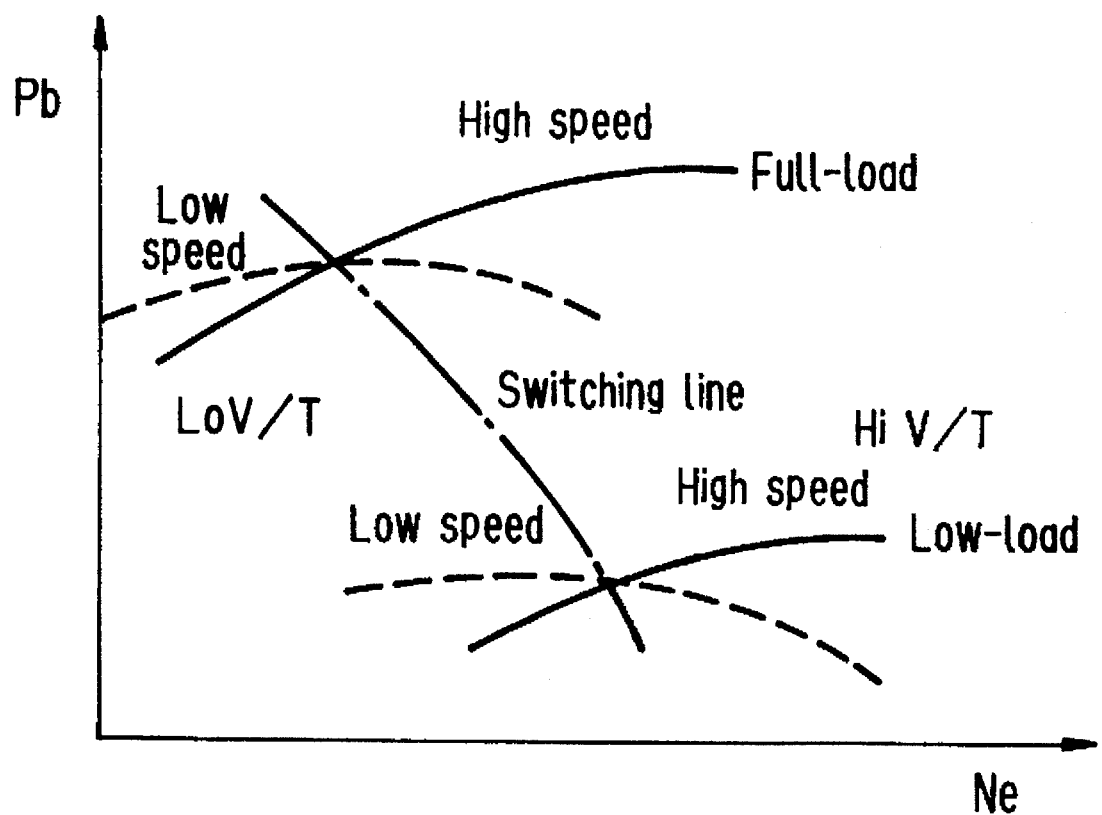
FIG. 4 is a graph showing the valve timing characteristics of a variable valve timing mechanism illustrated in FIG. 1.

The engine 10 is also equipped with a variable valve timing mechanism 300 (denoted as V/T in FIG. 1). As taught by Japanese Laid-open Patent. Application No. Hei 2(1990) –275,043, for example, the variable valve timing mechanism 300 switches the opening/closing timing of the intake and/or exhaust valves between two types of timing characteristics: a characteristic for low engine speed designated LoV/T, and a characteristic for high engine speed designated HiV/T, as illustrated in FIG. 4, in response to engine speed Ne and manifold pressure Pb. Since this is a well-known mechanism, however, it will not be described further here. (Among the different ways of switching between valve timing characteristics is included that of deactivating one of the two intake valves.)

The engine 10 of FIG. 1 is provided in its ignition distributor (not shown) with a crank angle sensor 40 for detecting the piston crank angle and is further provided with a throttle position sensor 42 for detecting the degree of opening of the throttle valve 16, and a manifold absolute pressure sensor 44 for detecting the pressure Pb of the intake manifold downstream of the throttle valve 16 in terms of absolute value. An atmospheric pressure sensor 46 for detecting atmospheric pressure Pa is provided at an appropriate portion of the engine 10, an intake air temperature sensor 48 for detecting the temperature of the intake air is provided upstream of the throttle valve and a coolant temperature sensor 50 for detecting the temperature of the engine coolant is also provided at an appropriate portion of the engine. The engine 10 is further provided with a valve timing (V/T) sensor 52 (not shown in FIG. 1) which detects the valve timing characteristic selected by the variable valve timing mechanism 300 based oil pressure.

Further, an air/fuel sensor 54 constitute an oxygen detector or oxygen sensor is provided in the exhaust pipe 26 at, or downstream of, a confluence point the exhaust system, between the exhaust manifold 24 and catalytic converter 28, where it detects the oxygen concentration in the exhaust gas at the confluence point and produces a corresponding signal (explained later). The outputs o the sensors are sent to the control unit 34.

Figure 5:
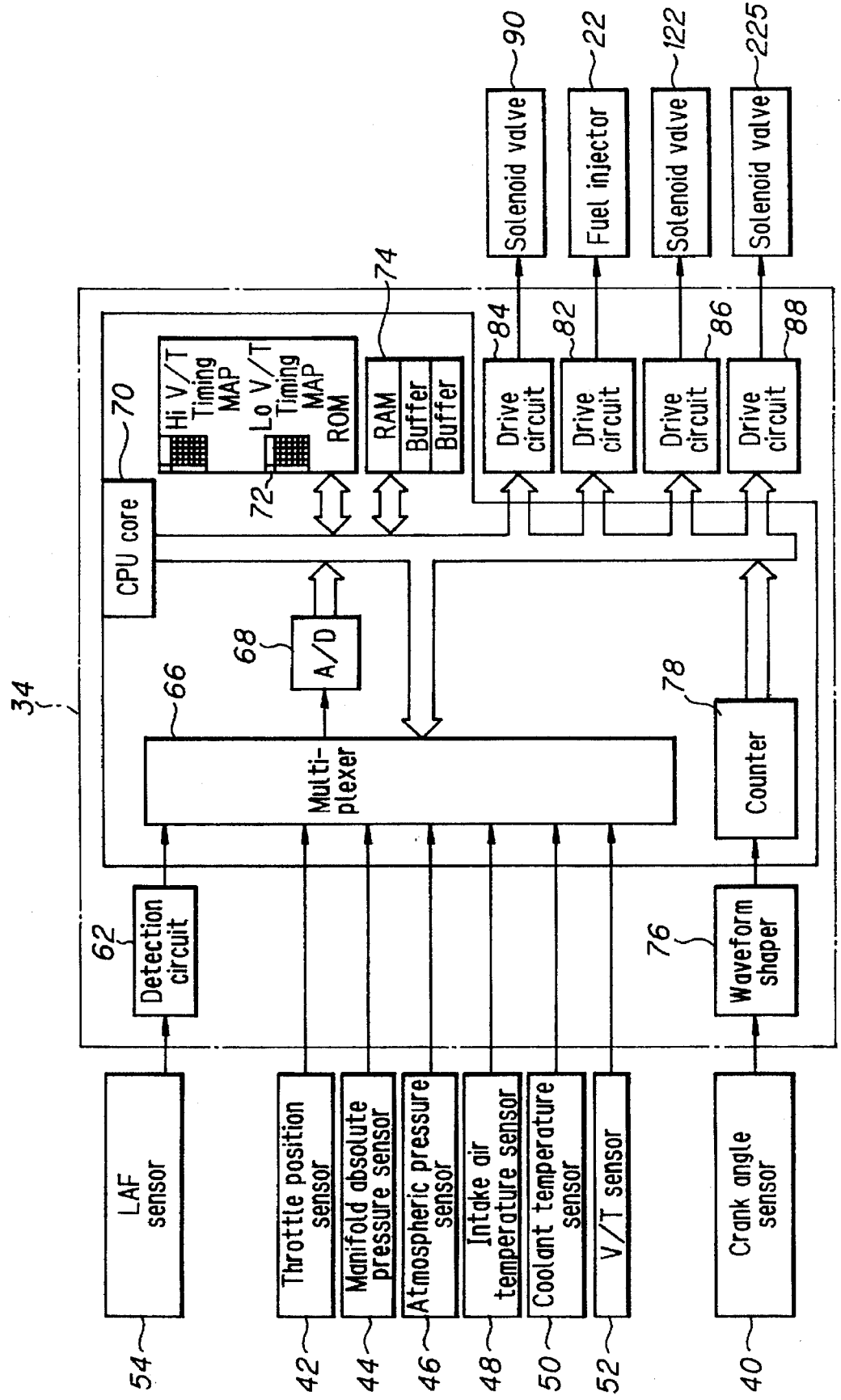
FIG. 5 is a block diagram showing the details of the control unit illustrated in FIG. 1.

Details of the control unit 34 are shown in the block diagram of FIG. 5. The output of the air/fuel ratio sensor 54 is received by a detection circuit 62, where it is subjected to appropriate linearization processing for producing an output characterized in that it varies linearly with the oxygen concentration of the exhaust gas over a broad range extending from the lean side to the rich side. (The air/fuel ratio sensor is denoted as "LAF sensor" in the figure and will be so referred to in the remainder of this specification.)

Figure 49:
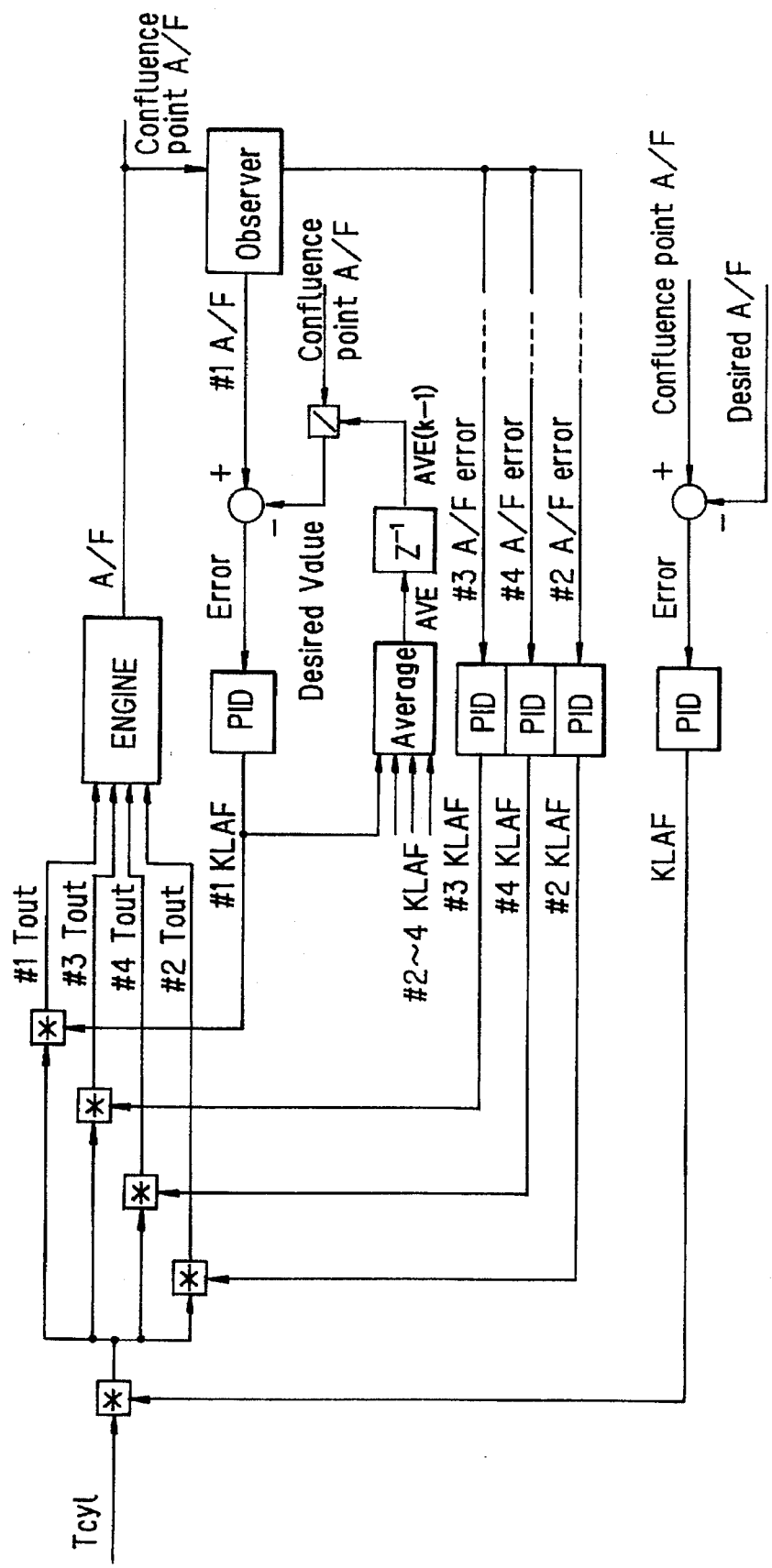
FIG. 49 is a block diagram showing the overall configuration of air/fuel ratio feedback loops in the system.

The output of the detection circuit 62 is forwarded through a multiplexer 66 and an A/D converter 68 to a CPU (central processing unit). The CPU has a CPU core 70, a ROM (read-only memory) 72 and a RAM (random access memory) 74, and the output of the detection circuit 62 is A/D-converted once every prescribed crank angle (e.g., 15 degrees) and stored in buffers of the RAM 74. As shown in FIG. 49 to be discussed later, the RAM 74 has 12 buffers numbered 0 to 11 and the A/D-converted outputs from the detection circuit 62 are sequentially stored in the 12 buffers. Similarly, the analog outputs of the throttle position sensor 42, etc., are input to the CPU through the multiplexer 66 and the A/D converter 68 and stored in the RAM 74.

The output of the crank angle sensor 40 is shaped by a waveform shaper 76 and has its output value counted by a counter 78. The result of the count is InP to the CPU. In accordance with commands stored in the ROM 72, the CPU core 70 computes a manipulated variable in the manner described later and drives the fuel injectors 22 of the respective cylinders via a drive circuit 82. Operating via drive circuits 84, 86 and 88, the CPU core 70 also drives a solenoid valve (EACV) 90 (for opening and closing the bypass 32 to regulate the amount of secondary air), the solenoid valve 122 for controlling the aforesaid exhaust gas recirculation, and the solenoid valve 225 for controlling the aforesaid canister purge. (The lift sensor 123, flow meter 226, and HC concentration sensor 227 are omitted from FIG. 5.)

Figure 6:
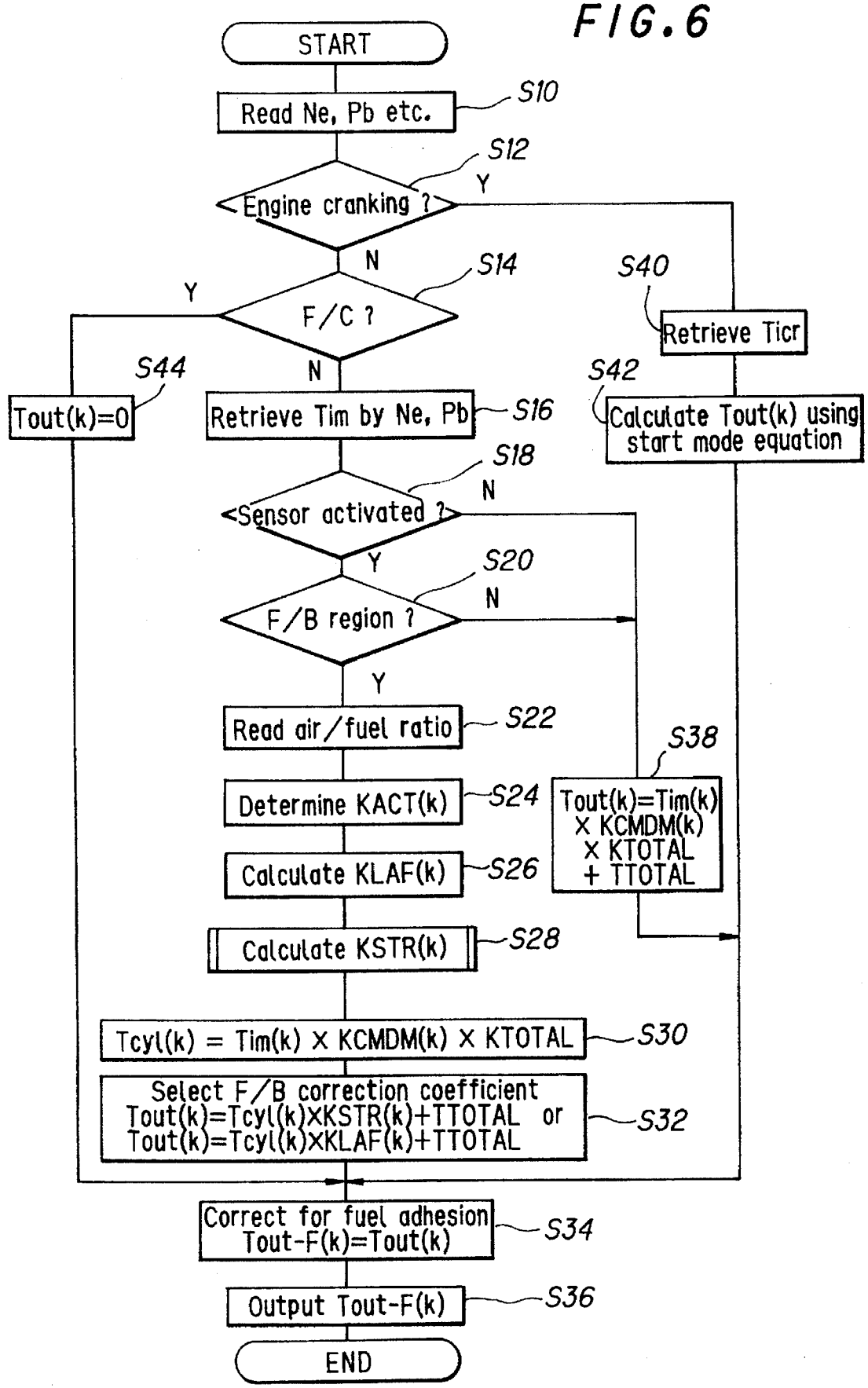
FIG. 6 is a flowchart showing the operation of the system according to the invention.

FIG. 6 is a flowchart showing the operation of the system. The program is activated at a predetermined crank angle such as the TDC of the individual cylinders of the engine, and procedures illustrated therein act as the fuel injection quantity determining means.

The program starts at S10 in which the detected engine speed Ne, the manifold pressure Pb, etc., are read and proceeds to S12 in which it is checked whether or not the engine is cranking, and if it is not, to S14 in which it is checked whether the supply of fuel has been cut off. Fuel cutoff is implemented under specific engine operating conditions, such as when the throttle is fully closed and the engine speed is higher than a prescribed value, at which time the supply of fuel is stopped and open-loop control is effected.

When it is found in S14 that fuel cutoff is not implemented, the program proceeds to S16 in which the basic quantity of fuel injection Tim is calculated by retrieval from a map using the detected engine speed Ne and manifold pressure Pb as address data. Next, the program proceeds to S18 in which it is checked whether activation of the LAF sensor 54 is complete. This is done by comparing the difference between the output voltage and the center voltage of the LAF sensor 54 with a prescribed value (0.4 V, for example) and determining that the activation is complete when the difference is smaller than the prescribed value. When S18 finds that the activation is complete, the program goes to S20 in which it is checked whether the engine operating condition is in a feedback control region. Fuel metering is controlled in an open-loop fashion when the operating condition has changed owing to high engine speed, full-load enrichment or high coolant temperature. When S20 finds that the engine operating condition is in a feedback control region, the program proceeds to S22 in which the output of the LAF sensor is read, and to S24 in which the air/fuel ratio KACT(k) (k: sample number in a discrete time system) is determined or detected. The program then goes to S26 in which a feedback correction coefficient KLAF is calculated using the PID control law.

The feedback correction coefficient KLAF determined by the PID control law is calculated as follows.

First, the control error DKAF between the desired air/fuel ratio KCMD and the detected air/fuel ratio KACT is calculated as:

$$DKAF(k)=KCMD(k-d')-KACT(k).$$

In this equation, KCMD(k-d') is the desired air/fuel ratio (in which d' indicates the dead time before KCMD is reflected in KACT and thus signifies the desired air/fuel ratio before the dead time control cycle), and KACT(k) is the detected air/fuel ratio (in the current control (program) cycle). In this embodiment, however, the calculation is facilitated by representing, in fact, the desired value KCMD and the detected value KACT as the equivalence ratio, namely, as Mst/M=1/lambda (Mst : stoichiometric air/fuel ratio, M=A/F (A: air mass flow rate, F: fuel mass flow rate, and lambda=excess air factor).

Next, the control error DKAF(k) is multiplied by specific coefficients to obtain variables, i.e., the P term KLAFP(k), I term KLAFI(k), and D term KLAFD(k) as P term: $KLAFP(k)=DKAF(k) \times KP$ I term: $KLAFI(k)=KLAFI(k-1)+(DKAF(k) \times KI)$ D term: $KLAFD(k)=(DKAF(k)-DKAF(k-1)) \times KD.$ Thus, the P term is calculated by multiplying the error by the proportional gain KP; the I term is calculated by adding the value of KLAFI (k–1), the feedback correction coefficient in the preceding control cycle (k–1), to the product of the error and the integral gain KI; and the D term is calculated by multiplying the difference between the value of DKAF(k), the error in the current control cycle, and the value of DKAF(k–1), the error in the preceding control cycle (k–1), by the differential gain KD. The gains KP, KI and KD are calculated based on the engine speed and the engine load. coefficient according to the PID control law in the current control cycle, is calculated by summing the thus-obtained values:

$$KLAF(k)=KLAFP(k)+KLAFI(k)+KLAFD(k).$$

It should be noted here that KLAFI(k) includes an offset of 1.0 so that the value KLAF is a multiplicative correction coefficient. In other words, the initial value of KLAFI is set to be 1.0.

The program then moves to S28 of the subroutine of FIG. 6, in which a feedback correction coefficient KSTR(k) is determined using the adaptive control law. The feedback correction coefficient KSTR(k) determined using the adaptive control law will be explained in detail later.

The program next proceeds to S30 in which the quantity of fuel injection named Tcyl(k) is determined by multiplying the calculated value of the basic quantity of fuel injection Tim by a desired air/fuel ratio correction coefficient named KCMDM(k) (explained later) and a correction coefficient KTOTAL (which is the product of various other multiplication coefficients for correcting for coolant temperature and the like). The quantity Tcyl(k) is expected to be the quantity required by the internal combustion engine so that it is hereinafter referred to as the "required quantity of fuel injection Tcyl". The desired air/fuel ratio is, in fact, expressed as the equivalence ratio in the control, as was mentioned earlier, and the equivalence ratio is used as the correction coefficient for the quantity of fuel injection. More specifically, since the charging efficiency of the intake air differs depending on the heat of vaporization, the desired air/fuel ratio is corrected for charging efficiency according to an appropriate characteristic so as to obtain the desired air/fuel ratio correction coefficient KCMDM.

The program then goes to S32 in which the required quantity of fuel injection Tcyl(k) is multiplied by either the feedback correction coefficient KLAF(k) calculated in S26, or the feedback correction coefficient KSTR(k) calculated in S28 and an addition term TOTAL is added to the product to obtain an output quantity of fuel injection Tout(k). TTOTAL indicates the total value of the various corrections for atmospheric pressure etc. conducted by addition terms (but does not include the fuel injector dead time, etc., which is added separately at the time of outputting the output quantity of fuel injection Tout).

Next, in S34, the determined output quantity of fuel injection Tout(k) is corrected using a fuel adhesion coefficient retrieved from a fuel adhesion coefficient map employing the engine coolant temperature, etc., as address data, thereby correcting the output quantity of fuel injection Tout(k) for fuel adhesion on the all of the intake manifold (the value corrected for fuel adhesion being defined as the final output quantity of fuel injection Tout-F(k)). Since the correction for fuel adhesion on the wall of the intake manifold is not directly related to the principle of this invention, however, it will not be explained here. The program then proceeds to S36 in which the final output quantity of fuel injection corrected for fuel adhesion, Tout-F(k), is output, thus completing the control cycle.

When the result in S18 or S20 is NO, the program goes to S38 in which the basic quantity of fuel injection Tim(k)

is multiplied by the desired air/fuel ratio correction coefficient KCMDM(k) and the correction coefficient KTOTAL, and the addition correction coefficient TTOTAL is added to the resulting product to obtain the output quantity of fuel injection Tout, and then proceeds to S34 and S36. If S12 finds that the engine is cranking, the program goes to S40 in which the quantity of fuel injection at cranking Ticr is retrieved, and then to S42 in which Ticr is used to calculate the output quantity of fuel injection Tout based on a start mode equation. If S14 finds that fuel cutoff is in effect, the output quantity of fuel injection Tout is set to 0 in S44.

The manner in which the feedback correction coefficient KSTR, referred to in connection with S28 of the flowchart of FIG. 6, is determined using the adaptive control law will now be explained.

Figure 7:
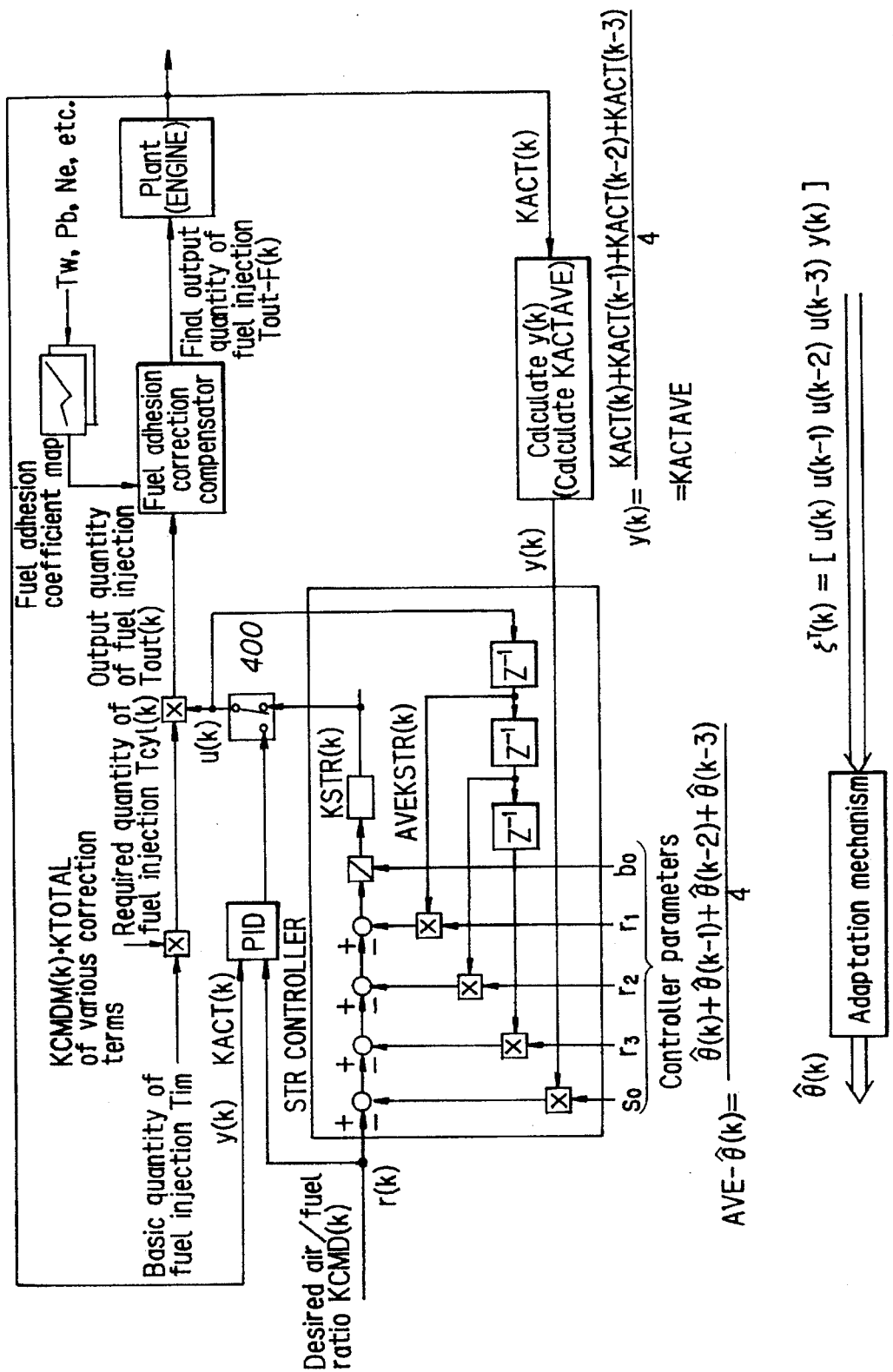
FIG. 7 is a block diagram showing the configuration of the system, whose operation is illustrated in FIG. 6, for fuel metering control having an adaptive controller

FIG. 7 is a block diagram showing the operation concerned in more functional terms.

The illustrated system is based on adaptive control technology proposed earlier application by the assignee. It comprises an adaptive controller constituted as an STR (self-tuning regulator) controller (controller means) and an adaptation mechanism (adaptation mechanism means) (system parameter estimator) for estimating/identifying the controller parameters (system parameters)(dynamic engine characteristic parameters) $\hat{\theta}$. The desired value and the controlled variable (plant output) of the fuel metering feedback control system are input to the STR controller, which receives the coefficient vector $\hat{\theta}$ estimated/identified by the adaptation mechanism, and generates the control input.

One identification or adaptation law (algorithm) available for adaptive control is that proposed by I. D. Landau et al. The adaptive control system is non linear in characteristic so that a stability problem is inherent. In the adaptation law proposed by I. D. Landau et al, the stability of the adaptation la expressed in a recursion formula is ensured at least using Lyapunov's theory or Popov's hyperstability theory. This method is described in, for example, *Computrol* (Corona Publishing Co., Ltd.) No. 27, pp. 28–41; *Automatic Control Handbook* (Ohm Publishing Co., Ltd.) pp. 703–707; "A Survey of Model Reference Adaptive Techniques—Theory and Applications" by I. D. Landau in *Automatica*, Vol. 10, pp. 353–379; "Unification of Discrete Time Explicit Model Reference Adaptive Control Designs" by I. D. Landau et al. in *Automatica*, Vol. 17, No. 4, pp. 593–611; and "Combining Model Reference Adaptive Controllers and Stochastic Self-tuning Regulators" by I. D. Landau in *Automatica*, Vol. 18, No. 1, pp. 77–84.

The adaptation or identification algorithm of I. D. Landau et al. was used in the assignee's earlier proposed adaptive control technology. In this adaptation or identification algorithm, when the polynomials of the denominator and numerator of the transfer function $B(Z^{-1})/A(Z^{-1})$ of the discrete controlled system are defined in the manner of Eq. 1-1 and Eq. 1-2 shown below, then the controller parameters or system (adaptive) parameters $\hat{\theta}(k)$ are made up of parameters as shown in Eq. 1-3 and are expressed as a vector (transpose vector). And the input zeta (k) to the adaptation mechanism becomes that shown by Eq. 1-4. Here, there is taken as an example a plant in which m=1, n=1 and d=3, namely, the plant model is given in the form of a linear system with three control cycles of dead time.

$$A(z^{-1}) = 1 + a_1 z^{-1} + \ldots + a_n z^{-n} \qquad \text{Eq. 1-1}$$

$$B(z^{-1}) = b_0 + b_1 z^{-1} + \ldots + b_m z^{-m} \qquad \text{Eq. 1-2}$$

$$\begin{aligned}
\hat{\theta}^T(k) &= [\hat{b}_0(k), \hat{B}_r(z^{-1},k), \hat{S}(z^{-1},k)] & \text{Eq. 1-3} \\
&= [\hat{b}_0(k), \hat{r}_1(k), \ldots, r_{m+d-1}(k), s_0(k), \ldots, s_{n-1}(k)] \\
&= [b_0(k), r_1(k), r_2(k), r_3(k), s_0(k)]
\end{aligned}$$

$$\begin{aligned}
\zeta^T(k) &= [u(k), \ldots, u(k-m- & \text{Eq. 1-4} \\
&\quad d+1), y(k), \ldots, y(k-n+1)] \\
&= [u(k), u(k-1), u(k-2), u(k-3), y(k)]
\end{aligned}$$

The controller parameters (vector) $\hat{\theta}(k)$ is calculated by Eq. 2 below. In Eq. 2, $\Gamma(k)$ is a gain matrix (the (m+n+d)th order square matrix) that determines the estimation/identification rate or speed of the controller parameters $\hat{\theta}$, and e asterisk (k) is a signal indicating the generalized estimation/identification error, i.e., an estimation error signal of the controller parameters. They are represented by recursion formulas such as those of Eqs. 3 and 4.

$$\hat{\theta}(k) = \hat{\theta}(k-1) + \Gamma(k-1)\zeta(k-d)e^*(k) \qquad \text{Eq. 2}$$

$$\Gamma(k) = \frac{1}{\lambda_1(k)} \left[ \Gamma(k-1) - \frac{\lambda_2(k)\Gamma(k-1)\zeta(k-d)\zeta^T(k-d)\Gamma(k-1)}{\lambda_1(k) + \lambda_2(k)\zeta^T(k-d)\Gamma(k-1)\zeta(k-d)} \right] \qquad \text{Eq. 3}$$

$$e^*(k) = \frac{D(z^{-1})y(k) - \hat{\theta}^T(k-1)\zeta(k-d)}{1 + \zeta^T(k-d)\Gamma(k-1)\zeta(k-d)} \qquad \text{Eq. 4}$$

Various specific algorithms are given depending on the selection of lambda 1 and lambda 2 in Eq. 3. lambda 1(k)=1, lambda 2(k)=lambda (0<lambda <2) gives the gradually-decreasing gain algorithm (least-squares method when lambda=1); and lambda 1(k)=lambda 1 (0<lambda 1<1), lambda 2(k)=lambda 2 (0<lambda 2<lambda) gives the variable-gain algorithm (weighted least-squares method when lambda 2=1). Further, defining lambda 1(k)/lambda 2(k)=σ and representing lambda 3 as in Eq. 5, the constant-trace algorithm is obtained by defining lambda 1(k)=lambda 3(k). Moreover, lambda 1(k)=1, lambda 2(k) =0 gives the constant-gain algorithm. As is clear from Eq. 3, in this case $\Gamma(k)=\Gamma(-1)$, resulting in the constant value $\Gamma(k)=\Gamma$.

$$\lambda_3(k) = 1 - \frac{\|\Gamma(k-1)\zeta(k-d)\|^2}{\sigma + \zeta^T(k-d)\Gamma(k-1)\zeta(k-d)} \cdot \frac{1}{tr\Gamma(0)} \qquad \text{Eq. 5}$$

In the diagram of FIG. 7, the STR controller (adaptive controller) and the adaptation mechanism (system parameter estimator) are placed outside the system for calculating the quantity of fuel injection (fuel injection quantity determining means) and operate to calculate the feedback correction coefficient KSTR(k) so as to adaptively bring the detected value KACT(k) to the desired value KCMD(k-d') (where, as mentioned earlier, d' is the dead time before KCMD is reflected in KACT). In other words, the STR controller receives the coefficient vector $\hat{\theta}(k)$ adaptively estimated/identified by the adaptive mechanism and forms a feedback compensator (feedback control loop) so as to bring it to the desired value KCMD(k-d'). The required quantity of fuel injection Tcyl(k) is multiplied by the calculated feedback correction coefficient KSTR(k), and the corrected quantity of fuel injection is supplied to the controlled plant (internal combustion engine) as the output quantity of fuel injection Tout(k), more precisely Tout-F(k).

Thus, the feedback correction coefficient KSTR(k) and the detected air/fuel ratio KACT(k) are determined and input to the adaptation mechanism, which calculates/estimates the controller parameter (vector) $\hat{\theta}(k)$ for input to the STR controller. Based on these values, the STR controller uses the recursion formula to calculate the feedback correction coefficient KSTR(k) so as to bring the detected air/fuel ratio KACT(k) to the desired air/fuel ratio KCMD(k–d'). The feedback correction coefficient KSTR(k) is specifically calculated as shown by Eq. 6:

$$KSTR(k) = \frac{KCMD(k-d') - s_0 xy(k) - r_1 \times KSTR(k-1) - r_2 \times KSTR(k-2) - r_3 \times KSTR(k-3)}{b_0} \quad \text{Eq. 6}$$

On the other hand, the detected value KACT(k) and the desired value KCMD(k) are also input to the PID controller (denoted as PID in FIG. 7), which calculates the second feedback correction coefficient KLAF(k) based on the PID control law explained in connection with S26 of the flowchart of FIG. 6 so as to eliminate the error between the detected value at the exhaust system confluence point and the desired value. One or the other of the feedback correction coefficient KSTR obtained by the adaptive control law and the PID correction coefficient KLAF obtained using the PID control law is selected by a switching mechanism 400 shown in FIG. 7 for use in calculating the quantity of fuel injection. When it is discriminated in the manner explained later that the operation of the adaptive control system (the STR controller) is unstable or when the engine operating condition is outside the operation region of the adaptive control system, the feedback correction coefficient KLAF calculated using the PID control law is used instead of the feedback correction coefficient KSTR determined using the adaptive control law.

Figure 56:
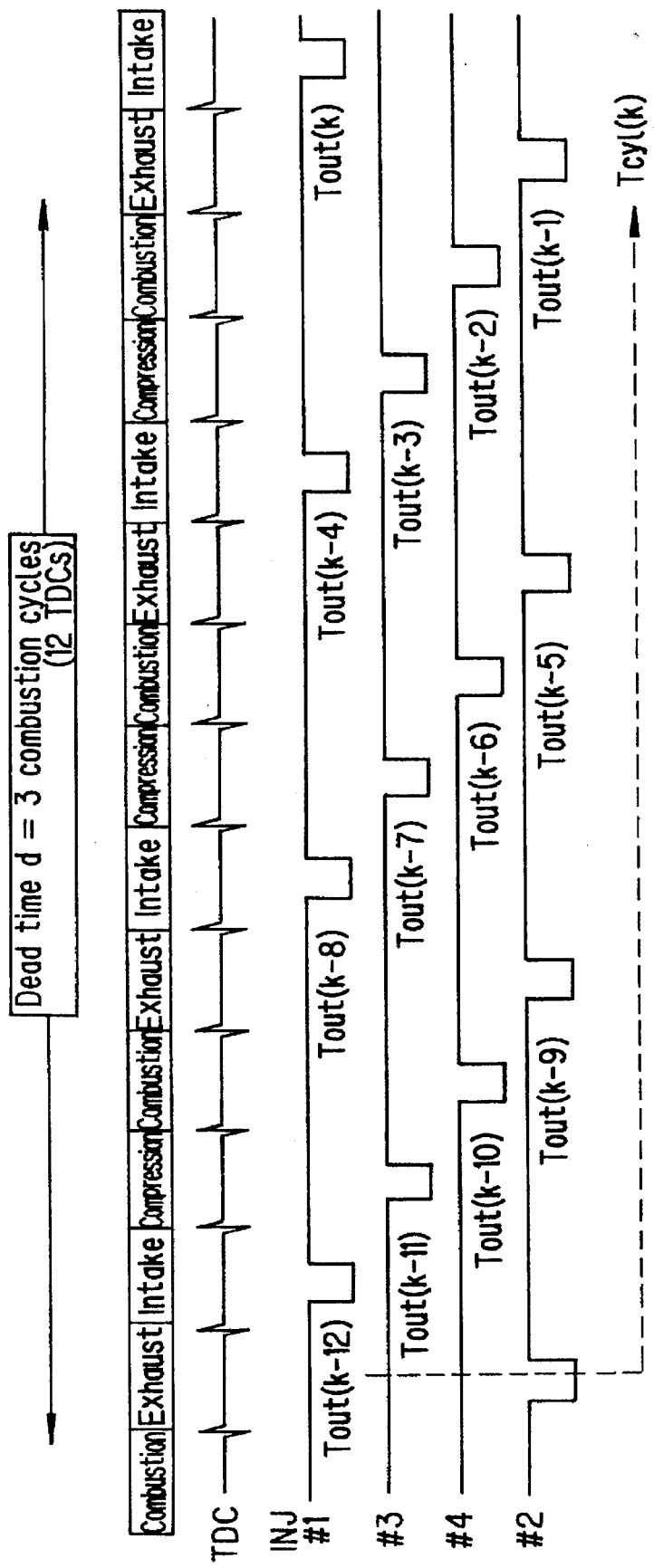
FIG. 56 is a timing chart showing the dead time in fuel metering control in an internal combustion engine.
Figure 57:
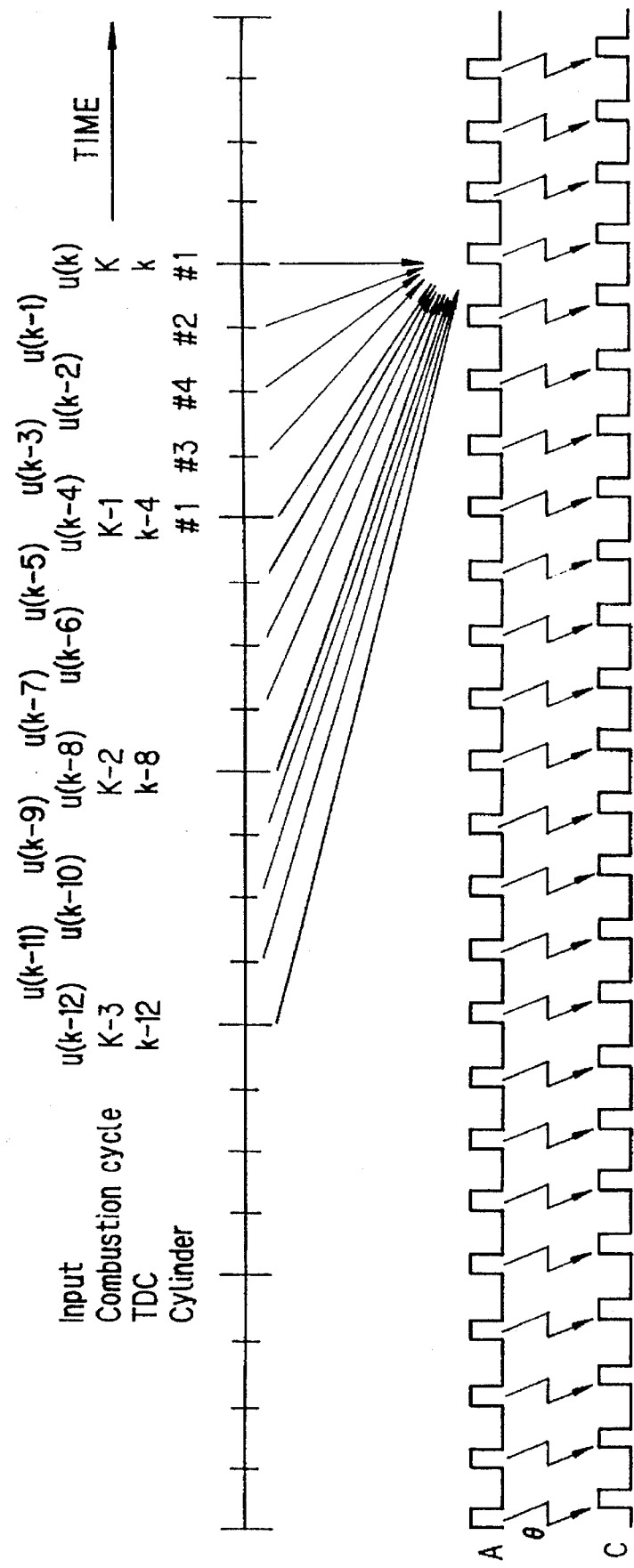
FIG. 57 is a timing chart, similar to FIG. 8, but showing the operation of the adaptive controller we proposed previously.

As will be understood from FIG. 56, when the fuel metering is controlled in an internal combustion engine, a certain amount of time is required for calculating the quantity of fuel injection, compressing and combusting the resulting air-fuel mixture in the cylinder and then discharging the exhaust gas out of the cylinder. Additional time is needed for the exhaust gas to reach the LAF sensor, for the sensor to produce a corresponding output (because of the sensor detection delay) and for the control system to calculate the actual amount of fuel drawn into the cylinder based on the detected value. The total of this time, called the "dead time," is an unavoidable aspect of controlling the quantity of fuel injection in internal combustion engines. When the dead time for any given cylinder is, for example three of the aforesaid combustion cycles, then in terms of TDC it becomes 12 TDCs in a four-cylinder engine, as illustrated in FIG. 57. Here, the term "combustion cycle" is used to mean one cycle of all four-strokes including a series of intake, compression, expansion and exhaust that corresponds to 4 TDCs in the four-cylinder engine.

In the aforesaid adaptive controller (STR controller), the number of elements of the controller parameters $\hat{\theta}$ is m+n+d, as is clear from Eq. 1–3, and thus increases with the dead time $\underline{d}$. Assuming that the dead time is 3, as in the preceding example, and that the STR controller and the adaptation mechanism are operated synchronously with TDC so as to respond to the instant-by-instant changes in the engine operating condition, $\underline{d}$ becomes 12 (three combustion cycles ×4TDCs; u(k) to u(k–12)) so that even when m=n=1, the number of elements (m+n+d) of the controller parameters $\hat{\theta}$ becomes 14. Since a 14×14 gain matrix Γ, etc., therefore has to be calculated, an on-board computer of ordinary performance becomes unable to complete the calculation within a single TDC at higher engine speeds. Moreover, increasing the number of dead time TDCs degrades the control performance.

In view of the above, the invention is figured such that the STR controller is operated synchronously with a prescribed crank angle of the individual four cylinders, e.g., every TDC, while the controlled variable (plant output) y is input to the adaptation mechanism once per combustion cycle, e.g., at a prescribed crank angle such as the TDC at a certain cylinder such as #1 cylinder among four cylinders. Saying this again with reference to FIG. 8, the system is configured such that the adaptation mechanism (abbreviated as "A" in the figure) and the STR controller (abbreviated as "C" in the same) operate at every TDC, but the input to the adaptation mechanism is only implemented once per combustion cycle, i.e., at every 4 TDCs. Although, at the time of calculating the controller parameters, a 14×14 matrix has to be calculated when every plant output (controlled variable) y is input to the adaptation mechanism, only a 5×5 matrix need be calculated when the controlled variable is thus input once per combustion cycle.

Figure 8:
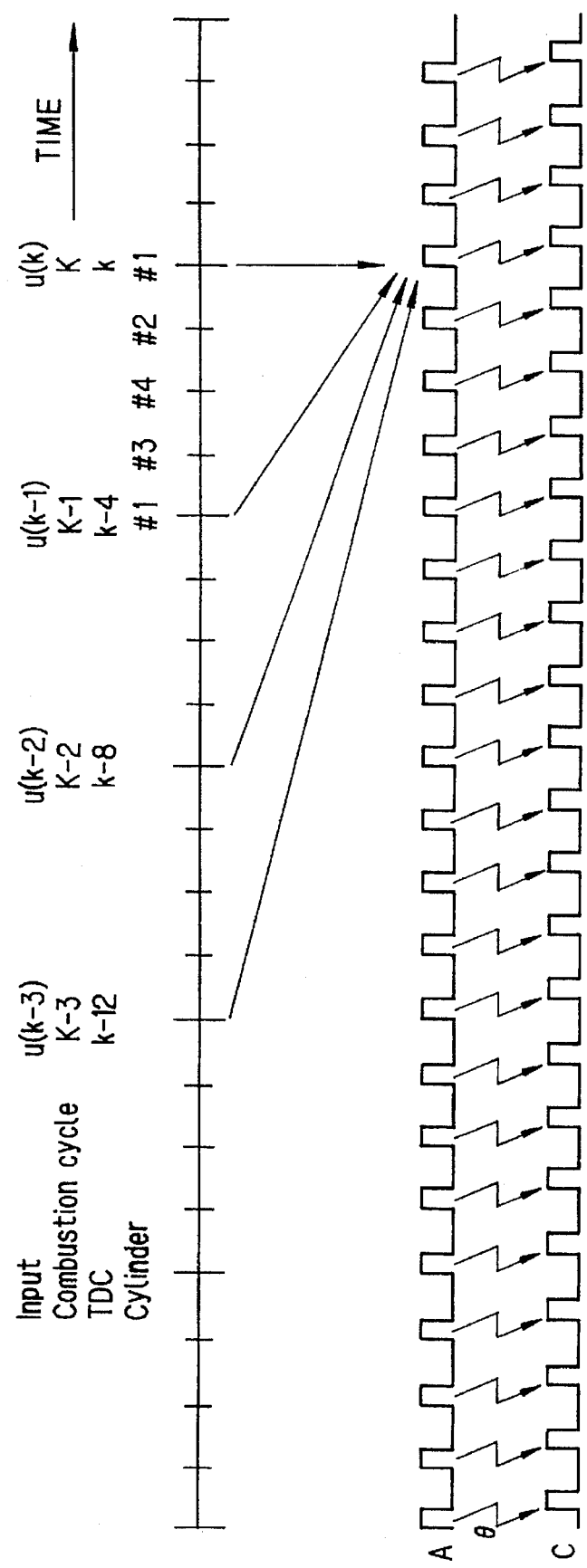
FIG. 8 is a timing chart showing the operation of the adaptive controller illustrated in FIG. 7.

Thus, as shown in FIG. 8, when the input y to the adaptation mechanism is synchronized with the combustion cycle (4 TDCs), it follows that d=3 (i.e., u(k) to u(k–z3)), the number of elements in the controller parameters $\hat{\theta}$ becomes m+n+d=5, the gain matrix Γ to be calculated is reduced to a 5×5 matrix, and the load on an on-board computer can be reduced to a level enabling the calculation to be completed within one TDC. The illustrated fuel metering control system for an internal combustion engine is therefore designed to respond to the instant-by-instant changes in engine operating conditions to the utmost possible and, further, to reduce the matrix calculation volume so as to decrease the load on the on-board ordinary performance computer.

Specifically, this can be realized by defining the control cycle $\underline{k}$ of Eqs. 1 to 6 for each cylinder. In the case of a four-cylinder engine, it is possible by rewriting Eq. 1–4 as Eq. 7, Eq. 2 as Eq. 8, Eq. 3 as Eq. 9, and Eqs. 4 to 6 as Eqs. 10 to 12.

$$\zeta(k) = [u(k)\; u(k-4)\; u(k-8)\; u(k-12)\; y(k)] \quad \text{Eq. 7}$$

$$\hat{\theta}(k) = \hat{\theta}(k-4) + \Gamma(k-4)\zeta(k-4d)e^*(k) \quad \text{Eq. 8}$$

$$\Gamma(k) = \frac{1}{\lambda_1(k)}\left(\Gamma(k-4) - \frac{\lambda_2(k)\Gamma(k-4)\zeta(k-4d)\zeta^T(k-4d)\Gamma(k-4)}{\lambda_1(k) + \lambda_2(k)\zeta^T(k-4d)\Gamma(k-4)\zeta(k-4d)}\right) \quad \text{Eq. 9}$$

$$e^*(k) = \frac{D(z^{-1})y(k) - \hat{\theta}^T(k-4)\zeta(k-4d)}{1 + \zeta^T(k-4d)\Gamma(k-4)\zeta(k-4d)} \quad \text{Eq. 10}$$

$$\lambda_3(k) = 1 - \frac{\|\Gamma(k-4)\zeta(k-4d)\|^2}{\sigma + \zeta^T(k-4d)\Gamma(k-4)\zeta(k-4d)} \cdot \frac{1}{tr\Gamma(0)} \quad \text{Eq. 11}$$

$$KSTR(k) = \frac{KCMD(k-d') - s_0 \times KACT(k) - r_1 \times KSTR(k-4) - r_2 \times KSTR(k-8) - r_3 \times KSTR(k-12)}{b_0} \quad \text{Eq. 12}$$

By this, it is possible to define one control cycle per TDC, namely, to calculate the controller parameters synchronously with TDC, while reducing the degree of the matrices and vectors used in the calculations. Similar operations can of course be realized by using a configuration in which the control cycle $\underline{k}$ of Eqs. 1 to 6 is replaced by K=number of cylinders×k ($\underline{K}$: TDC, $\underline{K}$: combustion cycle (=number of cylinders×k)).

Figure 9:
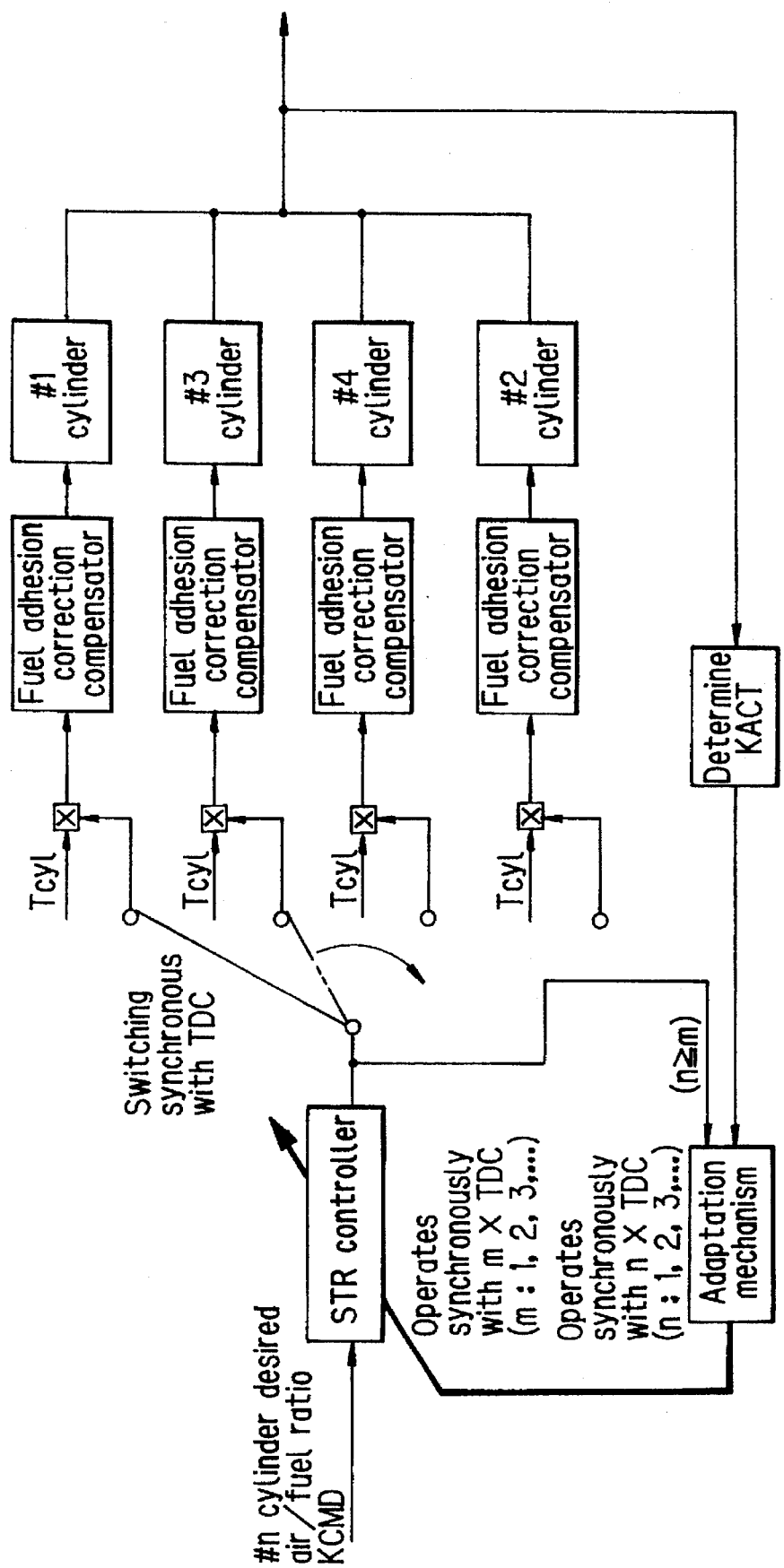
FIG. 9 is a block diagram showing a portion of the configuration redrawn from FIG. 7 with emphasis on the adaptive controller.

By the foregoing, the number of elements of the controller parameters $\hat{\theta}$ can be held to 5, whereby the gain matrix Γ to be calculated is reduced to a 5×5 matrix. As a result, the processing load decreases to the point that the calculation can be completed within one TDC interval by an ordinary on-board computer. The configuration of FIG. 7 is redrawn in FIG. 9 with emphasis on the STR controller and the adaptation mechanism. As pointed out before, a controlled system with a large dead time generally has poorer control performance than one with a small dead time, particularly in the case of adaptive control. In the above, the dead time is greatly reduced, thereby enhancing control performance.

On the other hand, since synchronizing the input to the adaptation mechanism with the combustion cycle amounts to synchronizing the input with a prescribed crank angle of a specific (certain) cylinder such as #1 cylinder, the system is constantly and strongly affected by the detected air/fuel ratio of the specific cylinder. During stoichiometric air/fuel ratio control or the like, therefore, when, for example, the detected air/fuel ratio of the specific cylinder is on the lean side and that of the remaining cylinders is on the rich side, the adaptive controller (STR controller) will adjust the manipulated variable in the rich direction to bring it to the desired value, with the result that the air/fuel ratios of the remaining cylinders will become even richer.

Because of this, the illustrated system is designed so as not to be strongly affected by the detected air/fuel ratio of a specific cylinder, notwithstanding that the input to the adaptation mechanism is synchronized with the combustion cycle so as to reduce the number of controller parameter elements and decrease the matrix calculation volume. For realizing this, the operation is implemented in the following manner.

Specifically, although the input to the adaptation mechanism is synchronized with the combustion cycle, meaning that it is synchronized with a prescribed crank angle of a specific one of the four cylinders, it is configured that an average such as a simple average of the controlled variables y input to the adaptation mechanism, the detected air/fuel ratios KACT or the outputs $\hat{\theta}$ from the adaptation mechanism or the outputs from the STR controller (feedback correction coefficients KSTR) at a prescribed crank angle, e.g. TDC, of the individual cylinders during the combustion cycle, is calculated and used. The system is therefore not greatly affected by the detected air/fuel ratio of the specified cylinder.

Here, the average of the controller parameters $\hat{\theta}$ or the feedback correction coefficient KSTR(k) need not always be input to the adaptation mechanism. This is because, the feedback correction coefficient KSTR(k), calculated at the STR controller using the average of the controller parameters $\hat{\theta}$, becomes a value that could not be affected greatly by the air/fuel ratio at a specific cylinder. For the same reason, the average of the feedback correction coefficient itself also becomes a value that could similarly be not affected by the air/fuel ratio of a specific cylinder.

Figure 10:
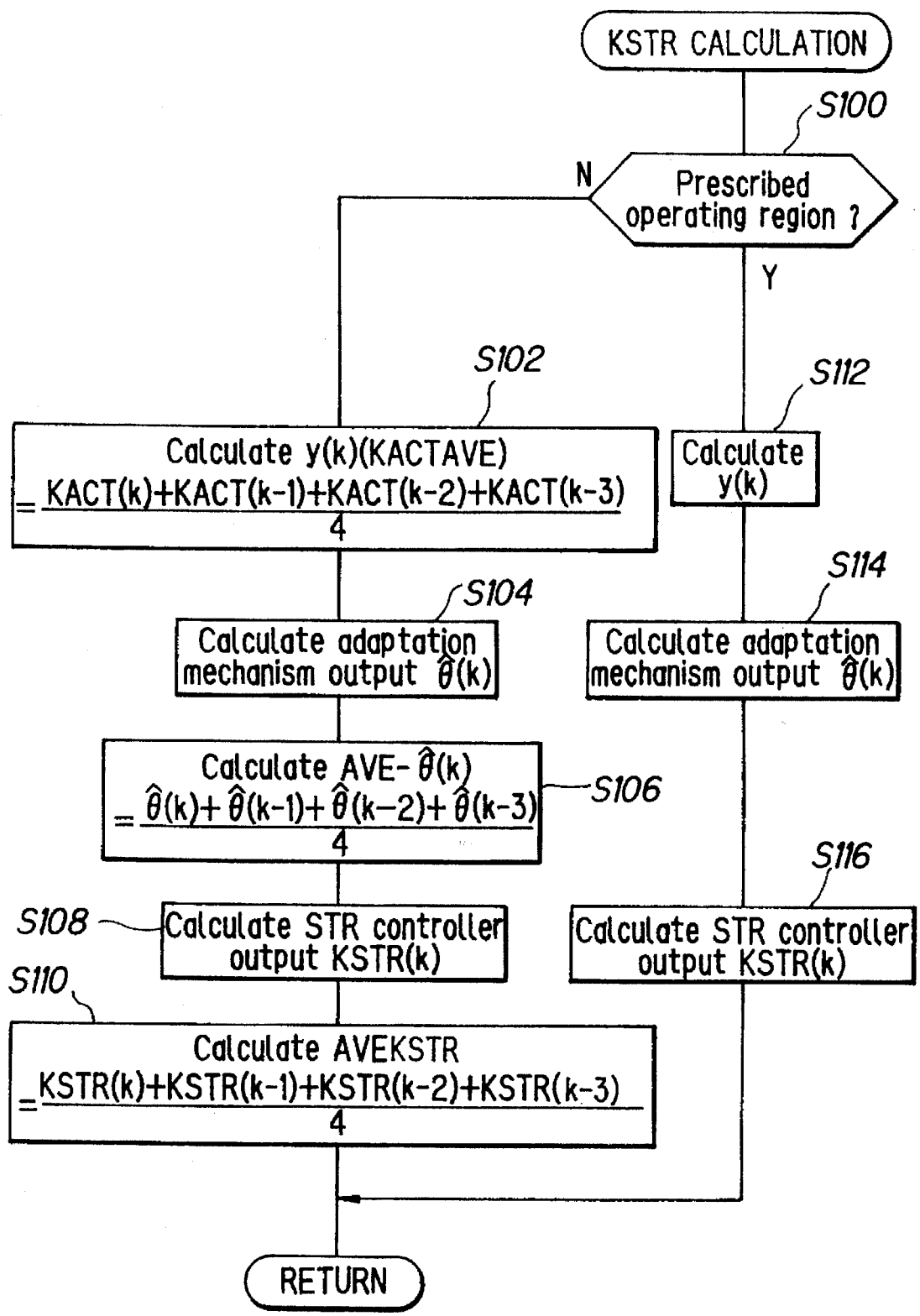
FIG. 10 is a subroutine flowchart of FIG. 6 showing the calculation of one of the feedback correction coefficients determined by the adaptive controller.

The subroutine for this calculation is shown by the flowchart of FIG. 10.

The subroutine begins at S100 in which it is checked whether the engine is in a prescribed operating region. As termed here, "prescribed operating region" refers to low engine-speed regions including the idling region. When S100 finds that the engine is not in a prescribed operating region, the program proceeds to S102 which calculates the controlled variable y(k) (plant output) as the average KACTAVE of the detected value KACT(k) calculated for the cylinder concerned in S24 of the flowchart of FIG. 6 in the current control cycle and the values KACT(k–1), KACT(k–2) and KACT(k–3) calculated in the same step one, two and three control cycles earlier for the cylinders that fired one, two and three cycles earlier. In other words, S102 goes back three cycles and calculates the simple average of the air/fuel ratios, each calculated during one combustion cycle, for four cylinders up to and including the current cylinder and the result is defined as the controlled variable y(k). This method reduces the effect of the detected air/fuel ratio of a specific cylinder.

The program then moves to S104 in which, as shown at the bottom of FIG. 7, the adaptation mechanism calculates the controller parameters $\hat{\theta}(k)$ from the Just calculated controlled variable y(k), etc., according to Eq. 1–3 and sends the result to the STR controller.

The program next advances to S106 which calculates the average, e.g., the simple average, of the values of the controller parameters $\hat{\theta}$ calculated in the four control cycles up to and including the current control cycle (the simple average of $\hat{\theta}(k)$, $\hat{\theta}(k-1)$, $\hat{\theta}(k-2)$ and $\hat{\theta}(k-3)$ during one combustion cycle) as AVE-$\hat{\theta}(k)$. In other words, the average of the values of the controller parameters $\hat{\theta}$ for four (fuel metering) control cycles (=4 TDCs=one combustion cycle) corresponding to four cylinders is calculated on the output side, not on the input side, of the adaptation mechanism and input to the STR controller. Here, the control cycle is used as the same meaning as the prescribed crank angle (e.g., TDC), since fuel metering is controlled at the same crank angle as the prescribed crank angle.

This method also achieves the desired reduction in the effect of the detected air/fuel ratio of the specific cylinder by inputting the average value of $\hat{\theta}$ for four cylinders to the STR controller. Since $\hat{\theta}$ is calculated as a vector as is expressed in Eq. 1–3, the average AVE $\hat{\theta}$ can be obtained by calculating averages of respective vector elements, i.e., r1, r2, r3 and b0. The equation in S106 is used to mean this calculation. It can alternatively be made by calculating the average of one element such as b0 and by multiplying the other elements by the calculated average.

The program proceeds to S108 in which the STR controller calculates the feedback correction coefficient KSTR from the input value according to Eq. 6, and to S110 which calculates the average, e.g., the simple average AVE-KSTR (k), of the values of the feedback correction coefficient KSTR calculated in the four control cycles up to and including the current control cycle (the simple average of KSTR(k), KSTR(k–1), KSTR(k–2) and KSTR(k–3) during one combustion cycle). In other words, the desired reduction in the effect of the detected air/fuel ratio of a specific cylinder can be achieved by calculating the average of the values of KSTR for four control cycles (one combustion cycle) corresponding to four cylinders, not on the adaptation mechanism side, but with respect to the STR controller which outputs KSTR(k) constituting the feedback correction coefficient of the fuel injection determining system.

On the other hand, when S100 finds that the engine is in the prescribed operating region, the program goes to S112 in which y(k) is calculated, namely, in which the air/fuel ratio KACT(k) calculated for the cylinder concerned in S24 of the flowchart of FIG. 3 in the current control cycle is used without modification as the controlled variable (plant output). The program then goes to S114 in which controller parameters (k) is calculated and to S116 in which the feedback correction coefficient KSTR(k) is calculated.

Since the average of the air/fuel ratios for all cylinders is therefore input to the adaptation mechanism as the controlled variable y(k), the STR controller is not greatly affected by the detected air/fuel ratio of a specific cylinder (e.g., the first cylinder). Also, as regards the output of the STR controller, since the signal vector zeta input to the adaptation mechanism is calculated using the outputs of KSTR for four control cycles up to and including the most recent value u(k) (=KSTR(k)), the effect of the detected air/fuel ratio of a specific cylinder is even further reduced.

Moreover, since the average of the values of $\hat{\theta}$ for four control cycles (one combustion cycle) corresponding to four cylinders is calculated not with respect to the input side of the adaptation mechanism but with respect to the controller parameters θ̂(k) on the output side thereof and the result is input to the STR controller, the desired reduction in the effect of the detected air/fuel ratio of a specific cylinder can be achieved owing to this smoothing. In addition, since the average of the values of KSTR for four control cycles (one combustion cycle) is calculated not with respect to the adaptation mechanism side but with respect to the STR controller which outputs the feedback correction coefficient KSTR(k) of the fuel injection quantity determination system, the effect of the detected air/fuel ratio can be similarly reduced.

Figure 11:
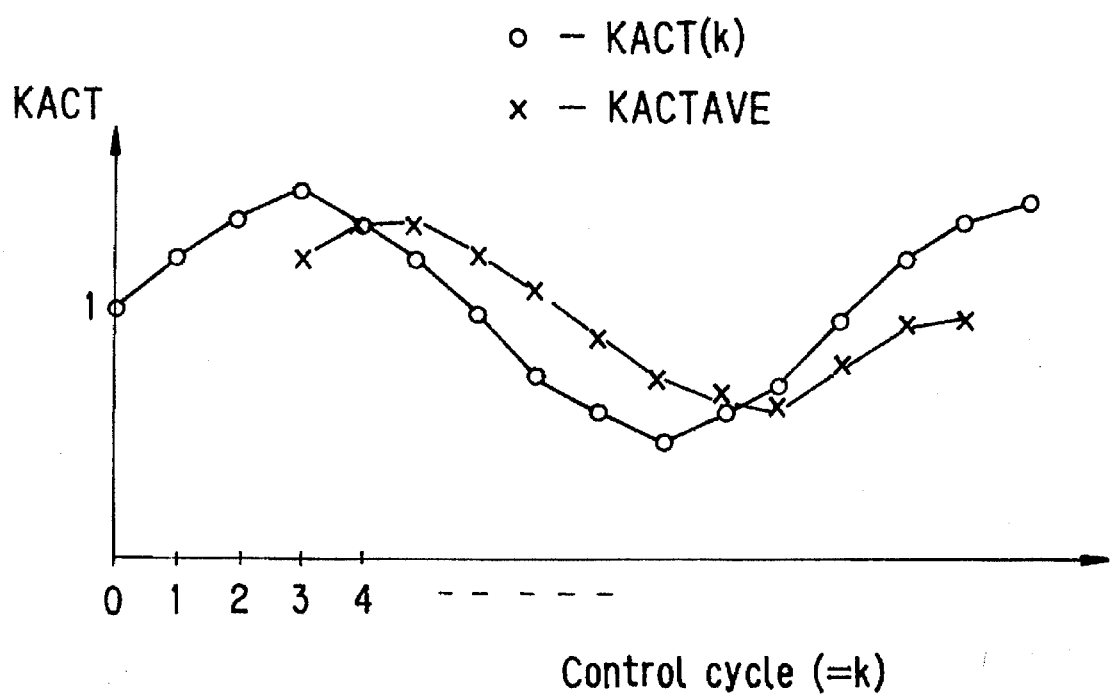
FIG. 11 is a timing chart explaining the operation of FIG. 10.

On the other hand, since S100 discriminates whether or not the engine is in a prescribed operating region and the average values are not calculated when the result is YES, no problem arises. Specifically, the response delay of the LAF sensor can be ignored at low engine speed because the control cycle is long. Moreover, a phenomenon that amounts to a change in the dead time of the control system occurs because of the phase shift between the detected value KACT(k) and the average value KACTAVE shown in FIG. 11. If adaptive control is conducted using the average value KACTAVE(k) whose phase has shifted, hunting and other undesirable effects may arise. The smoothing or averaging is therefore discontinued during idling and other low-engine-speed conditions when these effects are present.

In the foregoing, the average AVE-θ̂(k) of the controller parameters θ̂ is not used to calculate estimation/identification error signal e asterisk indicated by Eq. 4. Since the estimation/identification error signal e asterisk is a function for evaluating the magnitude of the error between the detected air/fuel ratio and the desired air/fuel ratio, the error may become inaccurate if AVE-θ̂(k) calculated in the foregoing manner is used in the calculation of Eq. 4. It is therefore advantageous to establish an operating region in which AVE-θ̂(k) is used only in the calculation of Eq. 2–3 and is not used in the calculation of Eq. 4.

While in the foregoing, various averages, i.e., the averages of the air/fuel ratio, θ̂(k) and KSTR(k) are used together, it is of course possible to use only one or an appropriate pair of them. Moreover, at engine starting or resumption of calculation in the STR controller, when no past values are available for calculating the averages, it is of course possible to use appropriate prescribed values.

The selection of the feedback correction coefficient shown in S32 of the flowchart of FIG. 6 will now be explained.

Figure 12:
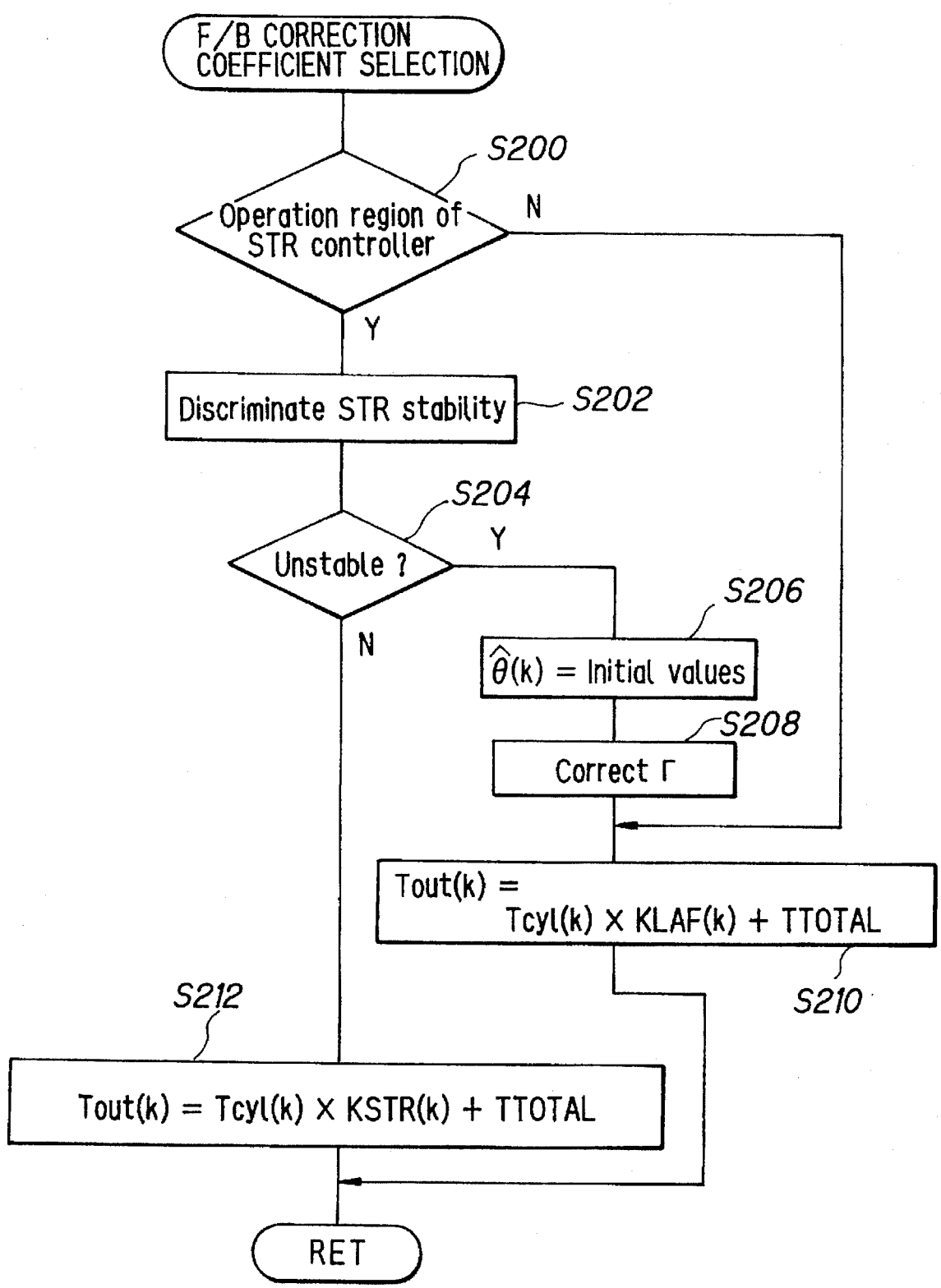
FIG. 12 is a subroutine flowchart of FIG. 6 showing the feedback correction coefficient selection while checking the stability of the operation of the adaptive controller.

The subroutine for this operation is shown by the flowchart of FIG. 12.

The subroutine begins at S200 in which it is checked whether the engine operating condition is in the operation region of the adaptive control system. Regions in which combustion is unstable, such as when the coolant temperature is extremely low, are defined as falling outside the operation region since they do not permit accurate detection/calculation of the air/fuel ratio KACT(k). When the result in S200 is NO, the program goes to S210 in which the output quantity of fuel injection Tout(k) is calculated using the feedback correction coefficient KLAF(k) calculated using the PID control law. When the result is YES, the program goes to S202 in which the stability of the adaptive controller is checked using the elements of controller parameters θ̂.

The transfer characteristic of the feedback correction coefficient KSTR(k) calculated by the STR controller is specifically represented by Eq. 13.

$$KSTR(z^{-1}) = \{KCMD(z^{-1}) - s_0 KACT(z^{-1}) - \quad \text{Eq. 13}$$

$$(r_1 z^{-1} + r_2 z^{-2} + r_3 z^{-3}) \times KSTR(z^{-1})\}/b_0$$

Assuming that the fuel adhesion correction is proper and that no disturbance is present in the fuel injection quantity determination system, the transfer characteristic between KSTR(k) and KACT(k) is $$KACT(z^{-1}) = z^{-3} KSTR(z^{-1}) \quad \text{Eq. 14}$$

The transfer function between the feedback correction coefficient KSTR(k) and KCMD(k) is $$\frac{KSTR(z^{-1})}{KCMD(z^{-1})} = \frac{1}{b_0 z^3 + r_1 z^2 + r_2 z + r_3 + s_0} z^3 \quad \text{Eq. 15}$$

$$\therefore (b_0 + s_0 z^{-3} + r_1 z^{-1} + r_2 z^{-2} + r_3 z^{-3}) KSTR(z^{-1}) = KCMD(z^{-1})$$

Figure 13:
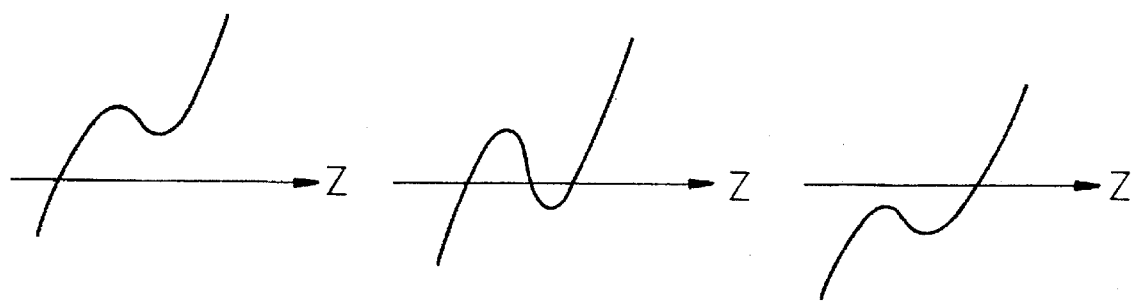
FIGS. 13 and 14 are graphs explaining the operation of FIG. 12.
Figure 14:
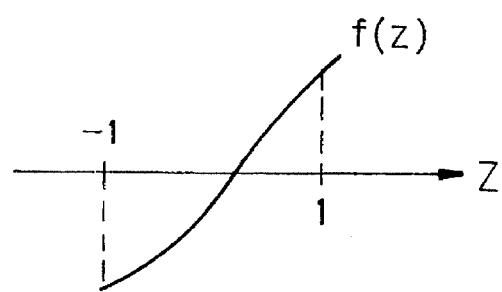

Since b0 here is a scalar quantity determining the gain and therefore cannot be zero or negative, the denominator function $f(z) = b0Z^3 + r1Z^2 + r2 Z + r3 + s0$ of the transfer function of Eq. 15 is one of the functions shown in FIG. 13. A check is therefore made as to whether the real root is within the unit circle. Specifically, as shown in FIG. 14, when it is found that $f(-1) < 0$ or $f(1) > 0$, this means that the real root is within the unit circle, from which it can be easily determined whether or not the system is stable.

The program then moves to S204 in which it is checked whether the adaptive control system is unstable. When the result is YES, the program goes to S206 in which the controller parameters θ̂ is restored to its initial value. This restores the system stability. The program next goes to S208 in which the gain matrix Γ is corrected. Since the gain matrix Γ determines the rate or speed of change (convergence) of the adaptation mechanism, this correction is made so as to slow the convergence rate. Here the elements of the gain matrix Γ are replaced with small values. This also enables restoration of system stability. The program then goes to S210 in which the output quantity of fuel injection Tout(k) is calculated using as the feedback correction coefficient the feedback correction coefficient KLAF(k) determined by the PID control law. Specifically, as shown, the output quantity of fuel injection Tout(k) is obtained by adding the addition term TTOTAL to the product of KLAF(k) and the required quantity of fuel injection Tcyl(k).

If S204 finds that the adaptive control system is not unstable, the program goes to S212 in which, as shown, the output quantity of fuel injection Tout(k) is calculated using as the feedback correction coefficient the feedback correction coefficient KSTR(k) calculated by the adaptive control law. If available, the average of the feedback correction coefficients KSTR calculated in S110 of the flowchart of FIG. 10 is, of course, used in this calculation.

The output u(k) of the, switching mechanism 400 in the block diagram of FIG. 7 is input to the STR controller and the adaptation mechanism. This is to enable calculation of the feedback correction coefficient KSTR using the adaptive control law during periods when the PID correction coefficient KLAF is selected.

Owing to the aforesaid configuration, this embodiment makes it possible to reduce the number of controller parameter elements to 5 notwithstanding that the adaptation mechanism operates every TDC. Since the gain matrix Γ to be calculated is therefore reduced to a 5×5 matrix, the processing load falls to a level enabling an on-board computer of ordinary performance to complete the calculation within one TDC. Moreover, since the STR controller also calculates the feedback correction coefficient KSTR every TDC, the system is able to respond to changes in the engine operating condition with very high efficiency, utilizing values of KSTR updated every TDC. In addition, an improvement in control performance is realized owing to the marked reduction of dead time.

Although from the viewpoint of the individual cylinders the fact that the controlled variable is input to the adaptation mechanism once every combustion cycle, i.e., once every 4 TDCs in a four-cylinder engine means that the adaptive controller is strongly affected by the combustion state of the single specific cylinder, no problem of the combustion state of only the specific cylinder being strongly reflected arises in this embodiment because the average of the detected air/fuel ratios (controlled variables) for all cylinders included in the combustion cycle is calculated and input to the adaptation mechanism, the average of the controller parameters (vectors) $\hat{\theta}$ is calculated and used, and/or the average of the feedback correction coefficients KSTR output by the STR controller are averaged and used.

Moreover, in the case where the feedback correction coefficient KSTR is calculated based on the controlled variable of only a specific cylinder, the problem arises that if, for example, the detected air/fuel ratio of a specific cylinder such as the first cylinder is rich while those of the remaining cylinders are lean, the feedback correction coefficient KSTR will be determined so as to correct the air/fuel ratio in the lean direction and exacerbate the lean air/fuel ratios of the remaining cylinders. This problem does not occur in this embodiment, however, because the average value for all cylinders is used.

Figure 15:
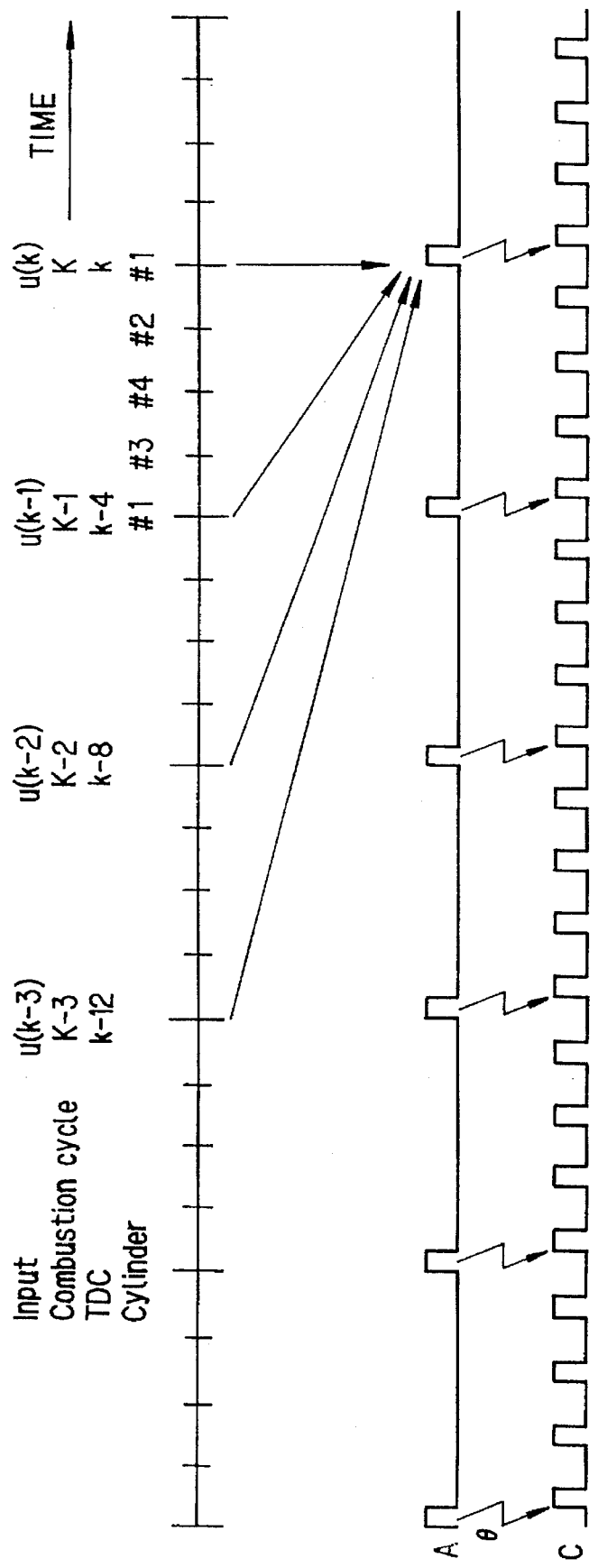
FIG. 15 is a timing chart, similar to FIG. 8, but showing another possible operation of the adaptive controller illustrated in FIG. 7.
Figure 31:
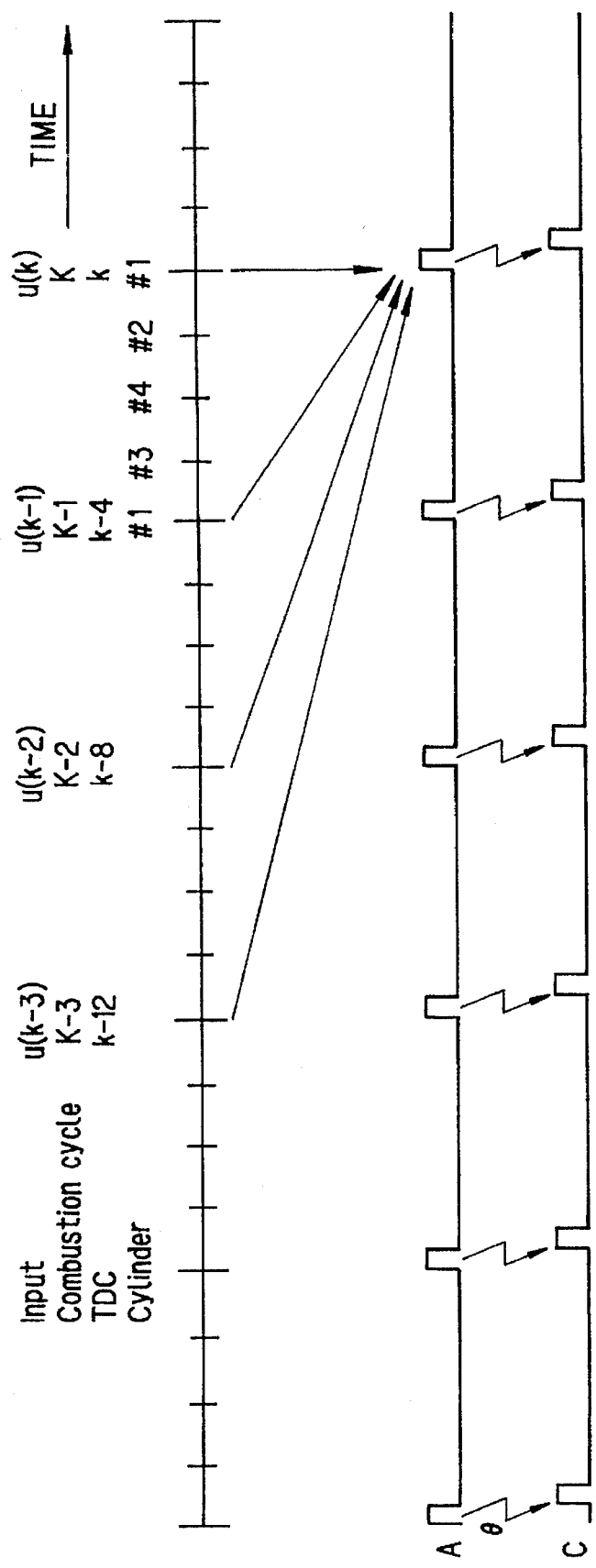
FIG. 31 is a timing chart, similar to FIG. 8, but showing the operation of FIG. 29.

A further simplification can be obtained, as shown in FIG. 15, by calculating the controller parameters $\hat{\theta}$ also synchronously with the combustion cycle of a specific cylinder, instead of every TDC, and using the same value of $\hat{\theta}$ during the same number of cycles as the cylinders. This is an effective method for coping with the decrease in time available for computation with increasing engine speed. Since the variance among the controller parameters (vectors) $\hat{\theta}$ required by the individual cylinders: becomes small at high engine speed, the control performance is not degraded even when the controller parameter $\hat{\theta}$ for a specific cylinder is used for all cylinders. It therefore becomes possible to shorten the computation time without loss of control performance. A still further simplification will be possible, as shown in FIG. 31 which will be used in a leter embodiment, by making both the adaptation mechanism and the controller operate at every 4 TDCs.

Figure 16:
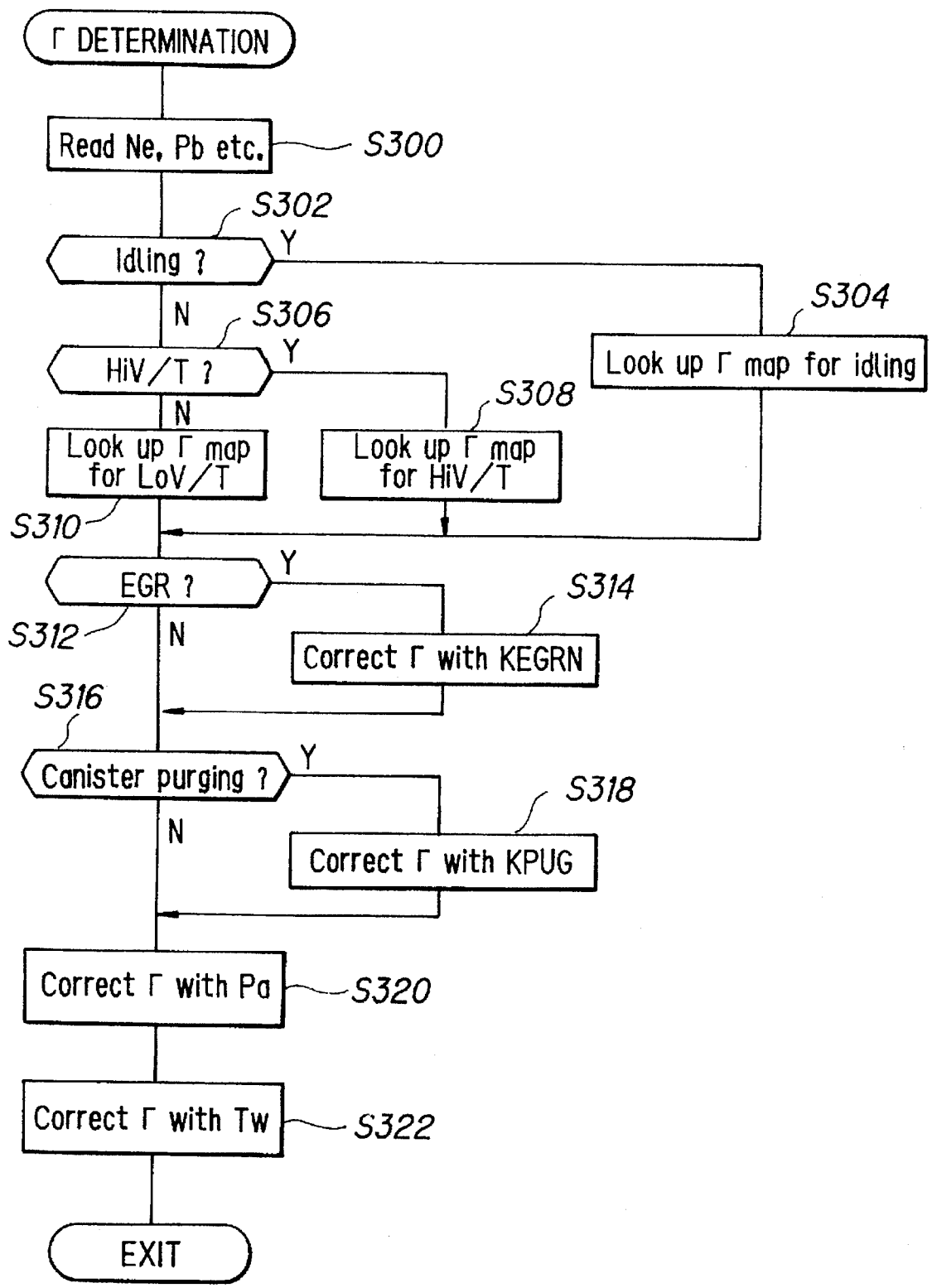
FIG. 16 is a flowchart showing the operation of the system according to a second embodiment of the invention for determining a gain matrix to be used in the adaptive controller.

FIG. 16 shows a second embodiment of the system according to the invention, specifically the flowchart related to the determination of the gain matrix F used to calculate the feedback correction coefficient KSTR.

As is clear from the Eqs. 1 to 6 referred to earlier, the gain matrix $\Gamma(k)$ is required for calculating the feedback correction coefficient KSTR. This second embodiment relates to the case where lambda 1=1, lambda 2 =0 in Eq. 3, namely, where the constant-gain algorithm is used, and aims at reducing computation time and making determination easier by defining all nondiagonal elements of the gain matrix $\Gamma$ as 0.

The explanation will be facilitated by considering the calculation of the internal variable zeta (k–d) as an example. In the first embodiment, which uses a 5×5 gain matrix, the calculation is carried out in the manner of Eq. 16 and requires 25 multiplications and 20 additions.

$$\Gamma\zeta(k-d) = \begin{pmatrix} g_{11} & g_{12} & g_{13} & g_{14} & g_{15} \\ g_{21} & g_{22} & g_{23} & g_{24} & g_{25} \\ g_{31} & g_{32} & g_{33} & g_{34} & g_{35} \\ g_{41} & g_{42} & g_{43} & g_{44} & g_{45} \\ g_{51} & g_{52} & g_{53} & g_{54} & g_{55} \end{pmatrix} \begin{pmatrix} u(k-d) \\ u(k-1-d) \\ u(k-2-d) \\ u(k-3-d) \\ y(k-d) \end{pmatrix} \quad \text{Eq. 16}$$

-continued $$= \begin{pmatrix} g_{11}u(k-d) + g_{12}u(k-1-d) + \ldots + q_{15}y(k-d) \\ \vdots \\ g_{51}u(k-d) \ldots + g_{55}y(k-d) \end{pmatrix}$$

Since Eq. 17 holds when all nondiagonal elements of the gain matrix $\Gamma$ are set to 0, the number of multiplications in the calculation can be reduced to five.

$$\Gamma\zeta(k-d) = \begin{pmatrix} g_{11} & g_{12} & g_{13} & g_{14} & g_{15} \\ g_{21} & g_{22} & g_{23} & g_{24} & g_{25} \\ g_{31} & g_{32} & g_{33} & g_{34} & g_{35} \\ g_{41} & g_{42} & g_{43} & g_{44} & g_{45} \\ g_{51} & g_{52} & g_{53} & g_{54} & g_{55} \end{pmatrix} \begin{pmatrix} u(k-d) \\ u(k-1-d) \\ u(k-2-d) \\ u(k-3-d) \\ y(k-d) \end{pmatrix} \quad \text{Eq. 17}$$

$$= \begin{pmatrix} g_{11}u(k-d) \\ g_{22}u(k-1-d) \\ \vdots \\ g_{55}y(k-d) \end{pmatrix}$$

Further, by setting all nondiagonal elements of the gain matrix $\Gamma$ to 0, the calculation of the controller parameters $\hat{\theta}(k)$ becomes as shown by Eq. 18.

$$\hat{\theta}(k) = \begin{pmatrix} \hat{\theta}_1(k-1) \\ \hat{\theta}_2(k-1) \\ \hat{\theta}_3(k-1) \\ \hat{\theta}_4(k-1) \\ \hat{\theta}_5(k-1) \end{pmatrix} + \Gamma\zeta(k-d)e^*(k) \quad \text{Eq. 18}$$

$$= \begin{pmatrix} \hat{\theta}_1(k-1) \\ \hat{\theta}_2(k-1) \\ \hat{\theta}_3(k-1) \\ \hat{\theta}_4(k-1) \\ \hat{\theta}_5(k-1) \end{pmatrix} + \begin{pmatrix} g_{11}u(k-d) \\ g_{22}u(k-1-d) \\ \vdots \\ g_{55}y(k-d) \end{pmatrix} e^*(k)$$

As a result, the matrix elements g11, g22, g33, g44 and g55 are values corresponding to only one change rate zeta (k) of the elements of the controller parameters $\hat{\theta}(k)$ and can be set independently. When the nondiagonal elements of the gain matrix $\Gamma$ are not 0, then, as can be seen from Eq. 16 and Eq. 18, the calculation of the controller parameters $\hat{\theta}(k)$ would become as shown by Eq. 19, namely, it would become necessary to consider five variables corresponding to all elements of zeta (k–d) to determine the change rate of one element of $\hat{\theta}(k)$, making the setting difficult. Setting all of the nondiagonal elements of the gain matrix $\Gamma$ to 0, shortens the computation time and facilitates the setting.

$$\hat{\theta}(k) = \begin{pmatrix} \hat{\theta}_1(k-1) \\ \hat{\theta}_2(k-1) \\ \hat{\theta}_3(k-1) \\ \hat{\theta}_4(k-1) \\ \hat{\theta}_5(k-1) \end{pmatrix} + \begin{pmatrix} g_{11}u(k-d) + g_{12}u(k-1-d) + \ldots + g_{15}y(k-d) \\ \cdot \\ \cdot \\ \cdot \\ g_{51}u(k-d) + \ldots + g_{55}y(k-d) \end{pmatrix} e^*(k) \qquad \text{Eq. 19}$$

Tests conducted by the inventors have revealed that setting some of the five elements of g11–g55 in the Γ matrix to the same value results in appropriate change rates among the elements of the controller parameters θ̂(k) and, as such, optimizes the control performance. By this is meant a setting such as g11=g22=g33=g44=g. This makes it possible to reduce the number of elements to be set to two, g and g55, whereby the number of setting steps can be decreased and the calculation of, for example, zeta$^T$ (k–d) F zeta (k–d) of the internal variables becomes as shown by Eq. 20, so that there are 12 multiplications.

$$\begin{aligned}\zeta^T(k-d)\Gamma\zeta(k-d) &= [u(k-d)\ldots y(k-d)] \begin{pmatrix} g & 0 & 0 & 0 & 0 \\ 0 & g & 0 & 0 & 0 \\ 0 & 0 & g & 0 & 0 \\ 0 & 0 & 0 & g & 0 \\ 0 & 0 & 0 & 0 & g_{55} \end{pmatrix} \begin{pmatrix} u(k-d) \\ u(k-1-d) \\ \cdot \\ \cdot \\ \cdot \\ y(k-d) \end{pmatrix} \\ &= g\{u(k-d)^2 + u(k-1-d)^2 + \ldots + u(k-3-d)^2\} + g_{55}y(k-d)^2 \end{aligned}$$

Eq. 20

In contrast, when g11–g44 have different values, the calculation becomes as shown by Eq. 21 and the number of multiplications increases to 15.

$$\zeta^T(k-d)\Gamma\zeta(k-d) = g_{11}u(k-d)^2 + \ldots + g_{55}y(k-d)^2 \qquad \text{Eq. 21}$$

Thus by setting some of g11–g55 to the same value, the number of elements to be set can be decreased and the computation time shortened. Further, since appropriate change rates can be established among the elements of the controller parameters θ̂(k), excellent reliability is obtained. The effect is of course most pronounced when g11=g22=g33=g44=g55.

Moreover, in the case of an operating region in which the plant output is unstable owing to unstable combustion, for example, s0(k) hunting and the like can be reduced by making g55 small. Setting the nondiagonal elements of the gain matrix Γ to 0 thus produces a considerable advantage in terms of ease of setting the control characteristics. In addition, optimum control performance for the engine can be constantly obtained by selecting the best gain matrix Γ for the operating region.

For this, g11–g55 are stored in the RAM 74 of the control unit 34 in correspondence to different operating conditions, and also in correspondence to the different operating conditions of other engine control devices such as the canister purge mechanism and the exhaust gas recirculation mechanism. The values of g11–g55 can all be the same, can be partially the same, or can all be different. When the capacity of RAM 74 is sufficiently large and/or enough computation time is available, values of the nondiagonal elements can also be used in the calculation.

Based on the foregoing, the second embodiment of the system according to this invention will now be explained with reference to the flowchart of FIG. 16.

The subroutine begins at S300 in which the engine speed Ne, manifold pressure Pb and other engine operating parameters are read in along with the operating states of the exhaust gas recirculation mechanism and/or the canister purge mechanism. The program then goes to S302 in which it is checked whether the engine is idling, and when the result is YES, to S304 in which a Γ map for idling is looked up. When S302 finds that the engine operating condition is not in the idling region, the program goes to S306 in which it is checked whether the variable valve timing mechanism is operating at the Hi valve timing characteristic. When the result is YES, the program goes to S08 in which a Γ map for Hi valve timing is looked up. When the result is NO, the program goes to S10 in which a Γ map for Lo valve timing is looked up.

FIG. 17 shows the characteristic of the Γ map for low valve timing. As shown, matrix elements g11–g55 are retrieved using the engine speed Ne and the manifold pressure Pb as address data. The Γ map for Hi valve timing has a similar characteristic. Moreover, since the value of the gain matrix Γ is retrieved from this map using the manifold pressure Pb, which is an index of engine load, the optimum gain matrix can be secured even during deceleration and other operating conditions involving rapid load change.

The program next goes to S312 in which it is checked whether the EGR (exhaust gas recirculation) mechanism is in operation, and when the result is YES, to S314 in which the gain matrix Γ is corrected in accordance with a fuel correction coefficient KEGRN for correcting for the exhaust recirculation (EGR) rate. Specifically, a correction coefficient KΓEGR is retrieved from a table having the characteristic shown in FIG. 18 using the fuel correction coefficient KEGRN for correcting for the exhaust recirculation rate as address data, and the gain matrix Γ is corrected by multiplying it by the retrieved correction coefficient KΓEGR. The gain matrix is corrected in accordance with the fuel correction coefficient KEGRN for correcting for the exhaust recirculation rate because disturbance increases as the fuel correction coefficient KEGRN for correcting for the exhaust recirculation rate decreases with an increasing amount of exhaust gas recirculation. For enhancing the stability of the adaptive control system, therefore, the correction coefficient KΓEGR is, as shown, established so as to reduce the gain matrix Γ as the fuel correction coefficient KEGRN for correcting for the exhaust recirculation rate decreases.

The fuel correction coefficient KEGRN is a multiplication coefficient for correcting the quantity of fuel injection and is set at a value such as 0.9. Since this invention does not reside in the determination of the exhaust recirculation rate, however, this determination will not be discussed further here, other than to say that a more detailed description of exhaust recirculation rate determination can be found in, for example, the assignee's U.S. Pat. No. 5,505,174.

The program then goes to S316 in which it is checked whether the canister purge mechanism is in operation, and if the result is YES, to S318 in which the gain matrix $\Gamma$ is corrected for the purge mass. Specifically, a correction coefficient KΓPUG is retrieved from a table having the characteristic shown in FIG. 19 using the purge mass KPUG as address data and the gain matrix $\Gamma$ is corrected by multiplying it by the retrieved correction coefficient KΓPUG. Since disturbance increases as the purge mass KPUG increases, the correction coefficient KΓPUG is, as shown, established so as to increase as the purge mass KPUG increases. As the determination of the purge mass is explained, for example, in the assignee's earlier Japanese Laid-Open Patent Application No. Hei 6(1994)–101,522, it will not be discussed further here.

Figure 20:
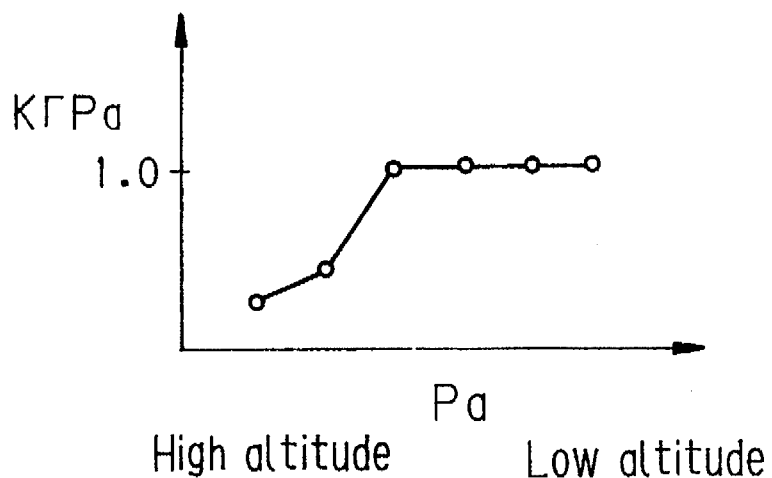

The program next goes to S320 in which the gain matrix $\Gamma$ is corrected for the detected atmospheric pressure Pa. Specifically, a correction coefficient KΓPA is retrieved from a table having the characteristic shown in FIG. 20 using the detected atmospheric pressure Pa as address data and the gain matrix $\Gamma$ is corrected by multiplying it by the retrieved correction coefficient KΓPA. The gain matrix is corrected for the detected atmospheric pressure Pa because disturbance relative to the data set at normal pressure arises as the detected atmospheric pressure Pa decreases, namely, as the charging efficiency decreases with increasing altitude of the engine operating location. For enhancing the stability of the adaptive control system, therefore, the gain matrix $\Gamma$ is reduced with decreasing detected atmospheric pressure Pa.

Figure 21:
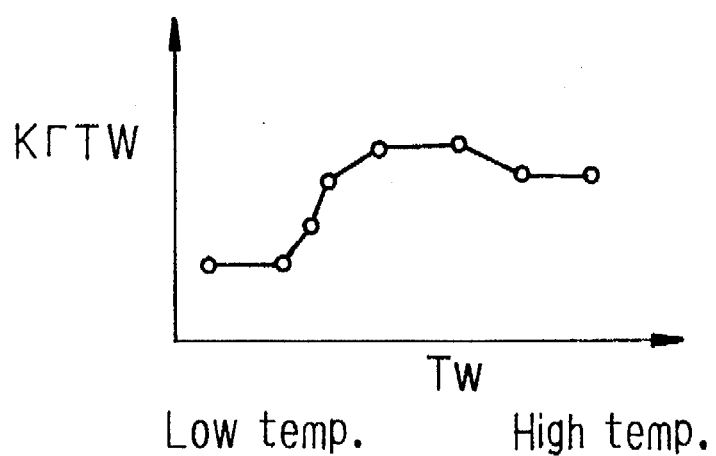

The program then goes to S322 in which the gain matrix $\Gamma$ is corrected for the detected engine coolant temperature Tw. Specifically, a correction coefficient KΓTW is retrieved from a table having the characteristic shown in FIG. 21 using the detected engine coolant temperature Tw as address data and the gain matrix $\Gamma$ is corrected by multiplying it by the retrieved correction coefficient KΓTW. The gain matrix is corrected for the detected engine coolant temperature Tw because, as shown, disturbance arises in the correction coefficient KΓTW relative to the data set at normal temperature when the combustion becomes unstable owing to high or low detected engine coolant; temperature Tw. For enhancing the stability of the adaptive control system, therefore, the gain matrix $\Gamma$ is reduced at high and low engine coolant temperatures.

In the second embodiment described in the foregoing, the gain matrix determining the change (convergence) rate of the controller parameters $\hat{\theta}$ is determined as appropriate for the engine operating conditions. It is therefore able to secure a stable controller parameter change rate and thereby enhance control performance.

While the second embodiment determines the gain matrix $\Gamma$ with the constant gain, it is also possible to use a variable-gain algorithm. In this case, the initial values of the elements of the gain matrix $\Gamma$ can be adjusted for the engine operating condition in the foregoing manner and then can be determined to prescribed values when the engine operating condition changes.

While the second embodiment was explained based on the constant-gain algorithm, in a case where the calculation of the gain matrix $\Gamma(k)$ is conducted based on a law other than the constant-gain algorithm, such as on the variable-gain algorithm shown by Eq. 3, it is of course possible to reduce the processing volume and facilitate the setting or determination indicated in the second embodiment by not calculating the nondiagonal elements of the gain matrix $\Gamma(k)$, i.e., by fixing them to 0.

Figure 22:
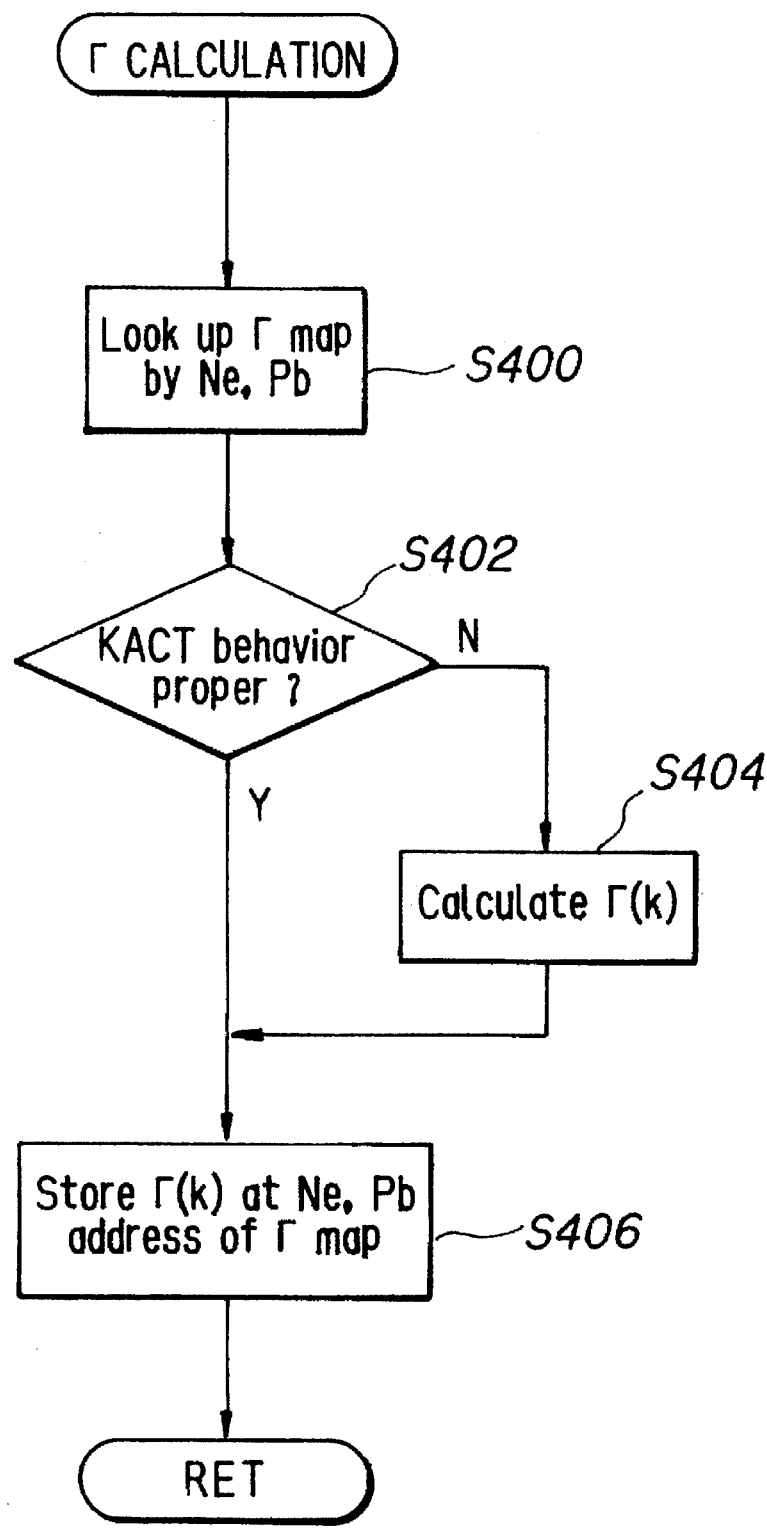
FIG. 22 is a flowchart showing the operation of the system according to a third embodiment of the invention for determining the gain matrix to be used in the adaptive controller.

FIG. 22 is a flowchart showing a third embodiment of the system according to the invention.

The gain matrix $\Gamma$ was calculated at constant gain in the first and second embodiments. In contrast, in the third embodiment it is calculated using an algorithm other than the constant-gain algorithm. In this case, when the calculated values are stored in memory in correspondence to the engine operating condition when the behavior of the control result using the controller parameters (the plant output, more specifically, the detected air/fuel ratio KACT) is good, then the need to recalculate the gain matrix $\Gamma(k)$ in the region concerned is eliminated, the optimum gain matrix $\Gamma(k)$ can be constantly used in the region, and control performance is enhanced. The r(k) stored in this case can be a processed value such as the average value over four TDCs. The gain matrix $\Gamma$ is calculated from the con- stant-gain algorithm when it is discriminated that the plant output behavior is not good. In this case, the gain matrix $\Gamma(k-1)$ starts with the initial values stored for the operating region concerned.

Based on the foregoing, an explanation will now be given with reference to FIG. 22, which shows the operations conducted in the third embodiment at the time of map retrieval of the gain matrix $\Gamma$ in S308, S310, S304, etc., of the flowchart of FIG. 16.

The subroutine starts at S400 in which, as in the second embodiment, a $\Gamma$ map is looked up, similarly to the second embodiment, using the engine speed Ne and the manifold pressure Pb as address data. The program then proceeds to S402 in which it is discriminated by an appropriate method whether the behavior of the detected air/fuel ratio KACT, the plant output, is proper, and when the result is NO, to S404 in which the gain matrix $\Gamma(k)$ is calculated and to S406 in which the calculated gain matrix $\Gamma(k)$ is stored in a prescribed region of the map from which the retrieval was made. When the result in S402 is YES, the program advances directly to S406. The discrimination in S402 as to whether or not the behavior of the detected value KACT is proper is conducted, for example, by judging that it is good when the detected value KACT is within plus or minus a prescribed value of the desired value KCMD over a period of 10 TDCs.

Owing to the aforesaid configuration, the third embodiment makes it possible to reduce the processing volume since the gain matrix $\Gamma(k)$ need not be calculated according to Eq. 3 but can be obtained by simple map retrieval when the behavior of the detected air/fuel ratio KACT is proper. Moreover, when the behavior of the detected value KACT is not proper, the optimum gain matrix $\Gamma(k)$ is recalculated and learned. Since this makes it possible to learn the optimum gain matrix $\Gamma(k)$ for each operating region of the internal combustion engine, the system is able to cope with aging of the internal combustion engine. As the behavior of the detected value KACT(k) can therefore be constantly maintained proper, control performance is enhanced.

Figure 23:
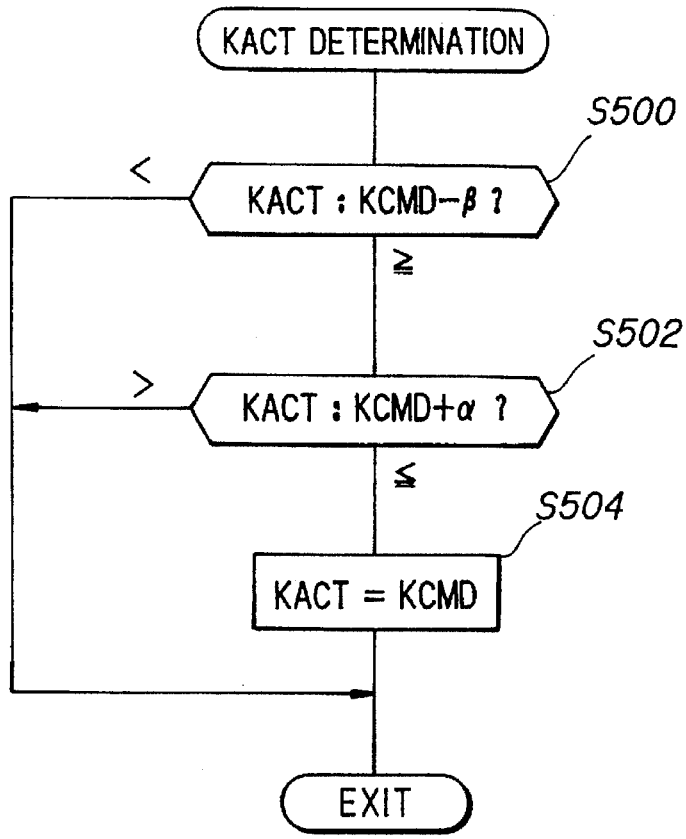
FIG. 23 is a flowchart showing the operation of the system according to a fourth embodiment of the invention for determining an air/fuel ratio to be used in the adaptive controller.

FIG. 23 is a flowchart showing a fourth embodiment of the system according to the invention.

Figure 24:
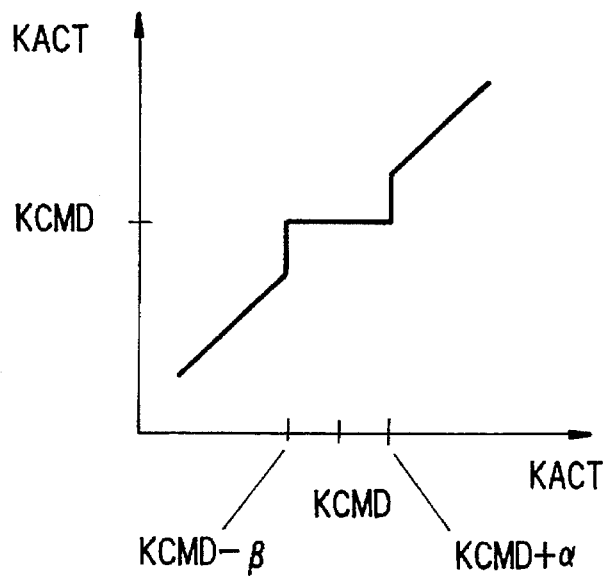
FIG. 24 is a graph explaining the operation of FIG. 23.

In the fourth embodiment, a blind zone is established in the characteristic of the detected value KACT so as to prevent the adaptive control system from becoming unstable. Since the STR controller operates to bring the detected value KACT to the desired value KCMD, it follows that the controller parameters will scarcely vary when the detected value KACT input to the STR controller is equal to the desired value KCMD. Therefore, for preventing unnecessary overcorrection by the adaptive control system in response to slight variations in the detected value KACT caused by sensor noise and other slight disturbances, the characteristic of the detected value KACT is provided with a blind zone in the vicinity of the desired value KCMD, as shown in FIG. 24. Specifically, the detected value KACT is made constant between a prescribed lower limit value KCMD-β and a prescribed upper limit value KCMD+α.

The subroutine of the flowchart of FIG. 23 starts at S500 in which the detected value KACT is compared with the prescribed lower limit value KCMD-β, and when it is equal to or greater than this value, the program moves to S502 in which the detected value KACT is compared with the prescribed upper limit value KCMD+α. When S502 finds the detected air/fuel ratio to be equal to or less than the prescribed value KCMD+α, the program goes to S504 in which the detected value KACT is set to a prescribed value, e.g. to the desired value KCMD. When S500 finds that the detected value KACT is less than the lower limit value KCMD-β or when S502 finds that the detected value KACT is greater than the upper prescribed limit value KCMD+α, the subroutine is immediately terminated. In such cases, therefore, the detected value becomes the detected air/fuel ratio KACT without modification. The aforesaid processing provides the characteristic that the detected air/fuel ratio KACT has a blind zone in the vicinity of the desired air/fuel ratio KCMD, as shown in FIG. 22.

Owing to the aforesaid configuration of the fourth embodiment, the STR controller is unaffected by any slight fluctuations occurring in the detected value KACT, for example, and can therefore operate stably. A good control result can therefore be obtained. Although the desired value KCMD is set to the detected air/fuel ratio in S504, it can instead be set to some other value in the range between KCMD-β and KCMD-α.

Figure 25:
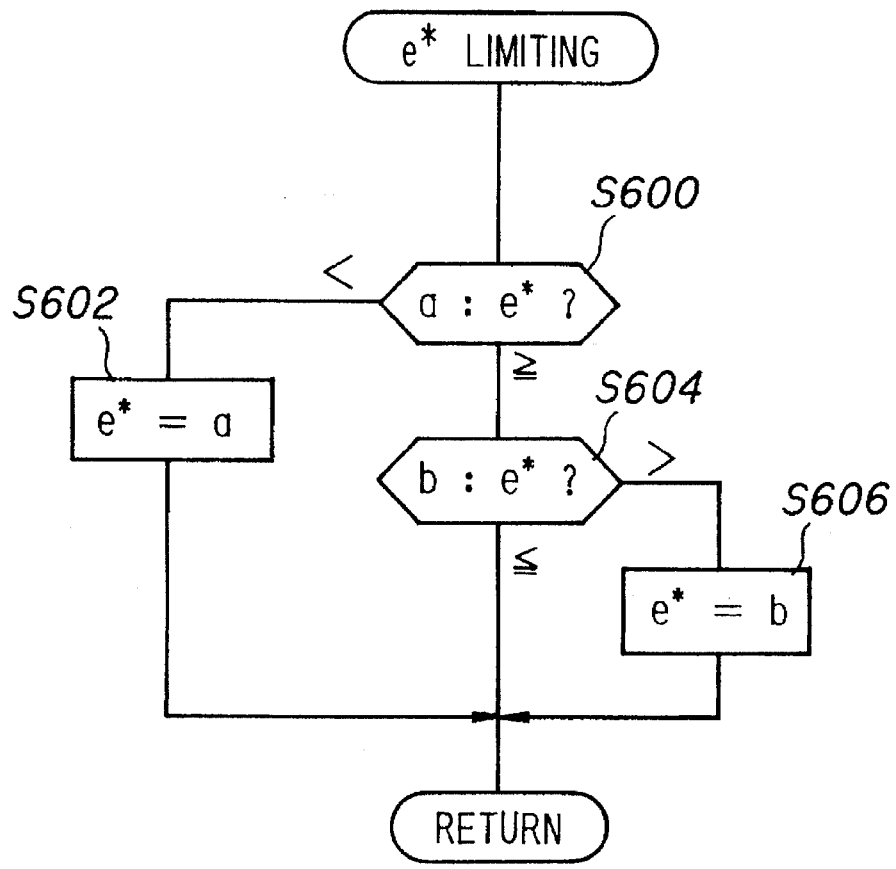
FIG. 25 is a flowchart showing the operation of the system according to a fifth embodiment of the invention for determining an estimation/identification error signal to be used in the adaptive controller.

FIG. 25 is a flowchart showing a fifth embodiment of the system according to the invention.

Like the fourth embodiment, the fifth embodiment also prevents destabilization of the adaptive control system, by establishing upper and lower limiters on the estimation/identification error signal $e$ asterisk so as to stabilize the controller parameters.

As is clear from Eq. 2, the change rate of the controller parameters $\hat{\theta}$ can be restricted by limiting the value of the estimation/identification error signal asterisk (k) within a given range. This limitation prevents the controller parameters $\hat{\theta}$ from overshooting its optimum value and, as a result, stabilizes the operation of the adaptive control system and makes it possible to obtain good control results.

Figure 26:
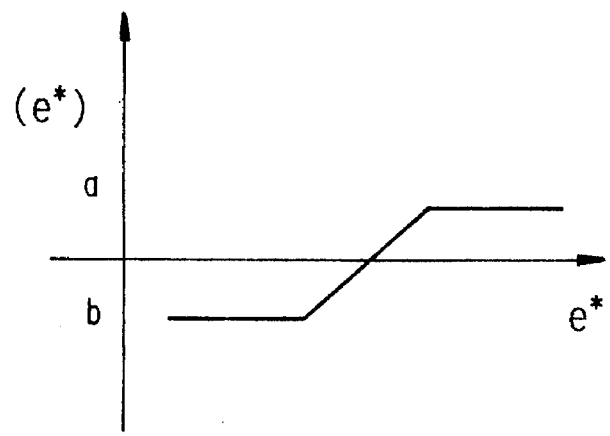
FIG. 26 is a graph explaining the operation of FIG. 25.

The subroutine of the flowchart of FIG. 25 starts at S600 in which the calculated estimation/identification error signal $e$ asterisk (k) is compared with an upper limit value $a$ (shown in FIG. 26). When it is greater than the upper limit value $a$, the program goes to S602 in which the estimation/identification error signal $e$ asterisk (k) is set to a prescribed value, for example, the upper limit value $a$. On the other hand, if S600 finds the estimation/identification error signal $e$ asterisk (k) to be equal to or less than the upper limit value $a$, the program goes to S604 in which the calculated estimation/identification error signal $e$ asterisk (k) is compared with a lower limit value $b$ (shown in FIG. 26). When it is less than the lower limit value $b$, the program goes to S606 in which the estimation/identification error signal $e$ asterisk (k) is set to a prescribed value, for example, the lower limit value $b$. If S604 finds the estimation/identification error signal $e$ asterisk (k) to be equal to or greater than the lower limit value $b$, the subroutine is immediately terminated. In such a case, therefore, the detected value becomes the estimation/identification error signal $e$ asterisk (k) without modification.

Owing to the aforesaid configuration, the fifth embodiment can limit the change rate of the controller parameters $\hat{\theta}$ by limiting the value of the estimation/identification error signal $e$ asterisk within a prescribed range. Since this prevents the controller parameters $\hat{\theta}$ from overshooting its optimum value, it enables stable operation of the adaptive control system, thereby ensuring good control results.

While the value of the estimation/identification error signal $e$ asterisk (k) is set to the upper or lower limit value in S602 or S606, it can instead be set to an appropriate value between the upper and lower limits or to a value in the vicinity of the upper or lower limit values.

Figures 27, 28:
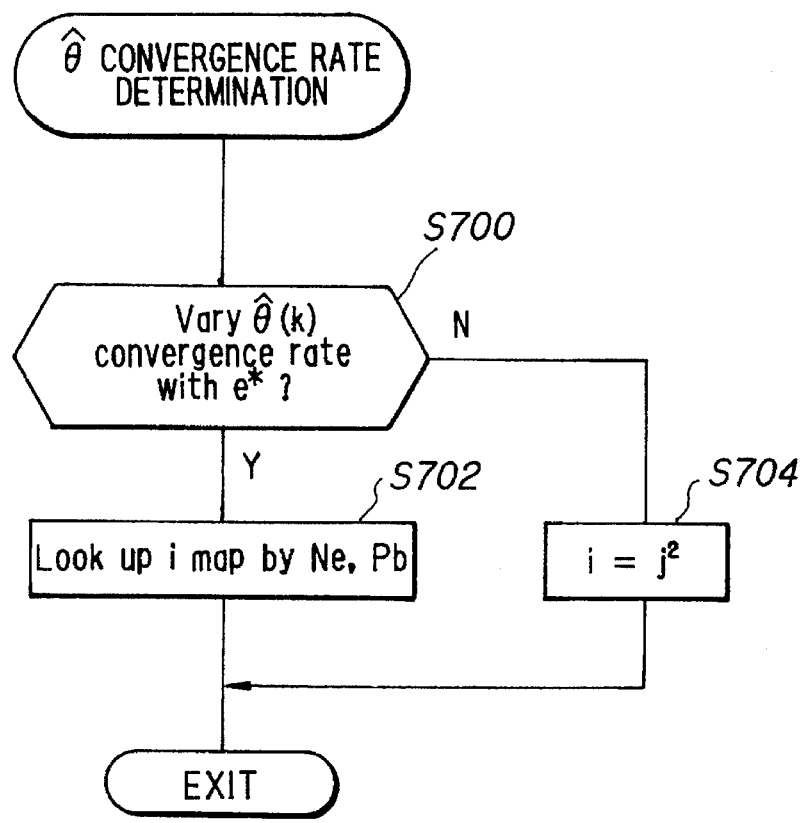
FIG. 27 is a flowchart showing the operation of the system according to a sixth embodiment of the invention for determining an estimation/identification error signal to be used in the adaptive controller.
FIG. 28 is a graph explaining the operation of FIG. 27.

FIG. 27 is a flowchart showing a sixth embodiment of the system according to the invention.

In this sixth embodiment, the change rate of the estimation/identification error signal $e$ asterisk in the STR controller of the first embodiment is made steady and improved control performance is achieved by making the constant 1 variable in the denominator of Eq. 4 for calculating the estimation/identification error signal $e$ asterisk, which determines the controller parameters $\hat{\theta}$.

The sixth embodiment relates to the technique to limit the range of change of intermediate values or variables that are used in the calculation of the adaptation mechanism. Specifically, it is arranged in the technique such that y(k) or zeta (k-d) to be input to the adaptation mechanism is multiplied by a coefficient other than 1 and is then input to the adaptation mechanism. This arrangement can limit the range of change of the values or variables, enabling the adaptive control on a low level on-board computer. Since, however, this technique is disclosed in the application proposed by the assignee and filed in the United States (U.S. Ser. No. 08/151,859 filed on Nov. 15, 1993)(Japanese Laid-Open Patent Application No. Hei 6(1994)-161,511), no further explanation will be made.

The theoretical equation for calculating the estimation/identification error signal $e$ asterisk (k) is as shown by Eq. 4. Thus, in order to limit the range of change for the reason mentioned just above, when zeta (k-d) and y(k) are multiplied by the coefficient other than 1 such as ⅒ (hereinafter referred to as j) and input to the parameter adaptation mechanism, the denominator becomes as shown by Eq. 22 (i.e., becomes fixed when the gain matrix Γ (k-1) has constant gain).

$$1 + \frac{1}{10} \zeta^T(k-d)\Gamma(k-1)\frac{1}{10} \zeta(k-d) \qquad \text{Eq. 22}$$

Since the coefficient of the right term becomes the square of the multiplication coefficient of zeta (k-d), y(k), its value (1/10² = 1/100 in this example) is much smaller than the left term (=1) when the multiplication coefficient is a small fractional value. As a result, the denominator of the estimation/identification error signal $e$ asterisk stays in the vicinity of 1 no matter how the right term changes, so that the change rate of the estimation/identification error signal $e$ (k) differs from that where the multiplication by the coefficient is not conducted. This problem can be overcome by setting the left term to a value other than 1. As a rule of thumb, the same change rate as before multiplication by the coefficient j can be obtained by setting the left term to $j^2$.

Conversely, since the change rate of the estimation/identification error signal $e$ asterisk (k) is proportional to the change (convergence) rate of the controller parameters $\hat{\theta}(k)$, i.e., since $\hat{\theta}(k)$ is calculated using Eq. 2, the change rate of the controller parameters $\hat{\theta}(k)$ can be varied by giving the left term a value other than $j^2$. In Eq. 23 for calculating the denominator of the estimation/identification error signal $\underline{e}$ asterisk (k), therefore, $\underline{i}$ is defined as any value other than i≠1 or j≠1.

$$e^*(k) = \frac{jy(k) - s\hat{\theta}^T(k-1)j\zeta(k-d)}{i + j\zeta^T(k-d)\Gamma(k-1)j\zeta(k-d)} \quad \text{Eq. 23}$$

Here, j is the coefficient to be multiplied to the inputs to the adaptation mechanism as mentioned before and i is also a coefficient other than 1.

The subroutine of the flowchart of FIG. 27 starts at S700 which discriminates whether or not the rate of change (convergence) of the controller parameters $\hat{\theta}(k)$ by the estimation/identification error signal $\underline{e}$ asterisk (k) is to be made variable. When the result is YES, the program moves to S702 in which $\underline{i}$ is set to a value other than 1. This is achieved by retrieving the value of $\underline{i}$ from a map whose characteristic is shown in FIG. 28 using the engine speed Ne and manifold pressure Pb as address data. On the other hand when the result in S700 is NO, the program goes to S704 in which $\underline{i}$ is set to $j^2$, so that the change rate stays the same as before multiplication by the coefficient j. In the map characterized as shown in FIG. 28, the value of $\underline{i}$ is set based on the value of $j^2$, such as i=$j^2$×0.5 or i=$j^2$×2.

Specifically, j is ordinarily set to a value smaller than 1. When j=1/10, for instance then i=$j^2$=1/100 when the result in S700 is NO. So that values centered on i=1/100 are also obtained even when the result in S700 is YES, the mapped $\underline{i}$ values in FIG. 28 are therefore, set between 1/50 and 1/200, for example. The change (convergence) rate of the controller parameters $\hat{\theta}$ is high for small values of $\underline{e}$ (such as 1/200) and is low for large values of $\underline{i}$ (such as 1/50). More specifically, therefore, the values of $\underline{i}$ are mapped in FIG. 28 so that the value of $\underline{i}$ is large (e.g., 1/50) at high-speed, high-load and small (e.g., 1/200) at low-load.

Since the sixth embodiment is configured to vary the estimation/identification error signal $\underline{e}$ asterisk which determines the controller parameters $\hat{\theta}$, it ensures good harmony with the coefficients of the inputs and makes the change rate of the controller parameters $\hat{\theta}$ steady, thereby achieving proper control performance.

It should here be noted that when the input to the adaptation mechanism is not multiplied by the coefficient other than 1, in other words, when i=1, it suffices if i is varied around 1.

Although the sixth embodiment was explained based on the STR controller of the first embodiment as an example, the adaptive controller of this embodiment is not limited to that illustrated in the first embodiment but may be of any type, including the MRACS type, that operates based on the adaptation or identification law (algorithm) proposed by I.D. Landau et al.

Figure 29:
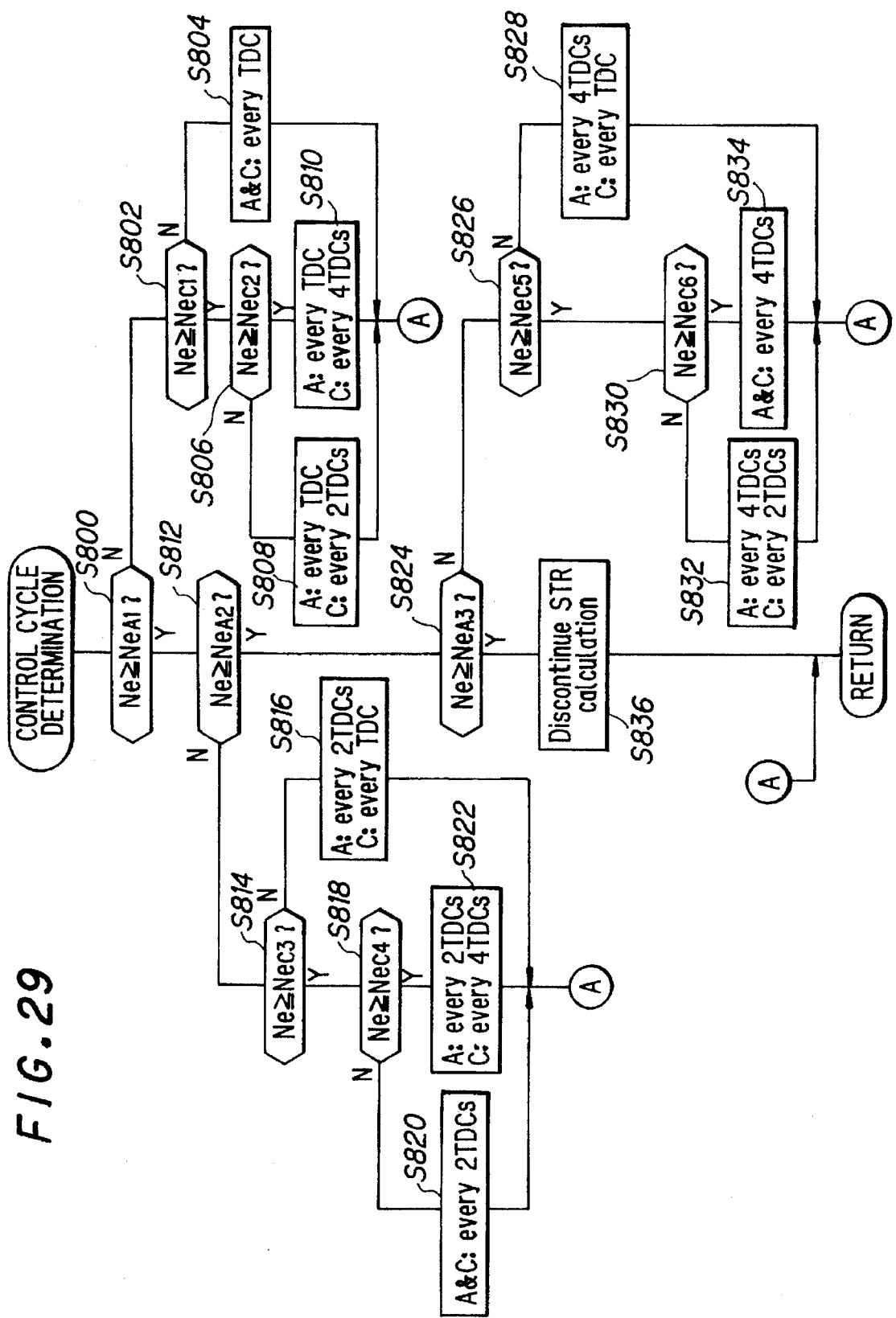
FIG. 29 is a flowchart showing the operation of the system according to a seventh embodiment of the invention for determining the control (operation) cycle of the adaptive controller.

FIG. 29 is a flowchart showing a seventh embodiment of the system according to the invention.

In the seventh embodiment, the control or calculation cycles of the adaptation mechanism and the STR controller of the first embodiment are made variable and are determined according to the engine operating condition, specifically the engine speed. Since varying the control cycles of the adaptation mechanism and the controller of the adaptive controller variable according to the engine operating condition minimizes the computational burden, it becomes possible to conduct adaptive control even under engine operating conditions when little computation time is available, such as when the engine is operating at high speed, and thus to achieve good control performance.

The subroutine of the flowchart of FIG. 29 starts at S800 in which the detected engine speed Ne is compared with a prescribed value NeA1. When S800 finds that the detected engine speed Ne is less than the prescribed value NeA1, the program goes to S802 in which the detected engine speed Ne is compared with a second prescribed value Nec1. When S802 finds that the detected engine speed Ne is less than the second prescribed value Nec1, the program goes to S804 in which the control cycle of the adaptation mechanism (abbreviated as "A" in FIG. 29) and the STR controller (abbreviated as "C") are each set to once per TDC.

The operations of the flowchart of FIG. 29 are explained in FIG. 30. As can be seen from FIG. 30, NeA1 and Nec1 are defined as relatively low engine-speeds in which ample computation time is available. When the engine speed is equal to or less than Nec1, therefore, the adaptation mechanism and the STR controller are operated, as shown in FIGS. 8 and 57, every TDC for maxim control accuracy.

When S802 of the flowchart of FIG. 29 finds that the detected engine speed Ne exceeds the prescribed value Nec1, the program goes to S806 in which the detected engine speed Ne is compared with a prescribed value Nec2, and when it is less than Nec2, goes to S808 in which the adaptation mechanism is operated every TDC and the STR controller is operated every 2 TDCs. On the other hand, when S806 finds that the detected engine speed Ne is equal to or greater than the prescribed value Nec2, the program goes to S810 in which the adaptation mechanism is operated every TDC and the STR controller is operated every 4 TDCs.

When S800 finds that the detected engine speed Ne is equal to or greater than the prescribed value NeA1, the program goes to S812 in which the detected engine speed Ne is compared with a prescribed value NeA2, and when it is less than NeA2, goes to S814 in which the detected engine speed Ne is compared with a prescribed value Nec3, and when detected engine speed Ne is less than the prescribed value Nec3, goes to S816 in which the adaptation mechanism is operated every 2 TDCs and the STR controller is operated every TDC.

On the other hand, when S814 finds that the detected engine speed Ne is equal to or greater than the prescribed value Nec3, the program goes to S818 in which the detected engine speed Ne is compared with a prescribed value Nec4, and when it is less than Nec4, goes to S820 in which both the adaptation mechanism and the STR controller are operated every 2 TDCs. When S818 finds that the detected engine speed Ne is equal to or greater than the prescribed value Nec4, the program goes to S822 in which the adaptation mechanism is operated every 2 TDCs and the STR controller is operated every 4 TDCs.

When S812 finds that the detected engine speed Ne is equal to or greater than the prescribed value NeA2, the program goes to S824 in which the detected engine speed Ne is compared with the prescribed value NeA3, and when it less than NeA3, goes to S826 in which the detected engine speed Ne is compared with a prescribed value Nec5. When S826 finds that the detected engine speed Ne is less than the prescribed value Nec5, the program goes to S828 in which the adaptation mechanism is operated every 4 TDCs and the controller is operated every TDC, as shown in FIG. 15.

On the other hand, when S826 finds that the detected engine speed Ne is equal to or greater than the prescribed value Nec5, the program goes to S830 in which the detected engine speed Ne is compared with a prescribed value Nec6, and when it is less than the prescribed value Nec6, the program goes to S832 in which the adaptation mechanism is operated every 4 TDCs and the STR controller is operated every 2 TDCs. When S830 finds that the detected engine speed Ne is equal to or greater than prescribed value Nec6, the program goes to S834 in which both the adaptation mechanism and the STR controller are operated every 4 TDCs, as illustrated in FIG. 31. When S824 finds that the detected engine speed Ne is equal to or greater than the prescribed value NeA3, the program goes to S836 in which the operation of the adaptive controller STR is discontinued. Here, FIG. 31 is only used to show the operation of the adaptive mechanism and STR controller so that the input to the adaptation mechanism should not be limited to the illustrated configuration.

As described in the foregoing, the seventh embodiment determines the operation cycles of the adaptation mechanism and the STR controller according to the engine speed. As a result, the computational burden is minimized, enabling adaptive control to be conducted even at high engine speed and under other such engine operating conditions when available computation time is limited. The seventh embodiment therefore achieves good control performance.

It is not necessary to provide the adaptive controller STR with all of the ten operating states mentioned in the foregoing and shown in FIG. 30 (by the circled numerals 1–10). It is possible instead to select from among these operating states as appropriate for the engine and the performance of the CPU of the control unit. For example, a combination such as "1, 3, 5, 9 10," "1, 3, 6, 9, 10," "1, 7, 9, 10," "1, 10" or "1, 4, 7, 10" can be selected.

Moreover, this embodiment is not limited to use of engine speed as the engine operating condition. It is also possible to take engine load into account in determining the control cycles. In this case, since little change arises in the controller parameters $\hat{\theta}$ under a high load condition, for example, it may be sufficient for the adaptation mechanism to conduct processing once every 4 TDCs.

Figure 32:
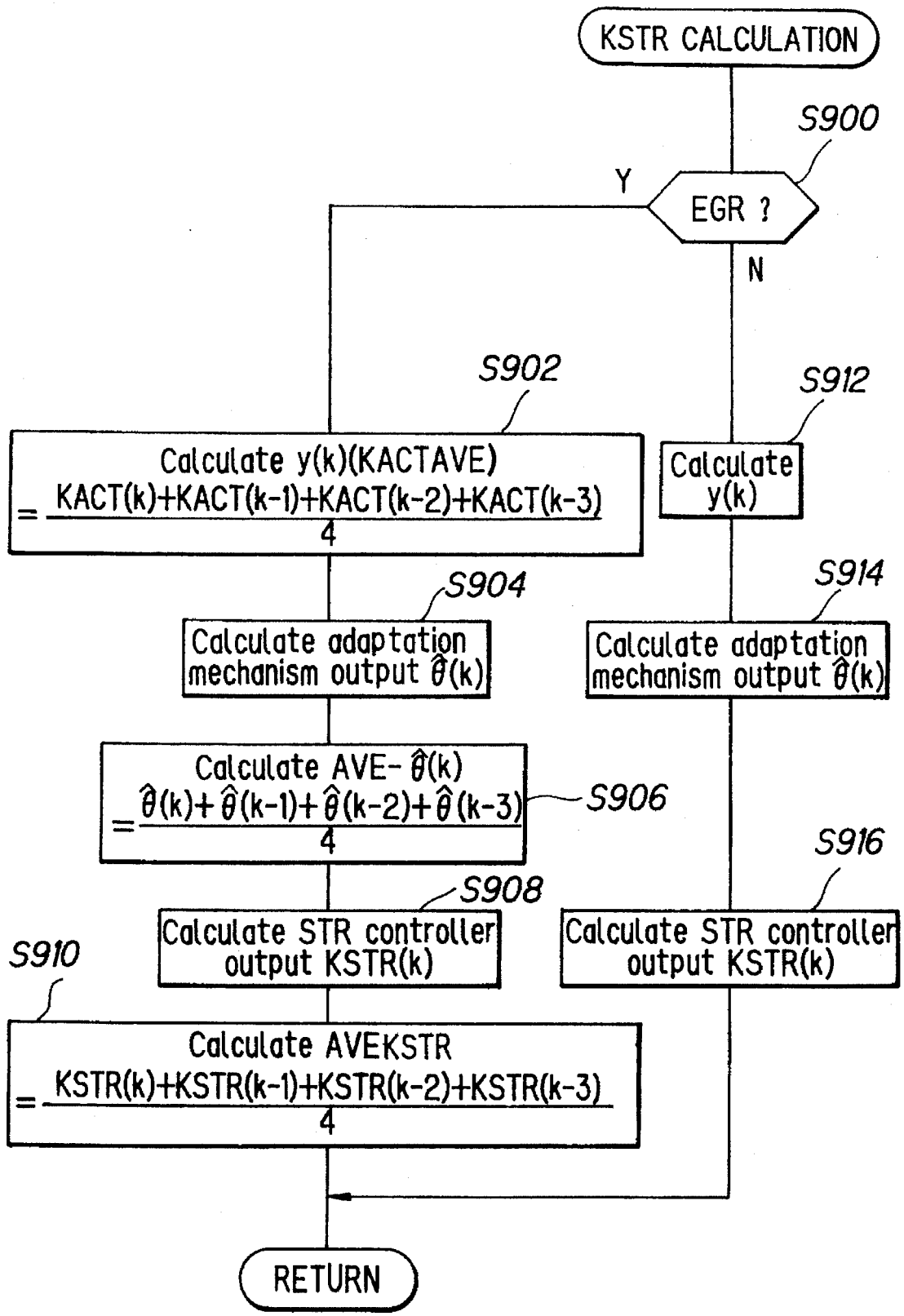
FIG. 32 is a flowchart, similar to FIG. 10, but showing the operation of the system according to an eighth embodiment of the invention.

FIG. 32 shows an eighth embodiment of the system according to the invention, specifically the flow-chart of a subroutine similar to that of FIG. 10 for calculating the average of the feedback correction coefficient KSTR and the like.

In the first embodiment, the effect of the detected air/fuel ratio of a specific cylinder is reduced by, as a general rule, using the average of the detected air/fuel ratios for all cylinders for determining the feedback correction coefficient KSTR and, under a prescribed engine operating condition, namely, during idling, discontinuing the calculation of the average.

In contrast to the first embodiment, the eighth embodiment does not calculate an average as a general rule but calculates one only under a prescribed engine operating condition, namely, only when exhaust gas recirculation (EGR) is in effect.

When the aforesaid exhaust gas recirculation mechanism is recirculating exhaust gas, there is a possibility that, depending on the engine operating condition, the exhaust gas may not be introduced uniformly into all of the four cylinders but, instead, may, for example, be drawn in a large amount into the cylinder nearest the recirculation port 12lb and be drawn in only a small amount into the cylinder farthest therefrom. In such a case, therefore, the air/fuel ratio KACT(k) detected every TDC is greatly influenced by a specific cylinder and if this detected air/fuel ratio KACT(k) is used, the system will try to bring only the air/fuel ratio of the specific cylinder to the desired air/fuel ratio, causing the manipulated variable of all cylinders to be offset by the amount of the offset of the specific cylinder and thereby offsetting the air/fuel ratios of the other cylinders. For avoiding this problem, it is preferable to calculate the average value as shown in the drawing.

The subroutine of the flowchart of FIG. 32 starts at S900 in which it is checked whether EGR (exhaust gas recirculation control) is in effect, and when the result is YES, the program proceeds to S902 and the following steps in which the average KACTAVE is calculated in the same manner as explained with reference to FIG. 10 in connection with the first embodiment. On the other hand, when the result in S900 is NO, the program proceeds to S912 and the following steps in which processing is conducted in the manner explained with reference to FIG. 10 in connection with the first embodiment.

Owing to the aforesaid configuration, the eighth embodiment is ensured of not being strongly affected by the combustion state of only a specific cylinder and is able to achieve enhanced control performance.

Figure 33:
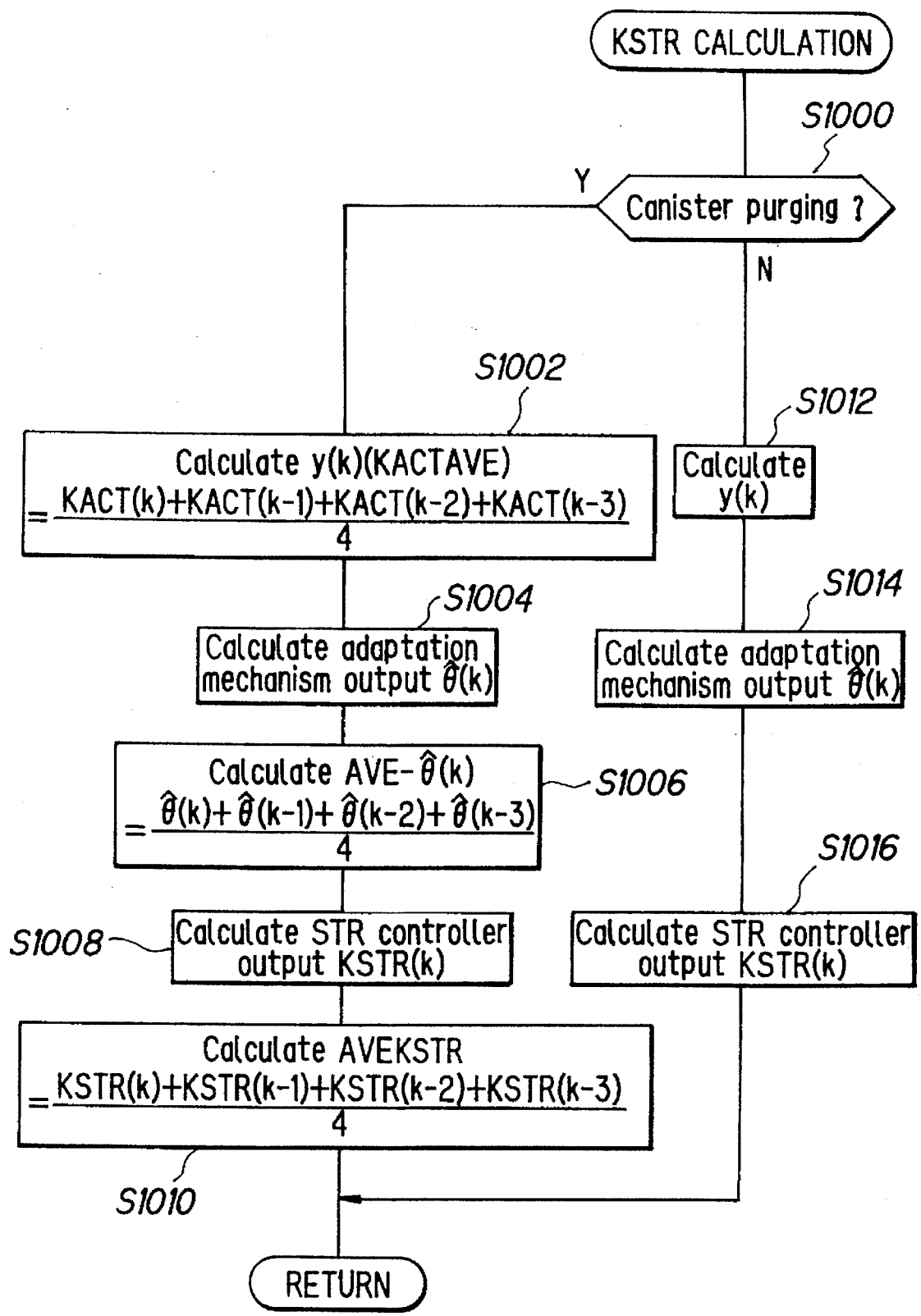
FIG. 33 is a flowchart, similar to FIG. 10, but showing the operation of the system according to a ninth embodiment of the invention.

FIG. 33 shows a ninth embodiment of the system according to the invention, specifically the flowchart of a subroutine similar to that of FIG. 32 for calculating the average of the feedback correction coefficient KSTR and the like.

The problem mentioned in connection with the eighth embodiment of gas being unevenly introduced to the cylinders during exhaust gas recirculation may also be experienced under certain engine operating conditions when gas is supplied during canister purging. The ninth embodiment is for eliminating this problem.

The subroutine of the flowchart of FIG. 33 starts at S1000 in which it is checked whether canister purging is in effect, and when the result is YES, the program proceeds to S1002 and the following steps in which the average KACTAVE is calculated in the same manner as explained with reference to FIG. 10 in connection with the first embodiment. On the other hand, when the result in S1000 is NO, the program proceeds to S1012 and the following steps in which processing is conducted in the manner explained with reference to FIG. 10 in connection with the first embodiment.

Owing to the aforesaid configuration, the ninth embodiment achieves enhanced control performance by preventing a specific cylinder from greatly influencing the control when canister purge is implemented.

Although not shown in the figures, it is also preferable from the point of improving control performance to calculate and use the aforesaid average when combustion is unstable, as when atmospheric pressure Pa is low (the engine is at a high altitude), coolant temperature is low or lean-burn fuel metering control is in effect.

Figure 34:
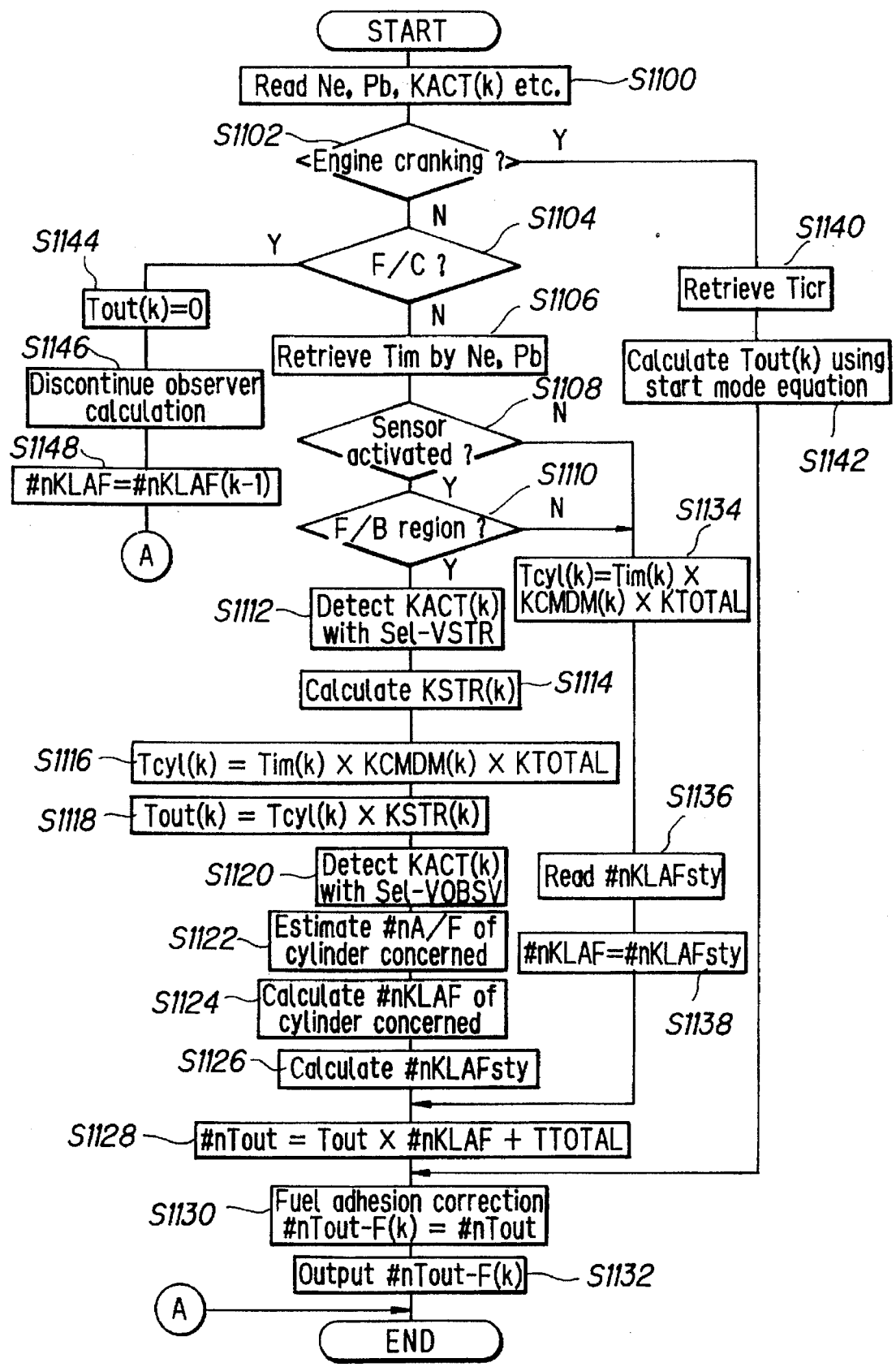
FIG. 34 is a flowchart, similar to FIG. 6, but showing the operation of the system according to a tenth embodiment of the invention.
Figure 35:
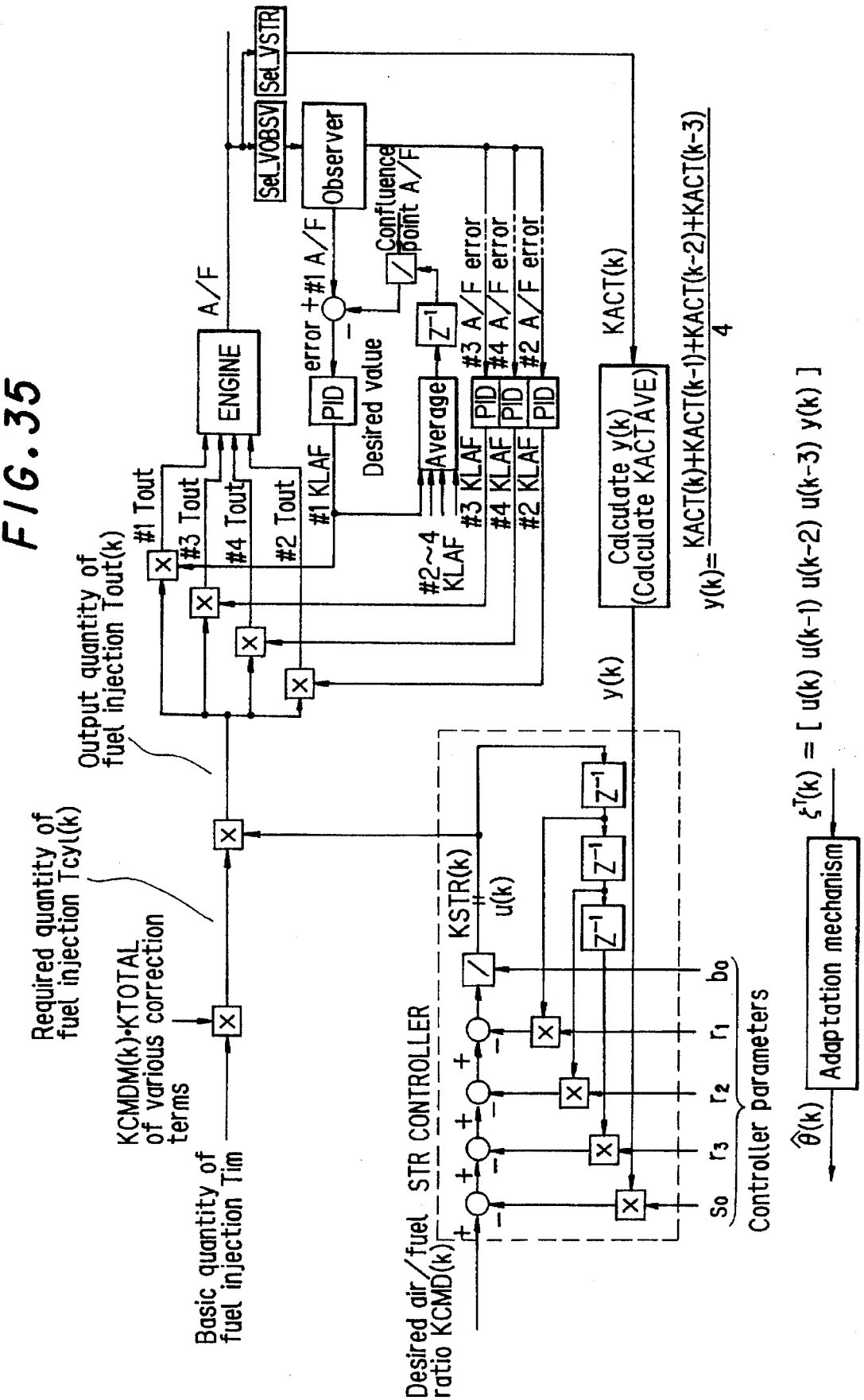
FIG. 35 is a block diagram showing the configuration of the system whose operation is illustrated in FIG. 34.
Figure 36:
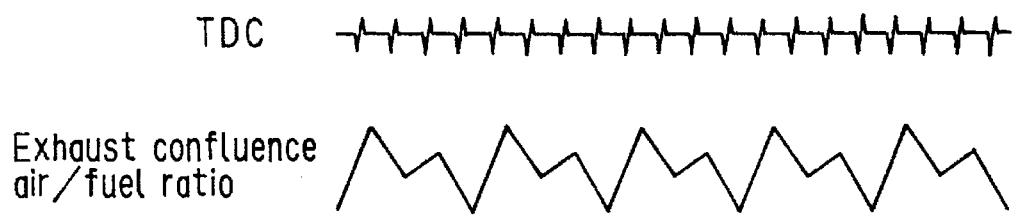
FIG. 36 is an explanatory view showing the relationship between the air/fuel ratio at the confluence point of the exhaust system of an engine relative to the TDC crank position.

FIG. 34 is a flowchart and FIG. 35 is a block diagram showing a tenth embodiment of the system according to the invention.

As shown in FIG. 35, the configuration of the tenth embodiment is that obtained by removing the exhaust system confluence point air/fuel ratio feedback loop (feedback correction coefficient KLAF) using the PID control law from the configuration of the first embodiment and adding thereto feedback loops using the PIE control law for the individual cylinders (feedback correction coefficient #nKLAF (n: cylinder concerned).

More specifically, the observer described in the assignee's earlier Japanese Laid-Open Patent Application No. Hei 5(1993)–180,040 is used to estimate the individual cylinder air/fuel ratios #nA/F (n:cylinder concerned) from the output of a single air/fuel ratio sensor installed at the exhaust system confluence point, the feedback correction coefficient #nKLAF for each cylinder is calculated using the PID control law based on the error between the estimated value and a prescribed desired value of the air/fuel ratio feedback control of the cylinder concerned, and the output quantity of fuel injection Tout is corrected by multiplication by the feedback correction coefficient #nKLAF.

More specifically, the cylinder-by-cylinder feedback correction coefficients #nKLAF are calculated using the PID control law so as to eliminate the error between the value obtained by dividing the air/fuel ratio at the confluence point by the average of the cylinder-by-cylinder feedback correction coefficients #nKLAF calculated in the preceding cycle (which is referred to in the foregoing manner as the "desired value of the air/fuel ratio feedback control of the cylinder concerned" and is a different value from the desired air/fuel ratio KCMD) and the air/fuel ratio #nA/F estimated by the observer. Since this is discussed in detail in the assignee's Japanese Patent Application No. Hei 5(1993)–251,138 Japanese Laid-Open Patent Application No. 7(1995) (filed in the United States on Sep. 13, 1994 under the number of 08/305,162), it will not be explained further here. The fuel adhesion compensator is also omitted from the figure.

In the tenth embodiment, the observer is equipped with a sampling block(indicated as Sel-VOBSV in the figures) for appropriately sampling the output of the LAF sensor, and the STR controller is equipped with a similar sampling block (indicated as Sel-VSTR in the figures).

The sampling blocks and the observer will now be explained.

Figure 37:
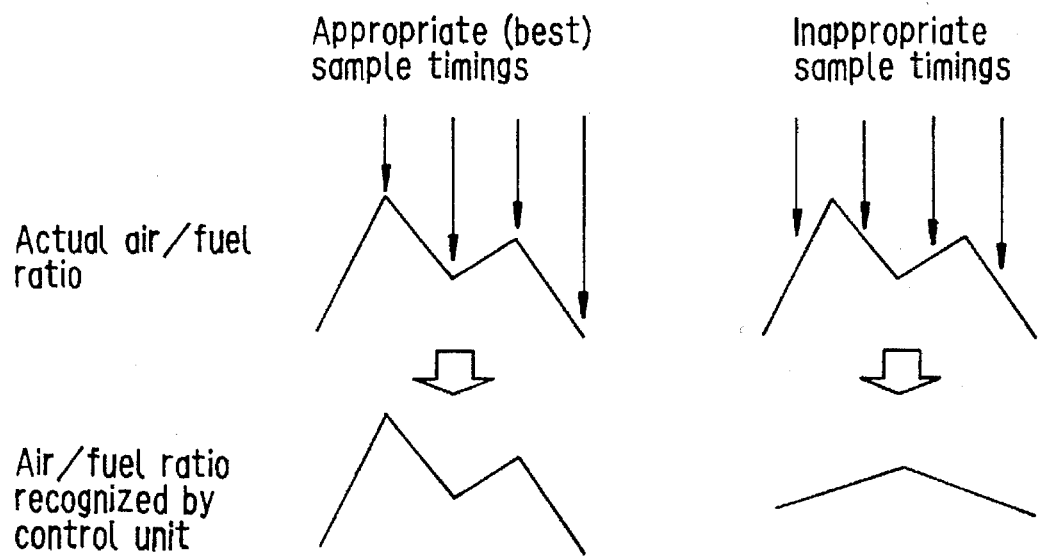
FIG. 37 is an explanatory view showing appropriate (best) sample timings of air/fuel ratio sensor outputs in contrast with inappropriate sample timings.

In an internal combustion engine, combusted gas is exhausted during the exhaust strokes at the individual cylinders. Thus, observation of the air/fuel ratio behavior at the exhaust system confluence point clearly shows that it varies synchronously with TDC. Sampling of the air/fuel ratio using the aforesaid LAF sensor installed in the exhaust system therefore has to be conducted synchronously with TDC. Depending on the sampling timing of the control unit (ECU) for processing the detection output, however, it may become impossible to ascertain the air/fuel ratio accurately. When the air/fuel ratio at the exhaust system confluence point varies with respect to TDC as shown in FIG. 35, for example, the air/fuel ratio ascertained by the control unit may, depending on the sampling timing, become a completely different value, as shown in FIG. 37. It is therefore preferable to sample at positions which enable the actual changes in the output of the air/fuel ratio sensor to be ascertained as accurately as possible.

In addition, the detected air/fuel ratio also varies depending on the time required for the exhaust gas to reach the sensor and on the sensor response time (detection delay). The time required for the exhaust gas to reach the sensor in turn varies with the exhaust gas pressure, exhaust gas volume and the like. Since sampling synchronously with TDC means that the sampling is based on crank angle, moreover, the effect of engine speed is unavoidable. From this, it will be understood that air/fuel ratio detection is highly dependent on engine operating conditions. In the prior art disclosed in Japanese Laid-Open Patent Application Hei 1(1989)–313,644), therefore, the practice has been to discriminate the appropriateness of the detection once every prescribed crank angle. Since this requires a complex configuration and long computation time, however, it may not be able to keep up at high engine speeds and is further apt to encounter the problem that the sensor output has already passed its inflection point by the time that the decision to sample has been made.

Figure 38:
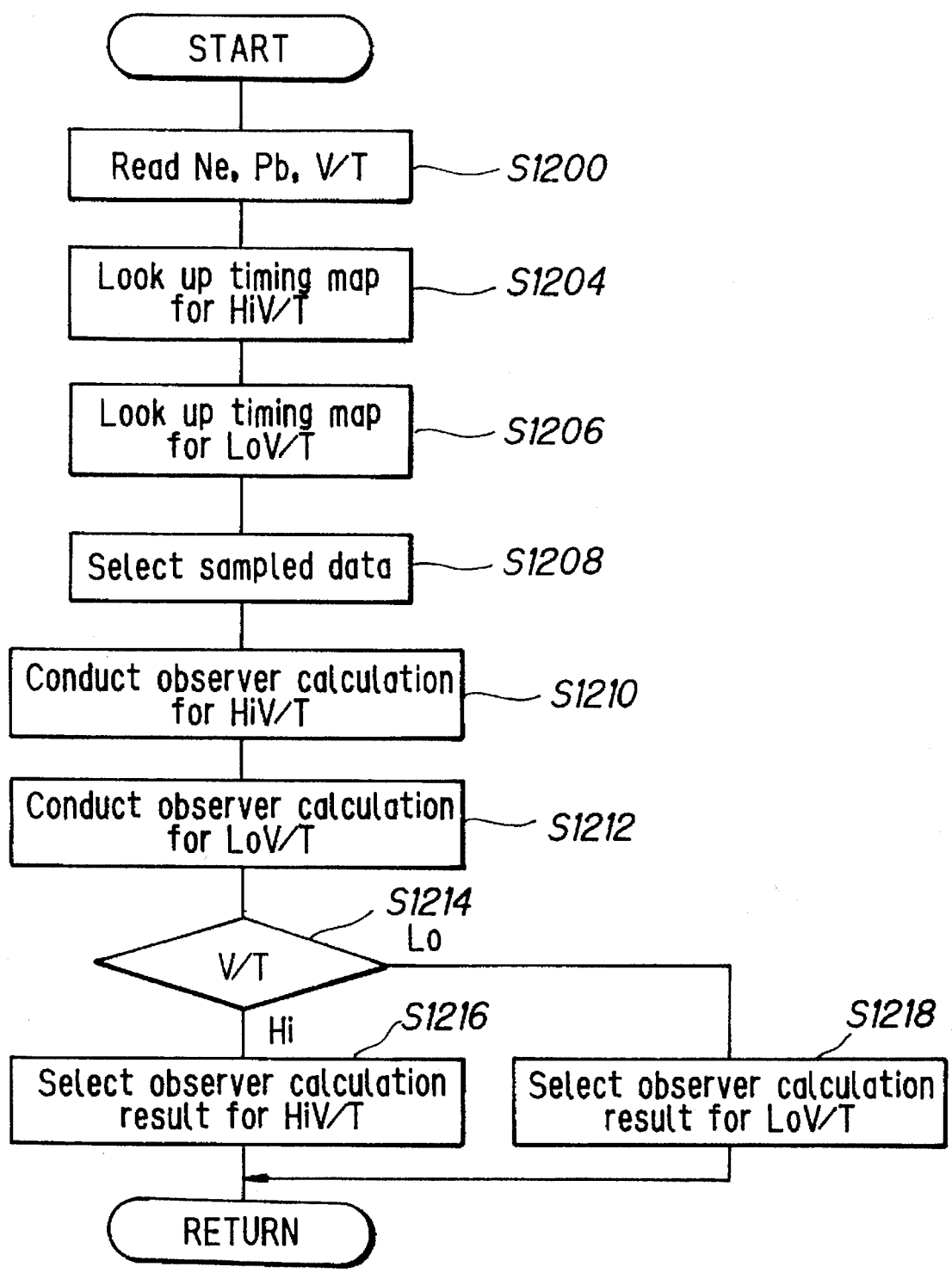
FIG. 38 is a flowchart showing the operation of the air/fuel ratio sampling conducted by the sampling block illustrated in FIG. 35.

FIG. 38 is a flowchart of the operations for sampling the LAF sensor. Since the accuracy of air/fuel ratio detection has a particularly close relationship with the estimation accuracy of the aforesaid observer, however, a brief explanation of the estimation of air/fuel ratio by the observer will be given before going into an explanation of this flowchart.

Figure 39:
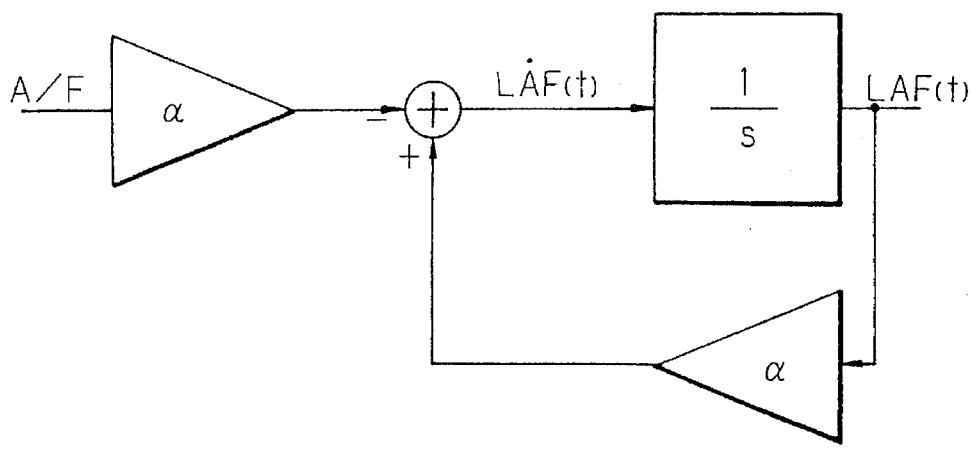
FIG. 39 is a block diagram showing a model we proposed previously which describes the detection behavior of the air/fuel ratio.

For high-accuracy separation and extraction of the air/fuel ratios of the individual cylinders form the output of a single LAF sensor, it is first necessary to accurately ascertain the detection response delay (lag time) of the LAF sensor. This delay was therefore modeled as a first-order delay system, to obtain the model shown in FIG. 39. Here, if we define LAF: LAF sensor output and A/F: input A/F, the state equation can be written as $$L\dot{A}F(t) = \alpha LAF(t) - \alpha A/F(t) \qquad \text{Eq. 24}$$

Discretizing this for period Delta T, yields $$LAF(k+1) = \hat{\alpha} LAF(k) + (1-\hat{\alpha})A/F(k) \qquad \text{Eq. 25}$$

Here, $\hat{\alpha}$ is the correction coefficient and is defined as:

$$\hat{\alpha} = 1 + \alpha \Delta T + (½!)\alpha^2 \Delta T^2 + (⅓!)\alpha^3 \Delta T^3 + (¼!)\alpha^4 \Delta T^4$$

Figure 40:
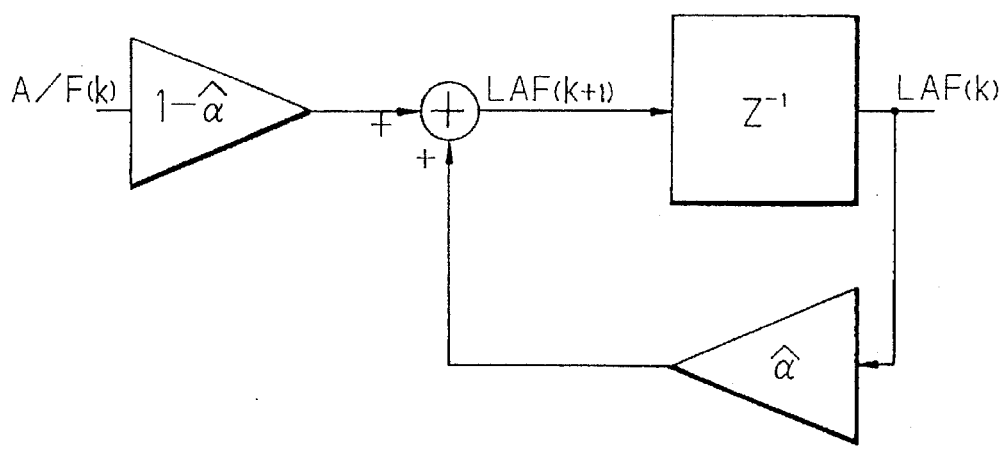
FIG. 40 is a block diagram which shows the model of FIG. 39 discretized in the discrete-time series for a period delta T.

Eq. 25 is represented as a block diagram in FIG. 40.

Therefore, Eq. 25 can be used to obtain the actual air/fuel ratio from the sensor output. That is to say, since Eq. 25 can be rewritten as Eq. 26, the value at time k–1 can be calculated back from the value at time $\underline{k}$ as shown by Eq. 27.

$$A/F(k) = \{LAF(k+1) - \hat{\alpha} LAF(k)\}/(1-\hat{\alpha}) \qquad \text{Eq. 26}$$

$$A/F(k-1) = \{LAF(k) - \hat{\alpha} LAF(k-1)\}/(1-\hat{\alpha}) \qquad \text{Eq. 27}$$

Figure 41:
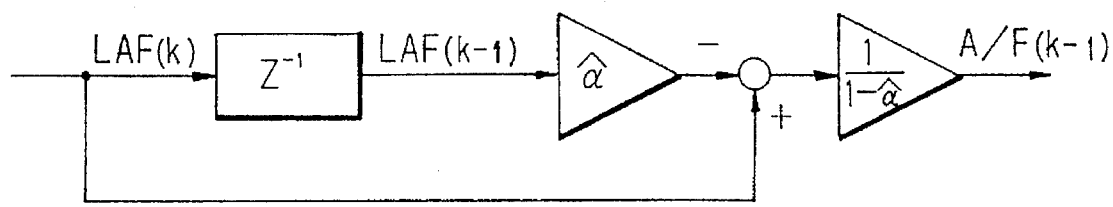
FIG. 41 is a block diagram showing a real-time air/fuel ratio estimator based on the model of FIG. 40.

Specifically, use of the Z transformation to express Eq. 25 as a transfer function gives Eq. 28, and a real-time estimate of the air/fuel ratio input in the preceding cycle can be obtained by multiplying the sensor output LAF of the current cycle by the reciprocal of this transfer function. FIG. 41 is a block diagram of the real-time A/F estimator.

$$t(z) = (1-\hat{\alpha})/(Z-\hat{\alpha}) \qquad \text{Eq. 28}$$

The separation and extraction of the air/fuel ratios of the individual cylinders using the actual air/fuel ratio obtained in the foregoing manner will now be explained. As explained in the earlier application, the air/fuel ratio at the exhaust system confluence point can be assumed to be an average weighted to reflect the time-based contribution of the air/fuel ratios of the individual cylinders. This makes it possible to express the air/fuel ratio at the confluence point at time $\underline{k}$ in the manner of Eq. 29. (As F (fuel) was selected as the controlled variable, the fuel/air ratio F/A is used here. For easier understanding, however, the air/fuel ratio will be used in the explanation so long as such usage does not lead to confusion. The term "air/fuel ratio" (or "fuel/air ratio") used herein is the actual value corrected for the response delay calculated according to Eq. 28.)

$$[F/A](k) = C_1[F/A\#_1] + C_2[F/A\#_3] + C_3[F/A\#_4] + C_4[F/A\#_2] \qquad \text{Eq. 29}$$

$$[F/A](k+1) = C_1[F/A\#_3] + C_2[F/A\#_4] + C_3[F/A\#_2] + C_4[F/A\#_1]$$

$$[F/A](k+2) = C_1[F/A\#_4] + C_2[F/A\#_2] + C_3[F/A\#_1] + C_4[F/A\#_3]$$

Figure 42:
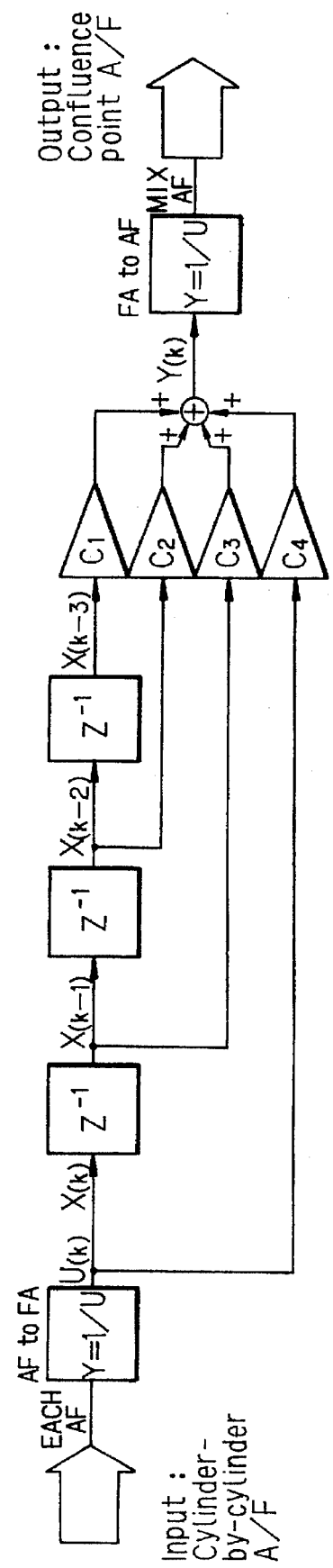
FIG. 42 is a block diagram showing a model we proposed previously which describes the behavior of the exhaust system of the engine.

More specifically, the air/fuel ratio at the confluence point can be expressed as the sum of the products of the past firing histories of the respective cylinders and weighting coefficient Cn (for example, 40% for the cylinder that fired most recently, 30% for the one before that, and so on). This model can be represented as a block diagram as shown FIG. 42.

Its state equation can be written as $$\begin{pmatrix} x(k-2) \\ x(k-1) \\ x(k) \end{pmatrix} = \begin{pmatrix} 010 \\ 001 \\ 000 \end{pmatrix} \begin{pmatrix} x(k-3) \\ x(k-2) \\ x(k-1) \end{pmatrix} + \begin{pmatrix} 0 \\ 0 \\ 1 \end{pmatrix} u(k) \quad \text{Eq. 30}$$

Further, when the air/fuel ratio at the confluence point is defined as y(k), the output equation can be written as $$y(k) = [c_1 \, c_2 \, c_3] \begin{pmatrix} x(k-3) \\ x(k-2) \\ x(k-1) \end{pmatrix} + c_4 u(k) \quad \text{Eq. 31}$$

Here:

$c_1$:0.05, $c_2$:0.15, $c_3$:0.30, $c_4$:0.50

Since u(k) in this equation cannot be observed, even when an observer is designed from the equation, it will still not be possible to observe x(k). Thus, when one defines x(k+1)=x(k−3) on the assumption of a stable operating state in which there is no abrupt change in the air/fuel ratio from that of 4 TDCs earlier (i.e., from that of the same cylinder), Eq. 32 is obtained.

$$\begin{pmatrix} x(k-2) \\ x(k-1) \\ x(k) \\ x(k+1) \end{pmatrix} = \begin{pmatrix} 0100 \\ 0010 \\ 0001 \\ 1000 \end{pmatrix} \begin{pmatrix} x(k-3) \\ x(k-2) \\ x(k-1) \\ x(k) \end{pmatrix} \quad \text{Eq. 32}$$

$$y(k) = [c_1 \, c_2 \, c_3 \, c_4] \begin{pmatrix} x(k-3) \\ x(k-2) \\ x(k-1) \\ x(k) \end{pmatrix}$$

Figure 43:
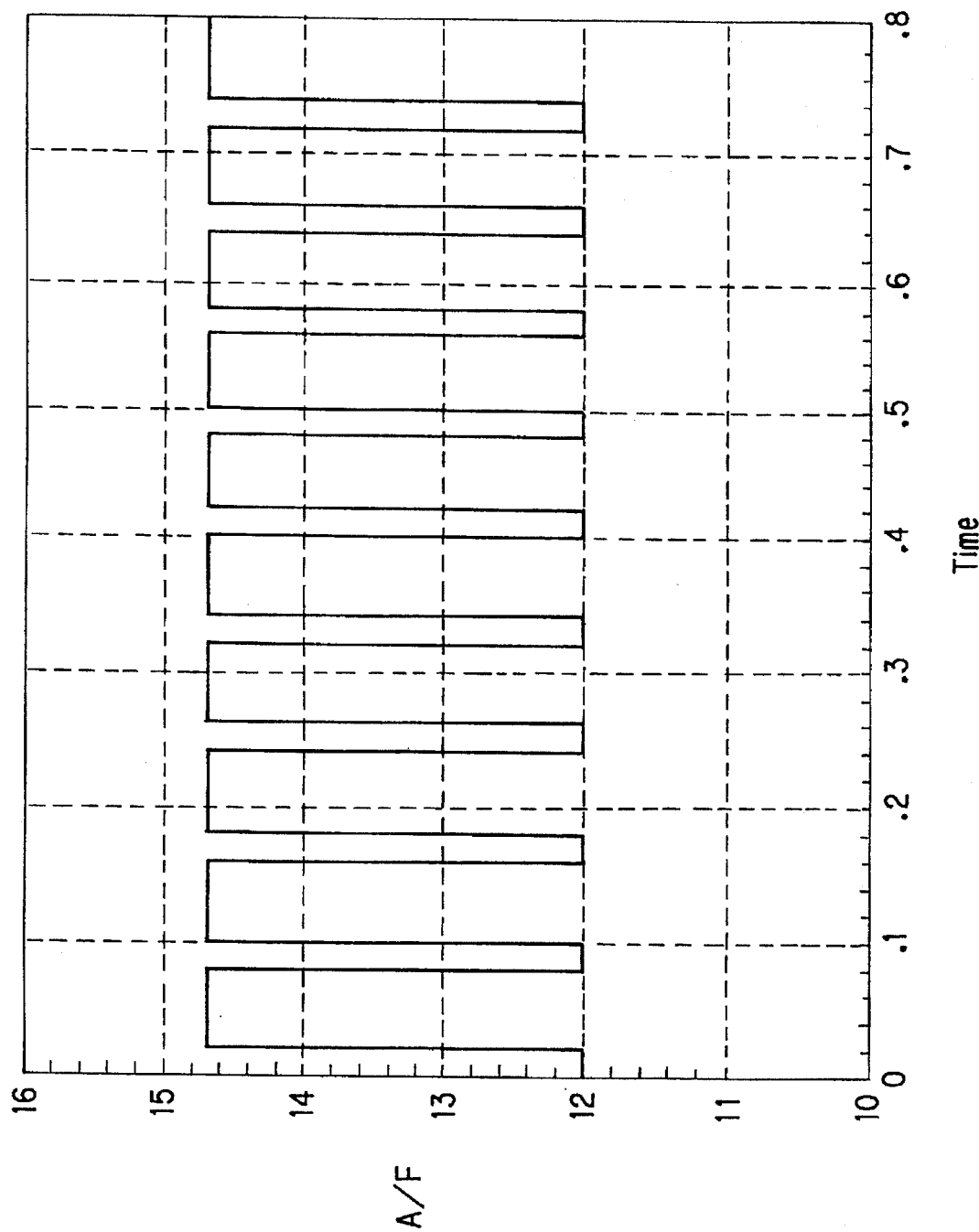
FIG. 43 is a graph showing the precondition of a simulation where fuel is assumed to be supplied to three cylinders of a four-cylinder engine so as to obtain an air/fuel ratio of 14.7:1, and to one cylinder at 12.0:1.
Figure 44:
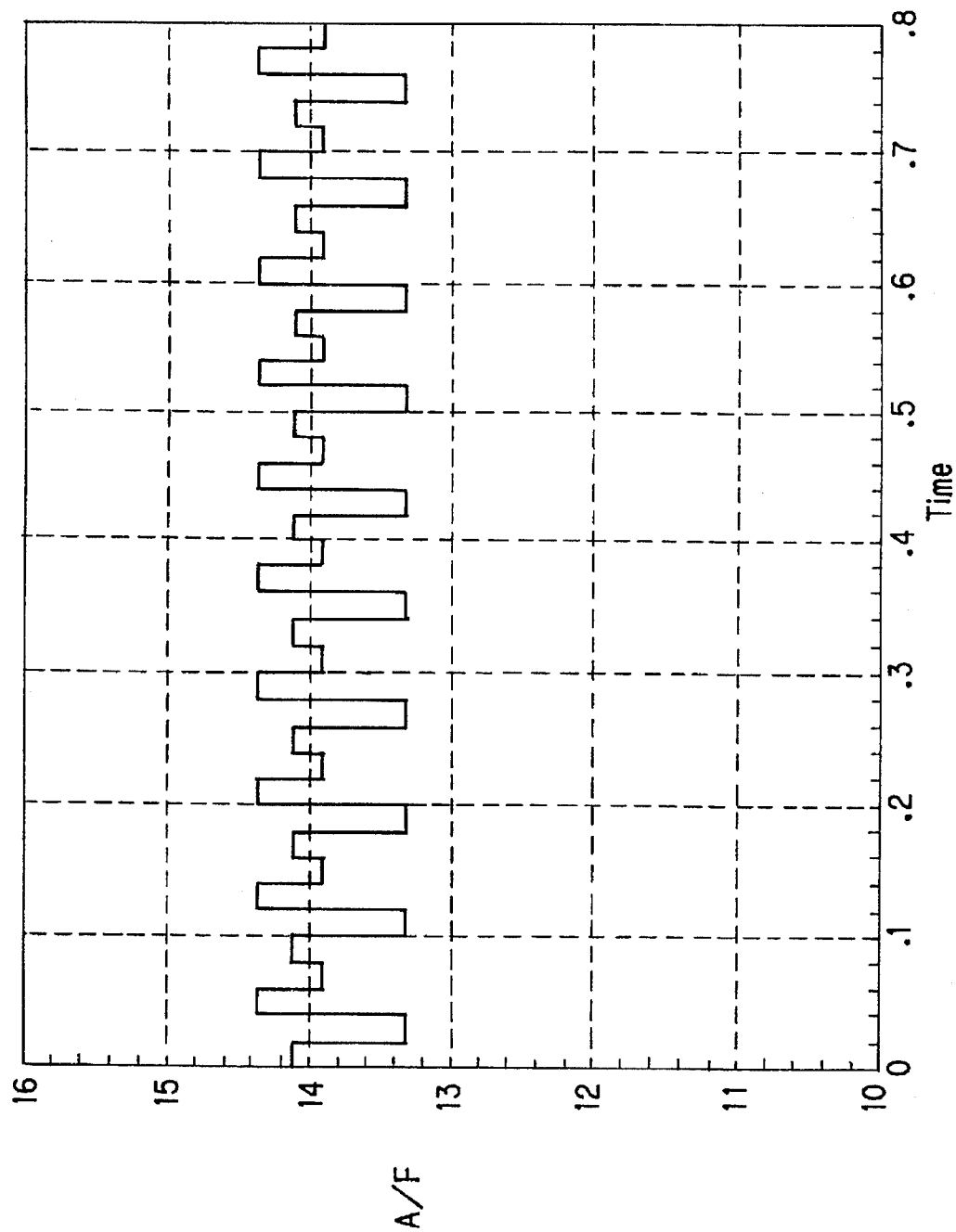
FIG. 44 is a graph showing the result of the simulation which shows the output of the exhaust system model, and the air/fuel ratio at a confluence point when the fuel is supplied in the manner illustrated in FIG. 43.
Figure 45:
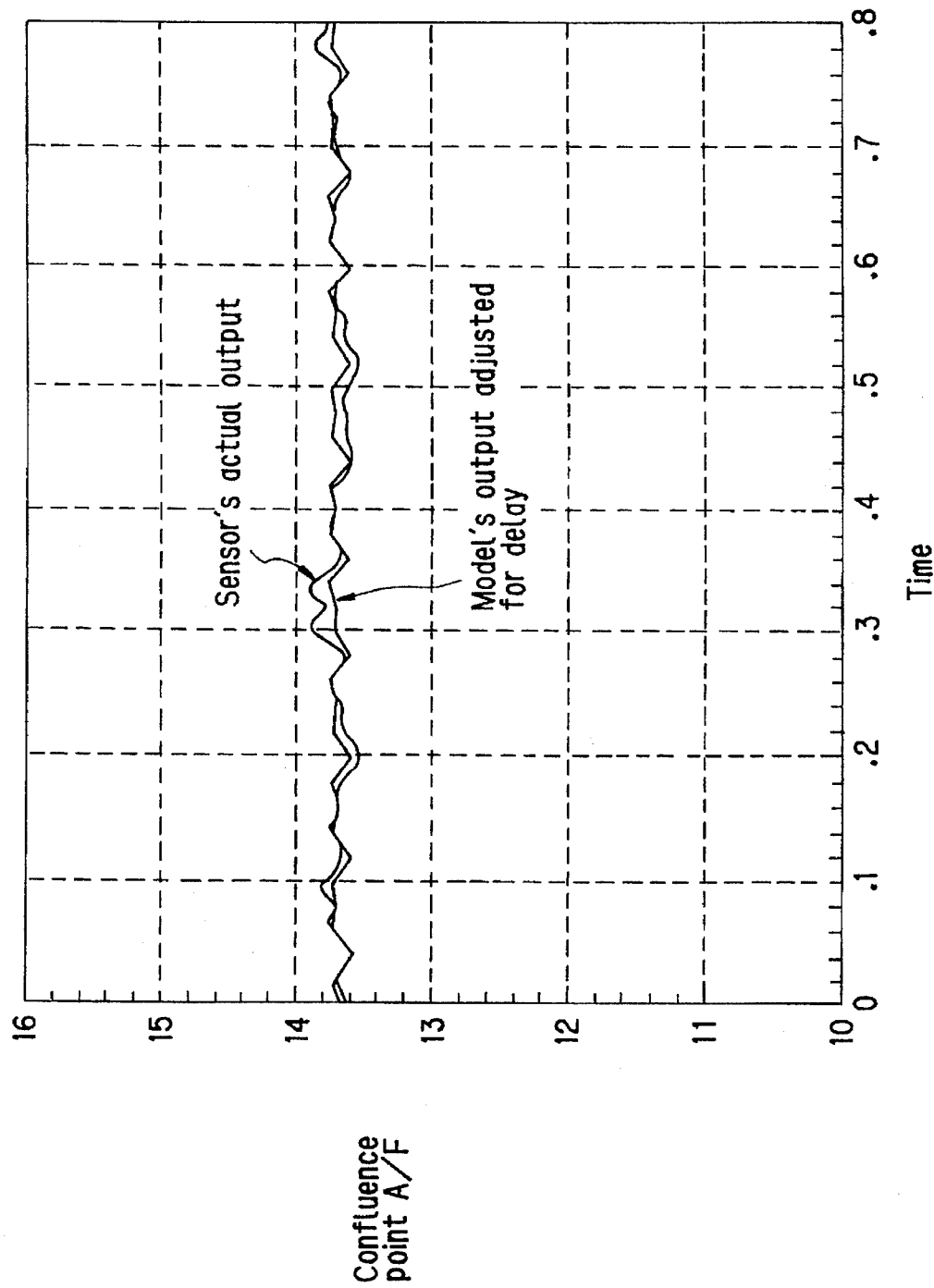
FIG. 45 is the result of the simulation which shows the output of the exhaust system model adjusted for sensor detection response delay (time lag) in contrast with the sensor's actual output.

The simulation results for the model obtained in the foregoing manner will now be given. FIG. 43 relates to the case where fuel is supplied to three cylinders of a four-cylinder internal combustion engine so as to obtain an air/fuel ratio of 14.7:1, and to one cylinder so as to obtain an air/fuel ratio of 12.0:1. FIG. 44 shows the air/fuel ratio at this time at the confluence point as obtained using the aforesaid model. While FIG. 44 shows that a stepped output is obtained, when the response delay of the LAF sensor is taken into account, the sensor output becomes the smoothed wave designated "Model's output adjusted for delay" in FIG. 45. The curve marked "Sensor's actual output" is based on the actually observed output of the LAF sensor under the same conditions. The close agreement of the model results with this verifies the validity of the model as a model of the exhaust system of a multiple cylinder internal combustion engine.

Thus, the problem comes down to one of an ordinary Kalman filter in which x(k) is observed in the state equation (Eq. 33) and the output equation. When the weighting parameters Q, R are determined as Eq. 34 and Riccati's equation is solved, the gain matrix K becomes as shown in Eq. 35.

$$\begin{cases} X(k+1) = AX(k) + Bu(k) \\ y(k) = CX(k) + Du(k) \end{cases} \quad \text{Eq. 33}$$

-continued

Here:

$$A = \begin{pmatrix} 0100 \\ 0010 \\ 0001 \\ 1000 \end{pmatrix} \quad C = [c_1 c_2 c_3 c_4] \quad B = D = [0]$$

$$X(k) = \begin{pmatrix} x(k-3) \\ x(k-2) \\ x(k-1) \\ x(k) \end{pmatrix}$$

$$Q = \begin{pmatrix} 1000 \\ 0100 \\ 0010 \\ 0001 \end{pmatrix} \quad R = [1] \quad \text{Eq. 34}$$

$$K = \begin{pmatrix} 0.0436 \\ 0.2822 \\ 1.8283 \\ -0.2822 \end{pmatrix} \quad \text{Eq. 35}$$

Obtaining $A - KC$ from this gives Eq. 36.

$$A - KC = \begin{pmatrix} -0.0022 & 0.9935 & -0.0131 & -0.0218 \\ -0.0141 & -0.0423 & 0.9153 & -0.1411 \\ -0.0914 & -0.2742 & -0.5485 & 0.0858 \\ 1.0141 & 0.0423 & 0.0847 & 0.1411 \end{pmatrix} \quad \text{Eq. 36}$$

Figure 46:
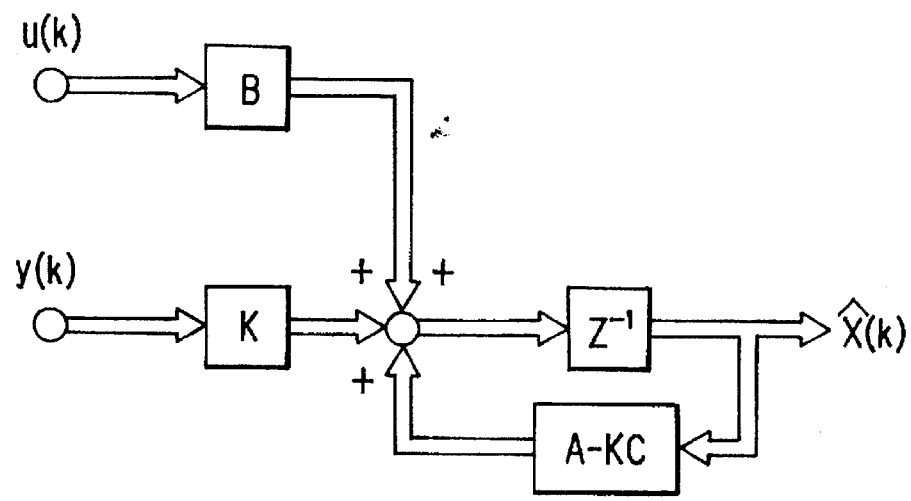
FIG. 46 is a block diagram showing the configuration of an ordinary observer.
Figure 47:
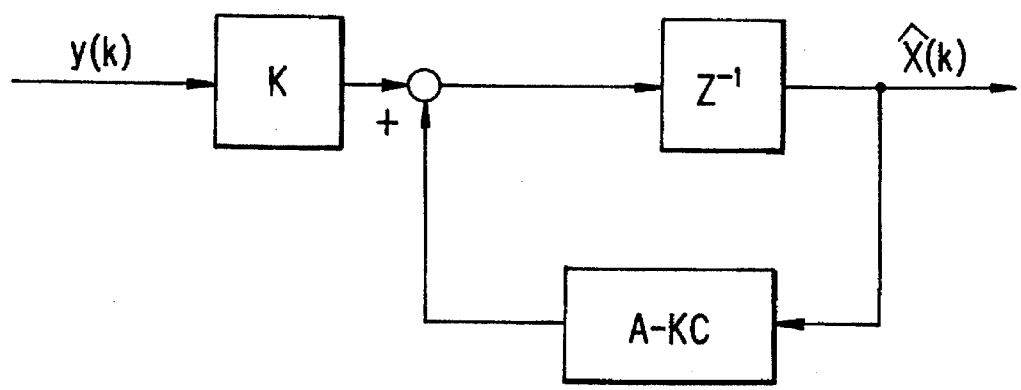
FIG. 47 is a block diagram which shows the configuration of the observer we proposed previously.

FIG. 46 shows the configuration of an ordinary observer. Since there is no input u(k) in the present model, however, the configuration has only y(k) as an input, as shown in FIG. 47. This is expressed mathematically by Eq. 37.

$$\begin{cases} \hat{X}(k+1) = [A - KC]\hat{X}(k) + Ky(k) \\ \hat{x}(k) = [0001] \hat{X}j(k) \end{cases} \quad \text{Eq. 37}$$

The system matrix of the observer whose input is y(k), namely of the Kalman filter, is $$S = \begin{pmatrix} A - KC & | & K \\ \hline 0001 & | & 0 \end{pmatrix} \quad \text{Eq. 38}$$

In the present model, when the ratio of the element of the weighting parameter R in Riccati's equation to the element of Q is 1:1, the system matrix S of the Kalman filter is given as $$S = \begin{pmatrix} -0.0022 & 0.9935 & -0.0131 & -0.0218 & 0.0436 \\ -0.0141 & -0.0423 & 0.9153 & -0.1411 & 0.2822 \\ -0.0914 & -0.2742 & -0.5485 & 0.0858 & 1.8283 \\ 1.0141 & 0.0423 & 0.0847 & 0.1411 & 0.2822 \\ 0.0000 & 0.0000 & 0.0000 & 0.0000 & 0.0000 \end{pmatrix} \quad \text{Eq. 39}$$

Figure 48:
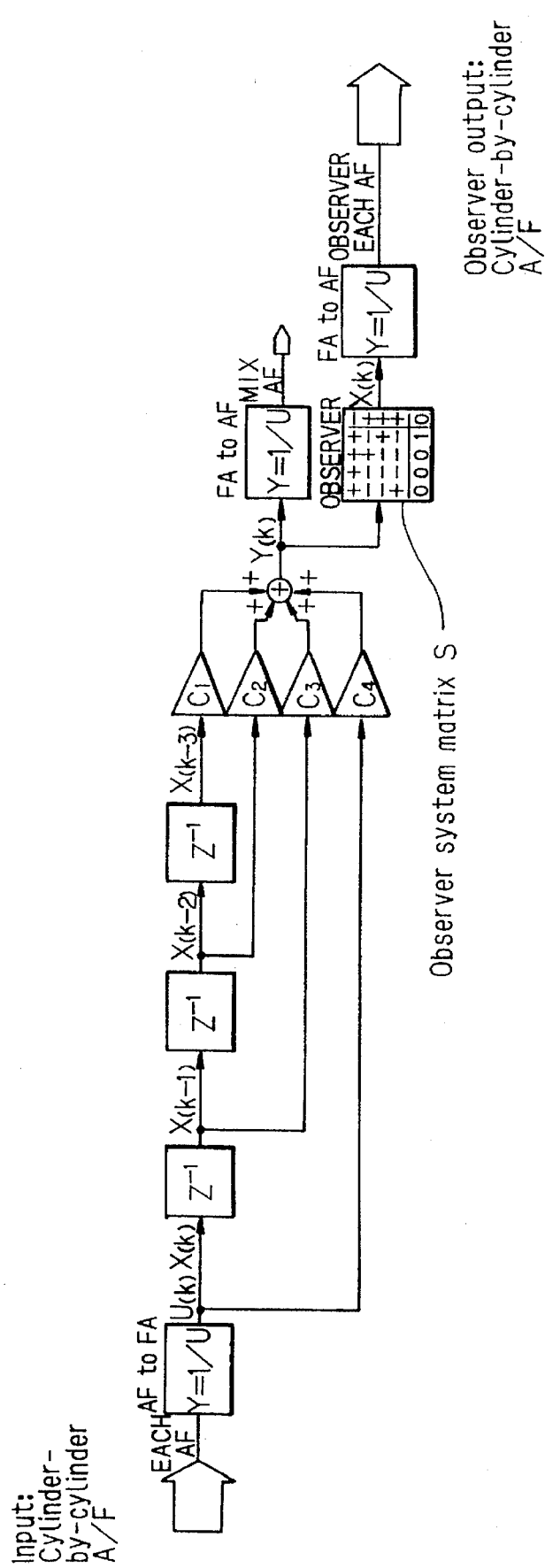
FIG. 48 is an explanatory block diagram showing the configuration achieved by combining the model of FIG. 42 and the observer of FIG. 47.

FIG. 48 shows the aforesaid model and observer combined. As the results of the simulation are shown in the before-mentioned Japanese application, they are omitted here. It suffices to say that this enables precise estimation of the air/fuel ratios at the individual cylinders from the air/fuel ratio at the confluence point.

Since the observer is able to estimate the cylinder-by-cylinder air/fuel ration from the air/fuel ratio at the confluence point, the air/fuel ratios of the individual cylinders can be separately controlled by PID control or the like. Specifically, as illustrated in FIG. 49, in which the feedback section of the observer of FIG. 35 is extracted and shown by itself, a confluence point feedback correction coefficient KLAF is calculated from the sensor output (confluence point air/fuel ratio) and the desired air/fuel ratio using the PID control law, and cylinder-by-cylinder feedback correction coefficients #nKLAF (n:cylinder concerned) are calculated from the observer's estimated air/fuel ratio #nA/F.

More specifically, the cylinder-by-cylinder feedback correction coefficients #nKLAF are obtained by using the PID law to eliminate the error between the observer's estimated air/fuel ratio #nA/F and the desired value obtained by dividing the confluence point air/fuel ratio by the average value of the cylinder-by-cylinder feedback correction coefficients #nKLAF calculated in the preceding cycle.

Owing to this convergence of the air/fuel ratios of the individual cylinders to the confluence point air/fuel ratio and convergence of the confluence point air/fuel ratio to the desired air/fuel ratio, the air/fuel ratios of all cylinders are converged to the desired air/fuel ratio. The output quantity of fuel injection #nTout (n:cylinder concerned) is determined by the fuel injector opening period and can be calculated as $$\#nTout = Tcyl \times KCMD \times \#nKLAF \times KLAF$$

The sampling of the LAF sensor output will now be explained with reference to the flowchart of FIG. 38. This subroutine is activated at TDC.

The subroutine of the flowchart of FIG. 38 starts at S1200 in which the engine speed Ne, the manifold pressure Pb and the valve timing V/T are read. The program then goes to S1204 and S1206 in which Hi and Lo valve timing maps (explained later) are looked up and to S1208 in which the sensor output is sampled for use in observer computation at Hi or Lo valve timing. Specifically, the timing map is looked up using the detected engine speed Ne and the manifold pressure Pb as address data, the No. of one of the aforesaid 12 buffers is selected, and the sampling value stored therein is selected.

Figure 50:
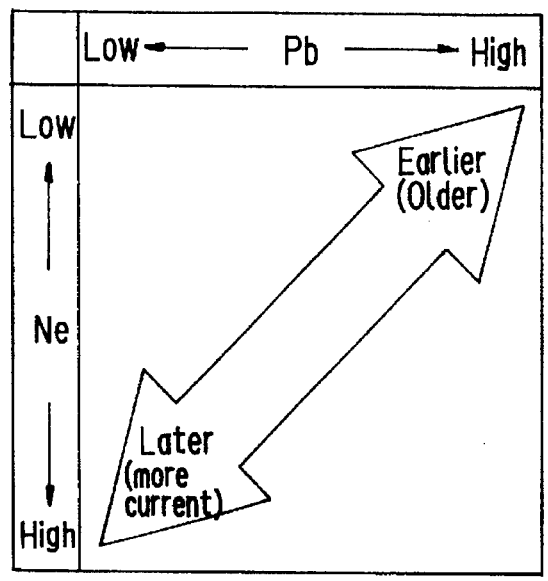
FIG. 50 is an explanatory view showing the characteristics of a timing map referred to in the flowchart of FIG. 38.

FIG. 50 shows the characteristics of the timing maps. As shown, the characteristics are defined so that the sampling crank angle of the selected value becomes earlier with decreasing engine speed Ne and increasing manifold pressure (load) Pb. By an "earlier" value is meant a relatively older one sampled nearer to the preceding TDC. Conversely, the characteristics are defined so that the sampling crank angle of the selected value becomes later (becomes a newer value nearer to the following TDC) with increasing engine speed Ne and decreasing manifold pressure Pb.

Figure 51:
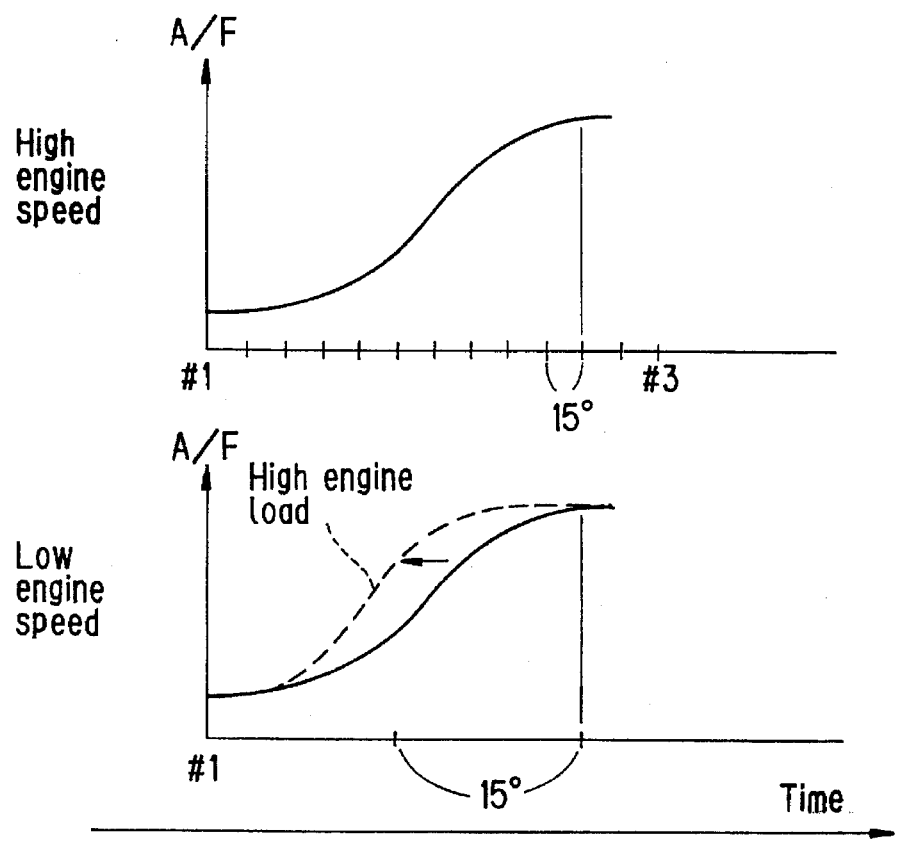
FIG. 51 is a timing chart showing the characteristics of sensor output with respect to the engine speed, and a timing chart showing the characteristics of sensor output with respect to the engine load.

It is best to sample the LAF sensor output as close as possible to the inflection point of the actual air/fuel ratio, as shown in FIG. 37. Assuming the sensor response time (detection lag) to be constant, this inflection point, or the first peak thereof, for example, will, as shown in FIG. 51, occur at progressively earlier crank angles with decreasing engine speed. As engine load increases, the exhaust gas can be expected to increase in pressure and volume and therefore reach the sensor earlier owing to its higher flow rate. This is why the selection of the sampled data is determined as shown in FIG. 50.

The valve timing will now be discussed. Defining an arbitrary engine speed on the Lo side as Ne1-Lo and on the Hi side as Ne1-Hi and an arbitrary manifold pressure on the Low side as Pb1-Lo and on the Hi side as Pb1-Hi, the values are mapped such that Pb1-Lo>Pb1-Hi and Ne1-Lo>Ne1-Hi.

In other words, since the time point at which the exhaust valve opens is earlier at HiV/T than at LoV/T, the map characteristics are determined so that an earlier sampling point is selected at HiV/T than at LoV/T insofar as the engine speed and manifold pressure are the same.

The program then goes to S1210 in which the observer matrix is computed for HiV/T and to S1212 in which the computation is similarly made for LoV/T. It then proceeds to S1214 in which the valve timing is discriminated again and, depending on the result of the discrimination, to S1216 in which the computation result for HiV/T is selected or to S1218 in which that for LoV/T is selected. This completes the routine.

In other words, since the behavior of the confluence point air/fuel ratio also varies with the valve timing, the observer matrix has to be changed synchronously with the switching of the valve timing. However, the estimation of the air/fuel ratios at the individual cylinders is not conducted instantaneously. Since several cycles are required for the observer computation to converge, the computations using the observer matrices before and after valve timing switchover are conducted in parallel and one of the computation results is selected in accordance with the new valve timing in S1214, after the valve timing change operation. After the estimation has been made for the individual cylinders, the feedback correction coefficient is calculated for eliminating the error relative to the desired value and the quantity of fuel injection is determined.

Figure 52:
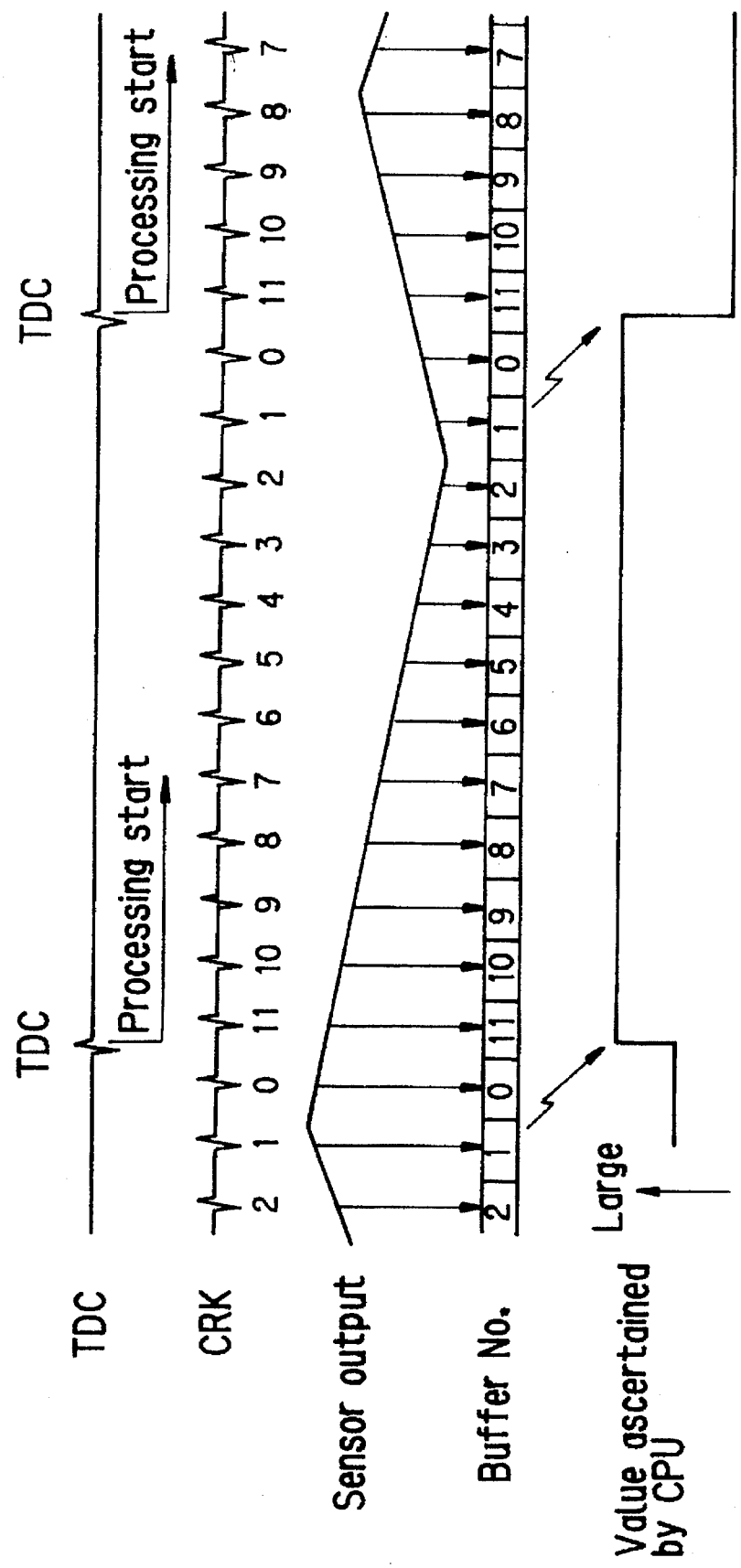
FIG. 52 is a timing chart showing the sampling of the air/fuel ratio sensor in the system.

The aforesaid configuration improves the accuracy of the air/fuel ratio detection. Since, as shown in FIG. 52, the sampling is conducted at relatively short intervals, the sampled values faithfully reflect the sensor output and the values sampled at relatively short intervals are progressively stored in the group of buffers. The inflection point of the sensor is predicted from the engine speed and the manifold pressure and the corresponding value is selected from the group of buffers at the prescribed crank angle. The observer computation is then conducted for estimating the air/fuel ratios at the individual cylinders, thereby enabling cylinder-by-cylinder feedback control to be conducted as explained with reference to FIG. 49.

The CPU core 70 can therefore accurately ascertain the maximum and minimum values of the sensor output, as shown at the bottom of FIG. 52. As a result, the estimation of the air/fuel ratios of the individual cylinders using the aforesaid observer can be conducted using values that approximate the behavior of the actual air/fuel ratio, thereby enabling an improvement in accuracy when cylinder-by-cylinder air/fuel ratio feedback control is conducted in the manner described with reference to FIG. 49. As the particulars of this control are explained in the assignee's earlier Japanese Patent Application No. Hei 6(1994)–243,277 (Japanese Laid-Open Patent Application No. Hei 7(1995) –259,588), it will not be discussed further here.

While the foregoing describes only the sampling or air/fuel ratio determination in Sel-VOBSV in FIG. 35 for the observer with respect to the LAF sensor output, a similar operation will also be conducted for the STR controller in Sel-VSTR in FIG. 35.

The operation of Sel-VSTR is similar to that of Sel-VOBSV and thus follows a flowchart similar to the procedures of FIG. 38. While Sel-VOBSV is for achieving optimum timing of the air/fuel ratio detection in connection with the cylinder-by-cylinder air/fuel ratio estimation by the observer (e.g., optimum timing of the aforesaid weighting coefficient C with respect to the model), Sel-VSTR uses a map similar to that shown in FIG. 50 used by Sel-VOBSV for achieving optimum timing of the air/fuel ratio detection for the operation of the STR controller (e.g., the air/fuel ratio detection timing which maximizes the effect of the cylinder whose exhaust stroke is nearest).

Based on the foregoing, the tenth embodiment will now be explained with reference to the flowchart of FIG. 34. After executing S1100 to S1110, which are steps similar to those in the first embodiment, the program arrives at S1112 in which Sel-VSTR selects one from among the sampled data of the LAF sensor output, i.e., detects the air/fuel ratio KACT(k). It then goes to S1114 in which the feedback correction coefficient KSTR is calculated in the same manner as in the first embodiment, using the flowchart of FIG. 10 used in the first embodiment.

The program then goes to S1116 and S1118 in which the required quantity of fuel injection Tcyl(k) and the output quantity of fuel injection Tout(k) are calculated, and to S1120 in which the LAF sensor output is sampled by Sel-VOBSV, i.e., in which the air/fuel ratio KACT(k) is detected. The program next goes to S1122 in which the cylinder-by-cylinder air/fuel ratios #nA/F are estimated via the aforesaid observer, to S1124 in which the cylinder-by-cylinder feedback correction coefficient #nKLAF is calculated, to S1126 in which the a value #nKLAFsty is calculated through a learning, i.e., by obtaining a weighted average between #nKLAF and #nKLAF($k$-1) in the preceding cycle and the like, to S1128 in which the output quantity of fuel injection Tout is corrected by multiplication by the cylinder-by-cylinder feedback correction coefficient #nKLAF of the cylinder concerned to obtain the output quantity of fuel injection #nTout of the cylinder concerned, to S1130 in which compensation for fuel adhesion on the wall of the intake manifold is conducted, and to S1132 in which the result is output.

When the result in S1108 or S1110 is NO, the program goes to S1134 in which the required quantity of fuel injection Tcyl(k) is calculated in the manner shown, to S1136 in which the learned value of the cylinder-by-cylinder feedback correction coefficient #nKLAFsty is read, and to S1138 in which the correction coefficient #nKLAF is set to the learned value. When S1104 finds that the supply of fuel has been cut off, the program passes through S1144 to S1146 in which the matrix computation is discontinued, and to S1148 in which the cylinder-by-cylinder feedback correction coefficient is set to the value in the preceding cycle. The remaining steps are the same as those in the first embodiment.

Configured in the foregoing manner, the tenth embodiment, like the first, synchronizes input to the adaptation mechanism with the combustion cycle while calculating the controller parameters at every TDC, thereby greatly reducing the computational burden of the adaptation mechanism, enabling use of an adaptive controller in a commercially practical internal combustion engine without degrading control performance, and reducing variance among the cylinders.

Since also like the first embodiment it calculates and inputs to the adaptation mechanism the average of the detected air/fuel ratios KACT for all cylinders during each combustion cycle and the average of the controller parameters (vectors), and further calculates the average of the STR controller output, it ensures that the system is not greatly affected by the combustion state of a specific cylinder.

In the tenth embodiment it is also possible, as in the second embodiment, to calculate the average of the controller parameters or KSTR, or to calculate the averages of both the detected air/fuel KACT and of the controller parameters $\hat{\theta}$. It is also possible to set the same desired value KCMD(k) for all cylinders.

All of the statements made in the foregoing regarding the second, third, fourth, fifth, sixth, seventh, eighth and ninth embodiments also apply to the tenth embodiment.

Figure 53:
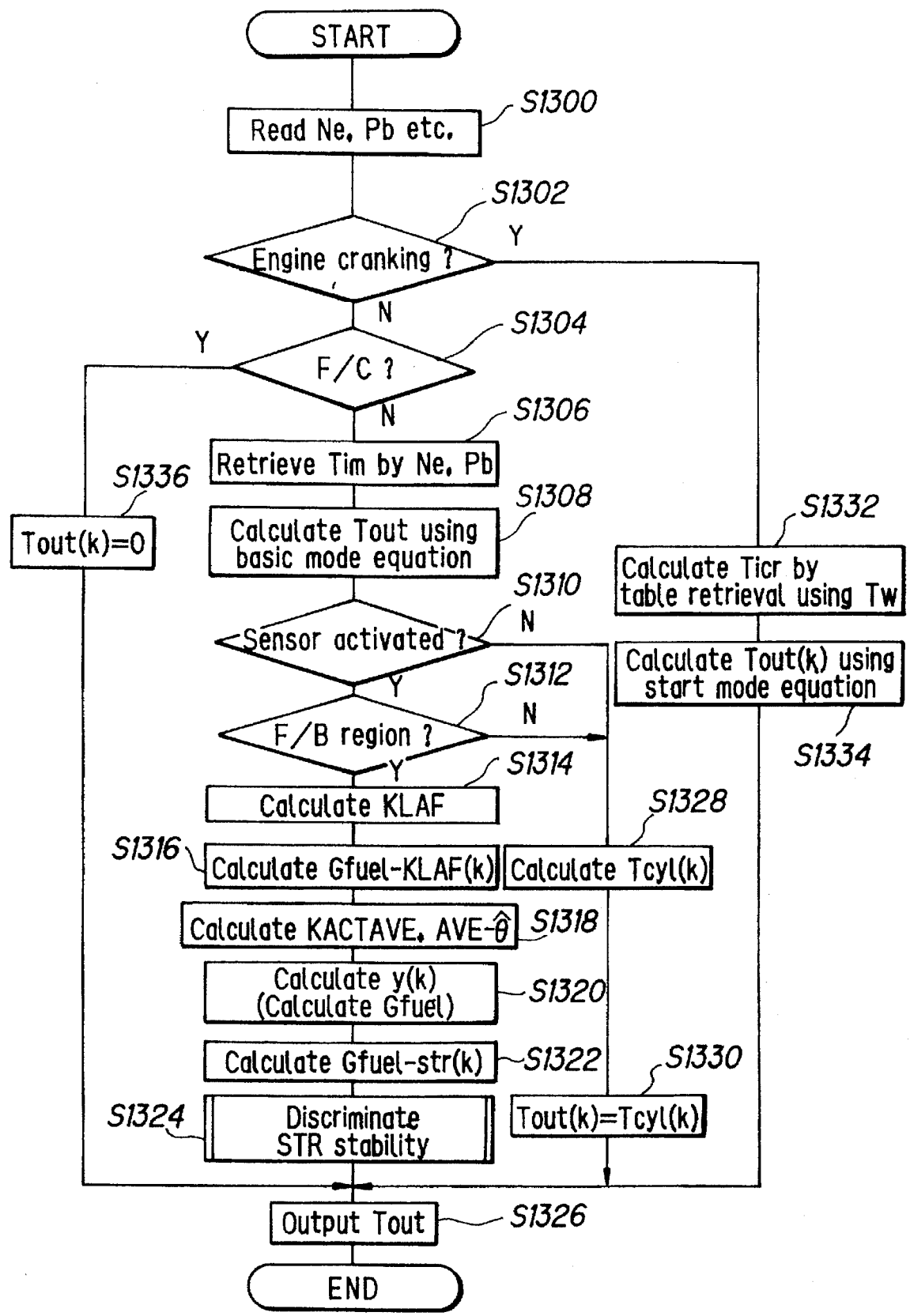
FIG. 53 is a flowchart, similar to FIG. 6, but showing the operation of the system according to an eleventh embodiment of the invention.
Figure 54:
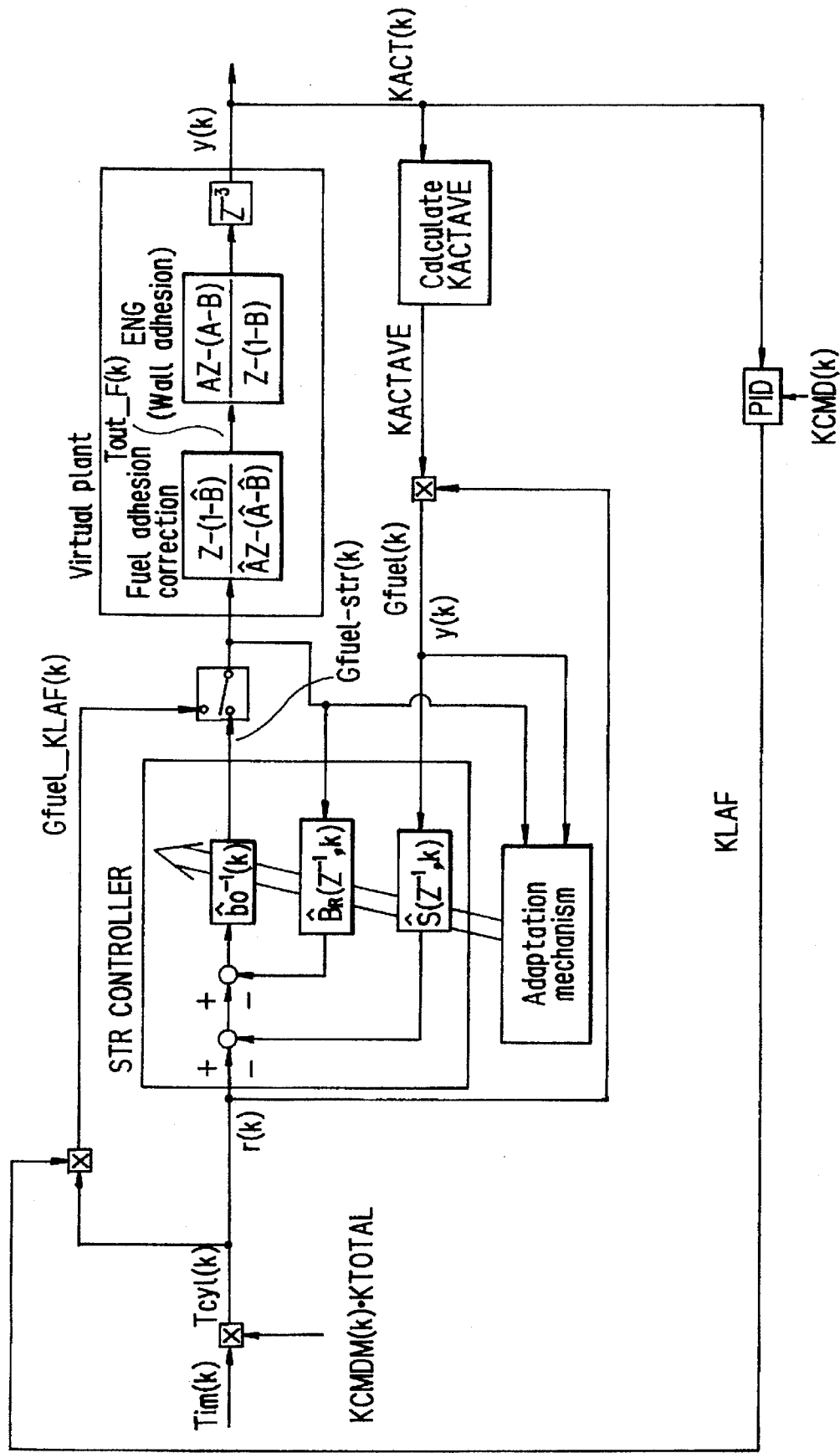
FIG. 54 is a block diagram showing the configuration of the system whose operation is illustrated in FIG. 53.

FIG. 53 is a flowchart and FIG. 54 is a block diagram showing an eleventh embodiment of the system according to the invention.

As shown in FIG. 54, in the eleventh embodiment the STR controller and the adaptation mechanism are disposed in series with the system for calculating the quantity of fuel injection. In other words, as in the first embodiment, the basic quantity of fuel injection Tim is first multiplied by the desired air/fuel ratio correction coefficient KCMDM(k) and the various correction coefficients KTOTAL to obtain the required quantity of fuel injection Tcyl(k) and the required quantity of fuel injection Tcyl(k) is then input to the STR controller.

On the other hand, also as in the first embodiment, the average values KACTAVE and/or AVE-$\hat{\theta}$ are calculated and the required quantity of fuel injection Tcyl(k) is dynamically corrected by the STR controller for calculating a corrected quantity of fuel injection Gfuel-str(k).

Simultaneously, the confluence point air/fuel ratio feedback correction coefficient KLAF is calculated from the detected confluence point air/fuel ratio using the PID control law and the required quantity of fuel injection Tcyl(k) is multiplied thereby to obtain a corrected quantity of fuel injection Gfuel-KLAF(k).

In FIG. 54, the STR controller adaptively calculates the output quantity of fuel injection Gfuel-str(k) to bring the actual (estimated) quantity of cylinder intake fuel Gfuel(k) to the desired quantity of fuel injection Tcyl(k) and supplies the result to the internal combustion engine as the output quantity of fuel injection Tout(k). Since the correction for fuel adhesion on the wall of the intake manifold is explained in detail in the assignee's Japanese Laid-Open Patent Application No. Hei 6(1994)–17,681 and is not directly related to the principle of this invention, it will not be explained here.

The actual (estimated) quantity of cylinder intake fuel Gfuel(k) can be calculated by dividing the detected quantity of air by the detected air/fuel ratio. However, in this embodiment, which is not equipped with an air flow meter, it is obtained by multiplying the desired quantity of fuel injection (required quantity of fuel injection) Tcyl(k) by the detected air/fuel ratio. The actual quantity of fuel injection calculated in this way is equivalent to that obtained by calculation from the detected quantity of air.

When the desired air/fuel ratio is not the stoichiometric air/fuel ratio, the actual (estimated) quantity of cylinder intake fuel is calculated by further dividing the calculated value by the desired air/fuel ratio. Specifically, when the desired air/fuel ratio is the stoichiometric air/fuel ratio, the actual (estimated) quantity of cylinder intake fuel is calculated as Actual (estimated) quantity of cylinder intake fuel=Required quantity of fuel injection (Desired quantity of fuel injection)×Detected air/fuel ratio, and when the desired air/fuel ratio is other than the stoichiometric air/fuel ratio, is calculated as Actual (estimated) quantity of cylinder intake fuel=(Required quantity of fuel injection (Desired quantity of fuel injection)× Detected air/fuel ratio)/Desired air/fuel ratio.

In the subroutine of the flowchart of FIG. 53, the program executes S1300 to S1316, which are steps similar to those in the earlier embodiments, and arrives at S1318 in which KACTAVE, the average of the air/fuel ratios, and AVE-$\hat{\theta}$, the average of the controller parameters (vectors) $\hat{\theta}$ are calculated.

The program then passes through S1320 and S1322 to S1324 in which the stability of the adaptive controller (the STR controller) is discriminated as in the first embodiment.

Figure 55:
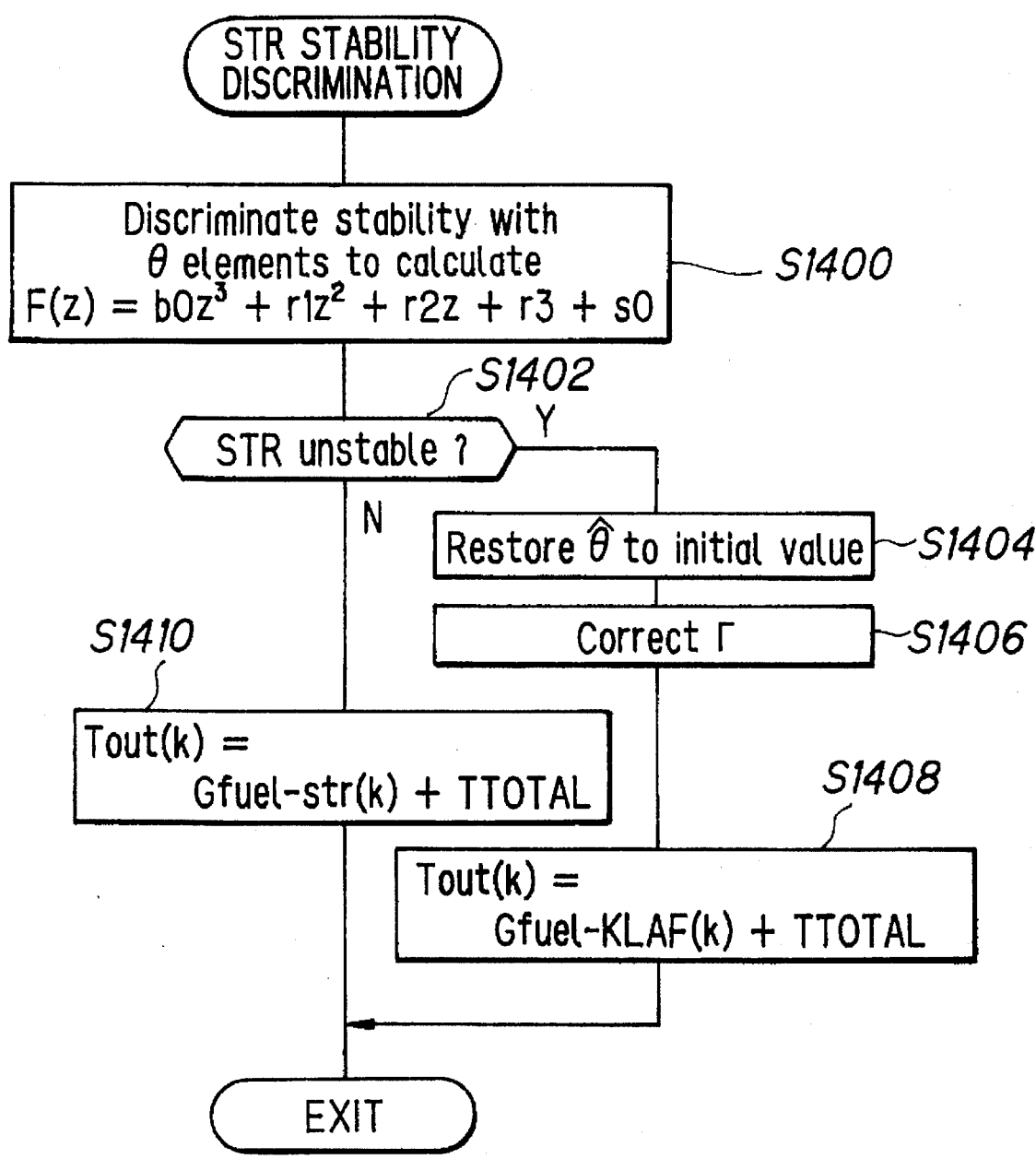
FIG. 55 is a subroutine flowchart of FIG. 53 showing the stability discrimination of the adaptive controller in the eleventh embodiment.

The subroutine for this is shown by the flowchart of FIG. 55.

This subroutine starts at S1400 in which the stability of the STR control system is discriminated using the elements of the controller parameters $\hat{\theta}$.

Specifically, the STR controller calculates the quantity of fuel injection Gfuel-STR(k) according to Eq. 40.

$$Tout\text{-}str(z^{-1}) = \{Tcyl(z^{-1}) - s_0 Gfuel(z^{-1}) - (r_1 z^{-1} + r_2 z^{-2} + r_3 z^{-3}) \times Gfuel\text{-}str(z^{-1})\}/b_0 \quad \text{Eq. 40}$$

Assuming that the fuel adhesion correction here is correct, the transfer function of the virtual plant becomes $$Gfuel(z^{-1}) = z^{-3} Gfuel\text{-}str(z^{-1}) \quad \text{Eq. 41}$$

It follows from Eq. 40 and Eq. 41 that the transfer function from Tcyl(k) to the quantity of fuel injection Gfuel-STR(k) is $$\frac{Gfuel\text{-}str(z)}{Tcyl(z)} = \frac{1}{b_0 z^3 + r_1 z^2 + r_2 z + r_3 + s_0} z^3 \quad \text{Eq. 42}$$

$$\therefore (b_0 + s_0 z^{-3} + r_1 z^{-1} + r_2 z^{-2} + r_3 z^{-3}) Gfuel\text{-}str(z^{-1}) = Tcyl(z^{-1})$$

Since b0 here is a scalar quantity determining the gain and therefore cannot be zero or negative, the denominator function $f(z) = b0Z^3 + r1Z^2 + r2Z + r3 + s0$ of the transfer function of Eq. 42 is one of the functions shown in FIG. 13. A check is therefore made as to whether the real root is within the unit circle. Specifically, as shown in FIG. 14, when it is found that $f(-1) < 0$ or $f(1) > 0$, this means that the real root is within the unit circle, from which it can be easily determined whether or not the system is stable.

The program then moves to S1402 in which it is checked whether the STR controller system is unstable. When the result is YES, the program goes to S1404 in which the controller parameters $\hat{\theta}$ are restored to their initial values. This restores the system stability. The program next goes to S1406 in which the gain matrix Γ is corrected. Since the gain matrix Γ determines the convergence rate of the adaptation mechanism, this correction is made so as to slow the convergence rate. This also enables restoration of system stability. The program then goes to S1408 in which the output quantity of fuel injection Tout(k) is calculated using as the feedback correction coefficient KLAF(k) determined by the PID control law, using the corrected quantity of fuel injection Gfuel-KLAF(k) and adding thereto the addition term TTOTAL.

If S1402 finds that the STR controller system is not unstable, the program goes to S1410 in which, as shown, the output quantity of fuel injection Tout(k) is calculated using the corrected quantity of fuel injection Gfuel-str(k) which uses the feedback correction coefficient KSTR(k) calculated by the adaptive control law as the feedback correction coefficient.

Returning to the flowchart of FIG. 53, the program proceeds to S1326 in which the output quantity of fuel injection is output, thus completing one control cycle. In the eleventh embodiment, unlike in the other embodiments, the calculation of the averages of the air/fuel ratio and the like need not be conducted at a prescribed crank angle of a specific cylinder but can instead be conducted at prescribed crank angles of the individual cylinders. The remaining steps are the same as those in the other embodiments.

Configured in the foregoing manner, the eleventh embodiment, like the first, can synchronize input to the adaptation mechanism with the combustion cycle (=4 TDCs) to calculate the controller parameters, while operating the STR controller at every control cycle (every TDC) and in such a case greatly reduces the computational burden of the parameter adaptation mechanism, enabling use of an adaptive controller in a commercially practical internal combustion engine without degrading control performance, and reducing variance among the cylinders. It also enhances control performance by reducing dead time.

In addition, since the eleventh embodiment calculates and inputs to the adaptation mechanism the average of the controlled variables for all of the cylinders, it is not strongly affected by the combustion state of only a specific cylinder.

While the first to eleventh embodiments were described with respect to the use of simple averages, the invention is not limited to this arrangement and it is possible instead to use weighted averages, moving averages, weighted moving averages and the like. Further, while it was described that averages are calculated during a single combustion cycle (=4 TDCs) with which the input to the adaptation mechanism is made synchronously, it is instead possible to calculate the averages for the most recent two combustion cycles (=8 TDCs) or to calculate the averages for less than one combustion cycle, e.g. for two or three TDCs.

It is of course best to establish Sel-VOBSV and Sel-VSTR separately and to have each detect the optimum air/fuel ratio. Depending on the engine characteristics and the exhaust system layout, however, Sel-VOBSV and Sel-VSTR may give substantially identical detected air/fuel ratios in most operating regions. In such cases, it is possible to consolidate the sampling functions of Sel-VOBSV and Sel-VSTR and apply the output obtained to both the observer and the STR controller. For example, the arrangement of FIG. 35 can be reconfigured to have only Sel-VOBSV and the output thereof be used by both the observer and the STR controller.

In addition, while in some of the embodiments, such as the first, the air/fuel ratio was expressed as the equivalence ratio, the air/fuel ratio and the equivalence ratio can instead be determined separately. Moreover, while the feedback correction coefficients KSTR, #nKLAF and KLAF were calculated as multiplication coefficients (terms) in the foregoing embodiments, they can instead be calculated as addition terms.

Further, while the TDC is used as the example of the prescribed or predetermined crank angle of a certain or all of the cylinders for inputting the controlled variable or for operating the adaptation mechanism or STR controller or for determining the quantity of fuel injection, it is alternatively possible to use any other crank angles that are determined by the TDC such as 10 crank angles before the TDC.

Furthermore, while the aforesaid embodiments were described with respect to examples using STRs, MRACS (model reference adaptive control systems) can be used instead.

While the foregoing embodiments were described as using the output of a single air/fuel ratio sensor installed at the exhaust system confluence point, the invention is not limited to this arrangement and it is possible instead to conduct the air/fuel ratio feedback control based on air/fuel ratios detected by air/fuel ratio sensors installed for the individual cylinders.

While the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for controlling fuel metering for a multi-cylinder internal combustion engine, said system comprising:
   an air/fuel ratio sensor installed in an exhaust system of the engine;
   a fuel injector for injecting fuel in individual cylinders of the engine;
   engine operating condition detecting means for detecting engine operating conditions, said engine operating conditions including at least engine speed and engine load;
   fuel injection quantity determining means for determining a quantity of fuel injection for the individual cylinders of the engine, based upon the detected, engine operating conditions;
   an adaptive controller connected to said air/fuel ratio sensor and said fuel injection quantity determining means for correcting the quantity of fuel injection based on controller parameters estimated by an adaptation mechanism, such that a controlled variable at least obtained based upon an output of said air/fuel ratio sensor is corrected to a desired value;
   estimation error signal calculating means for calculating an estimation error signal of the controller parameters;
   estimation error signal comparing means for comparing the calculated estimation error signal with a predetermined limit value; and
   replacing means for replacing the calculated estimation error signal with at least one of the predetermined limit value and a prescribed value when the calculated estimation error signal exceeds the predetermined limit value.

2. A system according to claim 1, wherein said adaptive mechanism includes a gain matrix having non-diagonal elements and diagonal elements, wherein the controller parameters are determined based on said diagonal elements of said gain matrix, independent of the non-diagonal elements.

3. A system according to claim 2, wherein the nondiagonal elements of the gain matrix are set to 0.

4. A system according to claim 2, wherein at least two of the diagonal elements of the gain matrix are set to a same value.

5. A system according to claim 2, wherein the diagonal elements of the gain matrix are set to a same value.

6. A system for controlling fuel metering for a multi-cylinder internal combustion engine, said system comprising:
   an air/fuel ratio sensor installed in an exhaust system of the engine;
   a fuel injector for injecting fuel in individual cylinders of the engine;
   a controller, coupled to said air/fuel ratio sensor and said fuel injector, said controller for controlling said fuel injector, said controller being configured to:
     detect engine operating conditions based upon engine operating information provided thereto, said engine operating conditions including engine speed and engine load,
     determine a quantity of fuel injection for the individual cylinders of the engine, based upon the detected engine operation conditions,
     correct the quantity of fuel injection based on controller parameters such that a controlled variable at least obtained based upon an output of said air/fuel ratio sensor is brought to a desired value,
     calculate an estimation error signal of the controller parameters provided to the controller,
     compare the calculated estimation error signal with a predetermined limit value,
     replace the calculated estimation error signal with at least one of the predetermined limit value and a prescribed value when the calculated estimation error signal exceeds the predetermined limit value, and
     drive the fuel injector to inject the corrected quantity of fuel injection.

7. A system according to claim 6, wherein said control is configured to determine said controller parameters using a gain matrix having non-diagonal elements and diagonal elements, wherein the controller parameters are determined based upon the diagonal elements, independent of the non-diagonal elements.

8. A system according to claim 7, wherein the controller is configured such that the non-diagonal elements of the gain matrix are set to 0.

9. A system according to claim 7, wherein the controller is configured such that at least two of the diagonal elements of the gain matrix are set to a same value.

10. A system according to claim 7, wherein the diagonal elements of the gain matrix are set to a same value.

11. A method for controlling fuel metering for a multi-cylinder internal combustion engine, said method comprising the steps of:
   providing an air/fuel ratio sensor installed in an exhaust system of the engine;
   providing a fuel injector for injecting fuel in individual cylinders of the engine;
   detecting engine operating conditions based upon engine operating information, said engine operating conditions including at least engine speed and engine load;
   determining a quantity of fuel injection for the individual cylinders of the engine based upon the detected engine operating conditions;
   correcting the quantity of fuel injection based upon dynamic engine characteristic parameters such that a controlled variable at least obtained based upon an output of said air/fuel ratio sensor is brought to a desired value;
   calculating an estimation error signal of the dynamic engine characteristic parameters;
   comparing the calculated estimation error signal with a predetermined limit value;
   replacing the calculated estimation error signal with at least one of the predetermined limit value and a prescribed value when the calculated estimation error signal exceeds the predetermined limit value; and
   driving the fuel injector to inject the corrected quantity of fuel injection.

12. A method according to claim 11, further comprising a step of determining the controller parameters using a gain matrix having diagonal elements and non-diagonal elements, said controller parameters being determined based upon the diagonal elements, independent of the non-diagonal elements, of the gain matrix.

13. A method according to claim 12, further comprising a step of setting the non-diagonal elements of the gain matrix to 0.

14. A method according to claim 12, further comprising a step of setting at least two of the diagonal elements of the gain matrix to a same value.

15. A method according to claim 12, further comprising a step of setting the diagonal elements of the gain matrix to a same value.

16. A computer program embodied on a computer-readable medium for controlling fuel metering in a fuel metering system for a multi-cylinder internal combustion engine, said computer program controlling said system to perform the steps of:

detecting engine operating conditions based upon engine operating information, said engine operating conditions including at least engine speed and engine load;

determining a quantity of fuel injection for individual cylinders of the multi-cylinder engine based upon the detected engine operating conditions;

correcting the quantity of fuel injection based upon dynamic engine characteristic parameters such that a controlled variable at least obtained based upon an output of an air/fuel ratio sensor is brought to a desired value;

calculating an estimation error signal of the dynamic engine characteristic parameters;

comparing the calculated estimation error signal with a predetermined limit value;

replacing the calculated estimation error signal with at least one of the predetermined limit value and a prescribed value when the calculated estimation error signal exceeds the predetermined limit value; and driving a fuel injector to inject the corrected quantity of fuel injection.

17. A computer program according to claim 16, wherein said computer program controls the fuel metering system to determine said controller parameters based upon a gain matrix having diagonal and non-diagonal elements, wherein the controller parameters are determined based upon the diagonal elements, independent of the non-diagonal elements.

18. A computer program according to claim 17, wherein the computer program controls the fuel metering system to set the non-diagonal elements of the gain matrix to 0.

19. A computer program according to claim 17, wherein at least two of the diagonal elements of the gain matrix are set to a same value.

20. A computer program according to claim 16, wherein the computer program controls the fuel metering system to set the diagonal elements of the gain matrix to a same value.

21. A system for controlling fuel metering for a multi-cylinder internal combustion engine, comprising:

an air/fuel ratio sensor installed in an exhaust system of the engine;

engine operating condition detecting means for detecting engine operating conditions, said engine operating conditions including at least engine speed and engine load;

a fuel injector for injecting fuel in individual cylinders of the engine;

fuel injection quantity determining means for determining a quantity of fuel injection for the individual cylinders of the engine based upon the detected engine operating conditions; and an adaptive controller for correcting the quantity of fuel injection based upon controller parameters such that a controlled variable obtained at least based upon an output of said air/fuel ratio sensor is brought to a desired value, wherein an estimation error signal indicating an estimation error of the controller parameters, is determined within a predetermined range.

22. A system according to claim 21, further comprising adaptation mechanism means coupled to said adaptive controller, said adaptation mechanism means estimating the controller parameters.

23. A system according to claim 21, wherein the predetermined range of said estimation error signal is determined based upon at least one of the detected engine operating conditions.

24. A system for controlling fuel metering for a multi-cylinder internal combustion engine, said system comprising:

an air/fuel ratio sensor installed in an exhaust system of the engine;

a fuel injector for injecting fuel in individual cylinders of the engine;

a controller coupled to said air/fuel ratio sensor and said fuel injector, said controller being configured to determine engine operating conditions based upon operating condition information provided thereto, said engine operating conditions including at least engine speed and engine load, determine a quantity of fuel injection for the individual cylinders of the engine based upon the determined engine operation conditions, and correct the quantity of fuel injection based upon controller parameters such that a controlled variable obtained at least based upon an output of said air/fuel ratio sensor is brought to a desired value, said corrected quantity of fuel injection being used to drive said fuel injector, wherein an estimation error signal indicating an estimation error of the controller parameters, is determined within a predetermined range.

25. A system according to claim 24, wherein said controller is further configured to perform an adaptation function of estimating the controller parameters.

26. A system according to claim 24, wherein the predetermined range of the estimation error signal is determined based upon at least one of the detected engine operating conditions.

27. A method for controlling fuel metering for a multi-cylinder internal combustion engine, said method comprising the steps of:

providing an air/fuel ratio sensor installed in an exhaust system of the engine;

providing a fuel injector for injecting fuel in individual cylinders of the engine;

detecting engine operating conditions, said detected operating conditions including at least engine speed and engine load;

determining a quantity of fuel injection #or the individual cylinders of the engine based upon the detected engine operating conditions; and correcting the quantity of fuel injection based upon dynamic engine characteristic parameters such that a controlled variable obtained at least based upon an output of said air/fuel ratio sensor is brought to a desired value, wherein an estimation error signal indicating an estimation error of the controlled variable, is determined within a predetermined range.

28. A method according to claim 27, further comprising a step of determining said estimation error signal based upon at least one of the detected engine operating conditions.

29. A method according to claim 27, further comprising the steps of driving the fuel injector to inject the corrected quantity of fuel into the individual cylinders.

30. A computer program embodied on a computer-readable medium for controlling fuel metering in a fuel metering system for a multi-cylinder internal combustion engine, said computer program controlling said system to perform the steps of:

detecting engine operating conditions, said detected operating conditions including at least engine speed and engine load;

determining a quantity of fuel injection for individual cylinders of the engine based upon the detected engine operating conditions; and correcting the quantity of fuel injection based upon dynamic engine characteristic parameters such that a controlled variable obtained at least based upon an output of an air/fuel ratio sensor is bought to a desired value, wherein an estimation error signal indicating an estimator error of the dynamic engine characteristic parameters, is determined within a predetermined range.

31. A computer program according to claim 30, wherein said computer program controls said fuel metering system to determine said estimation error signal based upon at least one of the detected engine operating conditions.

32. A computer program according to claim 30, wherein said computer program controls said fuel metering system to drive a fuel injector to inject the corrected quantity of fuel into the individual cylinders.

33. A computer program according to claim 30, wherein the computer program controls the fuel metering system to set the diagonal elements of the gain matrix to a same value.

* * * * *